United States Patent
Schneider et al.

(10) Patent No.: US 9,223,094 B2
(45) Date of Patent: Dec. 29, 2015

(54) FLEXIBLE OPTICAL CIRCUIT, CASSETTES, AND METHODS

(71) Applicants: Tyco Electronics Nederland BV, 'S-Hertogenbosch (NL); Tyco Electronics Corporation, Berwyn, PA (US)

(72) Inventors: Paul Schneider, Gemonde AH (NL); Alexander Dorrestein, Helmond (NL); James Joseph Eberle, Jr., Hummelstown, PA (US)

(73) Assignees: Tyco Electronics Nederland BV, 'S-Hertogenbosch (NL); Tyco Electronics Corporation, Berwyn, PA (US)

(*) Notice: Subject to any disclaimer, the term of this patent is extended or adjusted under 35 U.S.C. 154(b) by 0 days.

(21) Appl. No.: 14/045,509

(22) Filed: Oct. 3, 2013

(65) Prior Publication Data

US 2014/0133810 A1    May 15, 2014

Related U.S. Application Data

(60) Provisional application No. 61/710,519, filed on Oct. 5, 2012.

(51) Int. Cl.
    G02B 6/36 (2006.01)
    G02B 6/38 (2006.01)
    G02B 6/44 (2006.01)

(52) U.S. Cl.
    CPC ............ *G02B 6/3608* (2013.01); *G02B 6/3885* (2013.01); *G02B 6/4472* (2013.01)

(58) Field of Classification Search
    CPC .......... G02B 6/36; G02B 6/40; G02B 6/4281; G02B 6/3608; G02B 6/3885; G02B 6/4472
    USPC ........................................................... 385/89
    See application file for complete search history.

(56) References Cited

U.S. PATENT DOCUMENTS 4,359,262 A    11/1982    Dolan
4,502,754 A     3/1985    Kawa
(Continued)

FOREIGN PATENT DOCUMENTS

AU    40995/85    4/1985
AU    55314/86    3/1986
(Continued)

OTHER PUBLICATIONS

"ADC OMX 600 Optical Distribution Frame Solution," ADC Telecommunications, Inc., Publication No. 856, 8 pgs. (Feb. 2000).
(Continued)

*Primary Examiner* — Peter Radkowski
(74) *Attorney, Agent, or Firm* — Merchant & Gould P.C.

(57) ABSTRACT

A fiber optic cassette includes a body defining a front and an opposite rear. A cable entry location, such as a multi-fiber connector, is defined on the body for a cable to enter the cassette, wherein a plurality of optical fibers from the cable extend into the cassette and form terminations at one or more single or multi-fiber connectors adjacent the front of the body. A flexible substrate is positioned between the cable entry location and the connectors adjacent the front of the body, the flexible substrate rigidly supporting the plurality of optical fibers. Each of the connectors adjacent the front of the body includes a ferrule. Dark fibers can be provided if not all fiber locations are used in the multi-fiber connectors. Multiple flexible substrates can be used with one or more multi-fiber connectors.

11 Claims, 76 Drawing Sheets

(56) References Cited

U.S. PATENT DOCUMENTS

| | | | |
|---|---|---|---|
| 4,585,303 A | 4/1986 | Pinsard et al. | |
| 4,595,255 A | 6/1986 | Bhatt et al. | |
| 4,630,886 A | 12/1986 | Lauriello et al. | |
| 4,699,455 A | 10/1987 | Erbe et al. | |
| 4,708,430 A | 11/1987 | Donaldson et al. | |
| 4,717,231 A | 1/1988 | Dewez et al. | |
| 4,733,936 A | 3/1988 | Mikolaicyk et al. | |
| 4,736,100 A | 4/1988 | Vastagh | |
| 4,747,020 A | 5/1988 | Brickley et al. | |
| 4,765,710 A | 8/1988 | Burmeister et al. | |
| 4,792,203 A | 12/1988 | Nelson et al. | |
| 4,824,196 A | 4/1989 | Bylander | |
| 4,861,134 A | 8/1989 | Alameel et al. | |
| 4,900,123 A | 2/1990 | Barlow et al. | |
| 4,948,220 A | 8/1990 | Violo et al. | |
| 4,971,421 A | 11/1990 | Ori | |
| 4,986,762 A | 1/1991 | Keith | |
| 4,995,688 A | 2/1991 | Anton et al. | |
| 5,011,257 A | 4/1991 | Wettengel et al. | |
| 5,023,646 A | 6/1991 | Ishida et al. | |
| 5,058,983 A | 10/1991 | Corke et al. | |
| 5,067,784 A | 11/1991 | Debortoli et al. | |
| 5,071,211 A | 12/1991 | Debortoli et al. | |
| 5,073,042 A | 12/1991 | Mulholland et al. | |
| 5,076,688 A | 12/1991 | Bowen et al. | |
| 5,100,221 A | 3/1992 | Carney et al. | |
| 5,109,447 A * | 4/1992 | Chan | 385/45 |
| 5,127,082 A | 6/1992 | Below et al. | |
| 5,129,030 A | 7/1992 | Petrunia | |
| 5,138,688 A | 8/1992 | Debortoli | |
| 5,142,598 A | 8/1992 | Tabone | |
| 5,142,606 A | 8/1992 | Carney et al. | |
| 5,155,785 A * | 10/1992 | Holland et al. | 385/89 |
| 5,160,188 A | 11/1992 | Rorke et al. | |
| 5,167,001 A | 11/1992 | Debortoli et al. | |
| 5,179,618 A | 1/1993 | Anton | |
| 5,208,885 A * | 5/1993 | Dragone et al. | 385/49 |
| 5,212,761 A | 5/1993 | Petrunia | |
| 5,214,735 A | 5/1993 | Henneberger et al. | |
| 5,233,674 A | 8/1993 | Vladic | |
| 5,235,665 A | 8/1993 | Marchesi et al. | |
| 5,259,051 A * | 11/1993 | Burack et al. | 385/76 |
| 5,274,729 A | 12/1993 | King et al. | |
| 5,274,731 A | 12/1993 | White | |
| 5,287,425 A | 2/1994 | Chang | |
| 5,289,558 A | 2/1994 | Teichler et al. | |
| 5,317,663 A | 5/1994 | Beard et al. | |
| 5,318,259 A | 6/1994 | Fussler | |
| 5,333,221 A | 7/1994 | Briggs et al. | |
| 5,333,222 A | 7/1994 | Belenkiy et al. | |
| 5,335,349 A | 8/1994 | Kutsch et al. | |
| 5,353,367 A | 10/1994 | Czosnowski et al. | |
| 5,359,688 A | 10/1994 | Underwood | |
| 5,363,440 A | 11/1994 | Daoud | |
| 5,363,465 A | 11/1994 | Korkowski et al. | |
| 5,363,467 A | 11/1994 | Keith | |
| 5,367,598 A | 11/1994 | Devenish, III et al. | |
| 5,402,515 A | 3/1995 | Vidacovich et al. | |
| 5,408,557 A | 4/1995 | Hsu | |
| RE34,955 E | 5/1995 | Anton et al. | |
| 5,412,751 A | 5/1995 | Siemon et al. | |
| 5,420,958 A | 5/1995 | Henson et al. | |
| 5,432,875 A | 7/1995 | Korkowski et al. | |
| 5,442,726 A | 8/1995 | Howard et al. | |
| 5,448,015 A | 9/1995 | Jamet et al. | |
| 5,461,690 A | 10/1995 | Lampert | |
| 5,469,526 A | 11/1995 | Rawlings | |
| 5,490,229 A | 2/1996 | Ghandeharizadeh et al. | |
| 5,497,444 A | 3/1996 | Wheeler | |
| 5,511,144 A | 4/1996 | Hawkins et al. | |
| 5,542,015 A | 7/1996 | Hultermans | |
| 5,570,450 A | 10/1996 | Fernandez et al. | |
| 5,636,138 A | 6/1997 | Gilbert et al. | |
| 5,647,043 A | 7/1997 | Anderson et al. | |
| 5,689,604 A | 11/1997 | Janus et al. | |
| 5,708,751 A | 1/1998 | Mattei | |
| 5,715,348 A | 2/1998 | Falkenberg et al. | |
| 5,717,810 A | 2/1998 | Wheeler | |
| 5,734,776 A | 3/1998 | Puetz | |
| 5,742,480 A | 4/1998 | Sawada et al. | |
| 5,758,002 A | 5/1998 | Walters | |
| 5,758,003 A | 5/1998 | Wheeler et al. | |
| 5,764,844 A | 6/1998 | Mendes | |
| 5,774,245 A | 6/1998 | Baker | |
| 5,774,612 A | 6/1998 | Belenkiy et al. | |
| 5,781,686 A | 7/1998 | Robinson et al. | |
| 5,784,515 A | 7/1998 | Tamaru et al. | |
| 5,823,646 A | 10/1998 | Arizpe et al. | |
| 5,825,955 A | 10/1998 | Ernst et al. | |
| 5,841,917 A * | 11/1998 | Jungerman et al. | 385/17 |
| 5,870,519 A | 2/1999 | Jenkins et al. | |
| 5,883,995 A | 3/1999 | Lu | |
| 5,887,095 A | 3/1999 | Nagase et al. | |
| 5,889,910 A | 3/1999 | Igl et al. | |
| 5,903,698 A | 5/1999 | Poremba et al. | |
| 5,909,526 A | 6/1999 | Roth et al. | |
| 5,930,425 A | 7/1999 | Abel et al. | |
| 5,945,633 A | 8/1999 | Ott et al. | |
| 5,956,444 A | 9/1999 | Duda et al. | |
| 5,966,492 A | 10/1999 | Bechamps et al. | |
| 5,969,294 A | 10/1999 | Eberle et al. | |
| 5,975,769 A | 11/1999 | Larson et al. | |
| 5,987,203 A | 11/1999 | Abel et al. | |
| 6,005,991 A * | 12/1999 | Knasel | 385/14 |
| 6,012,852 A | 1/2000 | Kadar-Kallen et al. | |
| 6,027,252 A | 2/2000 | Erdman et al. | |
| 6,041,155 A | 3/2000 | Anderson et al. | |
| 6,044,193 A | 3/2000 | Szentesi et al. | |
| 6,061,492 A | 5/2000 | Strause et al. | |
| 6,076,975 A | 6/2000 | Roth | |
| 6,079,881 A | 6/2000 | Roth | |
| 6,097,872 A | 8/2000 | Kusuda et al. | |
| 6,149,315 A | 11/2000 | Stephenson | |
| 6,160,946 A | 12/2000 | Thompson et al. | |
| 6,167,183 A | 12/2000 | Swain | |
| 6,181,845 B1 * | 1/2001 | Horsthuis et al. | 385/17 |
| 6,188,687 B1 | 2/2001 | Mussman et al. | |
| 6,188,825 B1 | 2/2001 | Bandy et al. | |
| 6,208,779 B1 | 3/2001 | Rowlette, Sr. et al. | |
| 6,208,796 B1 | 3/2001 | Vigliaturo | |
| 6,222,976 B1 * | 4/2001 | Shahid | 385/134 |
| 6,227,717 B1 | 5/2001 | Ott et al. | |
| 6,234,683 B1 | 5/2001 | Waldron et al. | |
| 6,236,795 B1 | 5/2001 | Rodgers | |
| 6,240,229 B1 | 5/2001 | Roth | |
| 6,256,443 B1 | 7/2001 | Uruno | |
| 6,271,484 B1 | 8/2001 | Tokutsu | |
| 6,278,829 B1 | 8/2001 | BuAbbud et al. | |
| 6,304,690 B1 * | 10/2001 | Day | 385/24 |
| RE37,489 E | 1/2002 | Anton et al. | |
| 6,347,888 B1 | 2/2002 | Puetz | |
| 6,351,590 B1 * | 2/2002 | Shahid | 385/134 |
| 6,352,374 B1 * | 3/2002 | Selfridge et al. | 385/76 |
| 6,356,697 B1 | 3/2002 | Braga et al. | |
| 6,360,050 B1 | 3/2002 | Moua et al. | |
| 6,363,200 B1 | 3/2002 | Thompson et al. | |
| 6,385,381 B1 | 5/2002 | Janus et al. | |
| 6,411,767 B1 | 6/2002 | Burrous et al. | |
| 6,424,781 B1 | 7/2002 | Puetz et al. | |
| 6,425,694 B1 | 7/2002 | Szilagyi et al. | |
| 6,431,762 B1 | 8/2002 | Taira et al. | |
| 6,434,313 B1 | 8/2002 | Clapp, Jr. et al. | |
| 6,452,925 B1 | 9/2002 | Sistanizadeh et al. | |
| 6,453,033 B1 | 9/2002 | Little et al. | |
| 6,464,402 B1 | 10/2002 | Andrews et al. | |
| D466,087 S | 11/2002 | Cuny et al. | |
| 6,480,487 B1 | 11/2002 | Wegleitner et al. | |
| 6,480,661 B2 | 11/2002 | Kadar-Kallen et al. | |
| 6,483,977 B2 | 11/2002 | Battey et al. | |
| 6,493,480 B1 * | 12/2002 | Lelic | 385/17 |
| 6,496,640 B1 | 12/2002 | Harvey et al. | |
| 6,504,988 B1 | 1/2003 | Trebesch et al. | |
| 6,510,273 B2 | 1/2003 | Ali et al. | |
| 6,526,210 B1 | 2/2003 | Harrison et al. | |

(56) References Cited

U.S. PATENT DOCUMENTS

| | | |
|---|---|---|
| 6,532,332 B2 | 3/2003 | Solheid et al. |
| 6,535,682 B1 | 3/2003 | Puetz et al. |
| 6,537,106 B1 | 3/2003 | Follingstad |
| 6,539,147 B1 | 3/2003 | Mahony |
| 6,539,160 B2 | 3/2003 | Battey et al. |
| 6,542,688 B1 | 4/2003 | Battey et al. |
| 6,547,450 B2 | 4/2003 | Lampert |
| 6,554,485 B1 | 4/2003 | Beatty et al. |
| 6,556,763 B1 | 4/2003 | Puetz et al. |
| 6,573,451 B2 | 6/2003 | Komiya et al. |
| 6,577,595 B1 | 6/2003 | Counterman |
| 6,591,051 B2 | 7/2003 | Solheid et al. |
| 6,597,670 B1 | 7/2003 | Tweedy et al. |
| 6,614,980 B1 | 9/2003 | Mahony |
| 6,621,975 B2 | 9/2003 | Laporte et al. |
| 6,623,170 B2 | 9/2003 | Petrillo |
| 6,625,375 B1 | 9/2003 | Mahony |
| 6,631,237 B2 | 10/2003 | Knudsen et al. |
| RE38,311 E | 11/2003 | Wheeler |
| 6,648,376 B2 | 11/2003 | Christianson |
| 6,654,536 B2 | 11/2003 | Battey et al. |
| 6,661,961 B1 | 12/2003 | Allen et al. |
| 6,668,127 B1 | 12/2003 | Mahony |
| 6,688,780 B2 | 2/2004 | Duran |
| 6,690,862 B1 * | 2/2004 | Rietveld ........................ 385/39 |
| 6,709,607 B2 * | 3/2004 | Hibbs-Brenner et al. ...... 216/24 |
| 6,711,339 B2 | 3/2004 | Puetz et al. |
| 6,736,670 B2 | 5/2004 | Clark et al. |
| 6,755,574 B2 | 6/2004 | Fujiwara et al. |
| 6,760,530 B1 | 7/2004 | Mandry |
| 6,760,531 B1 | 7/2004 | Solheid et al. |
| 6,761,585 B2 | 7/2004 | Clark et al. |
| 6,763,166 B2 | 7/2004 | Yow, Jr. et al. |
| 6,764,221 B1 | 7/2004 | de Jong et al. |
| 6,775,458 B2 | 8/2004 | Yow, Jr. et al. |
| 6,778,752 B2 | 8/2004 | Laporte et al. |
| 6,788,786 B1 | 9/2004 | Kessler et al. |
| 6,788,846 B2 | 9/2004 | Hileman et al. |
| 6,792,190 B2 | 9/2004 | Xin et al. |
| 6,792,191 B1 | 9/2004 | Clapp, Jr. et al. |
| 6,793,517 B2 | 9/2004 | Neer et al. |
| 6,796,717 B2 | 9/2004 | Petrillo |
| 6,801,680 B2 * | 10/2004 | Lin ................................ 385/17 |
| 6,815,612 B2 | 11/2004 | Bloodworth et al. |
| 6,819,821 B2 * | 11/2004 | Lacey et al. .................... 385/17 |
| 6,845,207 B2 | 1/2005 | Schray |
| 6,850,685 B2 | 2/2005 | Tinucci et al. |
| 6,853,795 B2 | 2/2005 | Dagley et al. |
| 6,870,734 B2 | 3/2005 | Mertesdorf et al. |
| 6,888,069 B1 | 5/2005 | Chen et al. |
| 6,901,200 B2 | 5/2005 | Schray |
| 6,909,833 B2 | 6/2005 | Henschel et al. |
| 6,912,349 B2 | 6/2005 | Clark et al. |
| 6,916,199 B2 | 7/2005 | Follingstad |
| 6,920,213 B2 | 7/2005 | Pershan |
| 6,920,274 B2 | 7/2005 | Rapp et al. |
| 6,925,241 B2 | 8/2005 | Bohle et al. |
| 6,937,800 B2 | 8/2005 | Cote |
| 6,950,593 B2 | 9/2005 | Hodge et al. |
| 6,959,139 B2 | 10/2005 | Erwin et al. |
| 6,968,111 B2 | 11/2005 | Trebesch et al. |
| 6,980,725 B1 | 12/2005 | Swieconek |
| 6,983,095 B2 | 1/2006 | Reagan et al. |
| H2144 H | 2/2006 | Baechtle et al. |
| 7,020,359 B2 * | 3/2006 | Mayer ............................ 385/24 |
| 7,029,322 B2 | 4/2006 | Ernst et al. |
| 7,058,245 B2 * | 6/2006 | Farahi ............................ 385/14 |
| 7,066,762 B2 | 6/2006 | Neer et al. |
| 7,066,771 B2 | 6/2006 | Clark et al. |
| 7,075,565 B1 | 7/2006 | Douglas et al. |
| 7,086,539 B2 | 8/2006 | Knudsen et al. |
| 7,088,899 B2 | 8/2006 | Reagan et al. |
| 7,090,084 B2 | 8/2006 | Knudsen et al. |
| 7,092,592 B2 | 8/2006 | Verhagen et al. |
| 7,094,095 B1 | 8/2006 | Caveney |
| 7,102,884 B2 | 9/2006 | Mertesdorf et al. |
| 7,103,255 B2 | 9/2006 | Reagan et al. |
| 7,130,498 B2 | 10/2006 | Meis et al. |
| 7,139,456 B2 * | 11/2006 | Sasaki et al. .................. 385/114 |
| 7,139,461 B2 | 11/2006 | Puetz et al. |
| 7,142,764 B2 | 11/2006 | Allen et al. |
| 7,142,765 B2 | 11/2006 | Rapp et al. |
| 7,146,089 B2 | 12/2006 | Reagan et al. |
| 7,149,398 B2 | 12/2006 | Solheid et al. |
| 7,171,102 B2 | 1/2007 | Reagan et al. |
| 7,179,119 B2 | 2/2007 | Follingstad |
| 7,186,032 B1 * | 3/2007 | Stevens et al. .................. 385/53 |
| 7,194,181 B2 | 3/2007 | Holmberg et al. |
| 7,198,409 B2 | 4/2007 | Smith et al. |
| 7,200,317 B2 | 4/2007 | Reagan et al. |
| 7,218,827 B2 | 5/2007 | Vongseng et al. |
| 7,233,731 B2 | 6/2007 | Solheid et al. |
| 7,241,182 B2 | 7/2007 | Clark et al. |
| 7,244,144 B2 | 7/2007 | Follingstad |
| 7,277,620 B2 | 10/2007 | Vongseng et al. |
| 7,330,546 B2 | 2/2008 | Kessler et al. |
| 7,333,707 B2 | 2/2008 | Puetz et al. |
| 7,335,056 B1 | 2/2008 | Clark et al. |
| 7,346,254 B2 | 3/2008 | Kramer et al. |
| 7,357,667 B2 | 4/2008 | Clark et al. |
| 7,367,823 B2 | 5/2008 | Rapp et al. |
| 7,369,741 B2 | 5/2008 | Reagan et al. |
| 7,376,321 B2 | 5/2008 | Bolster et al. |
| 7,376,322 B2 | 5/2008 | Zimmel et al. |
| 7,376,323 B2 | 5/2008 | Zimmel |
| 7,377,697 B2 | 5/2008 | Kahle et al. |
| 7,391,952 B1 | 6/2008 | Ugolini et al. |
| 7,400,813 B2 | 7/2008 | Zimmel |
| 7,400,816 B2 | 7/2008 | Reagan et al. |
| 7,407,330 B2 | 8/2008 | Smith et al. |
| 7,408,769 B2 | 8/2008 | Mertesdorf et al. |
| 7,412,147 B2 | 8/2008 | Scadden |
| 7,416,349 B2 | 8/2008 | Kramer |
| 7,418,181 B2 | 8/2008 | Zimmel et al. |
| 7,433,915 B2 | 10/2008 | Edwards et al. |
| 7,455,548 B2 | 11/2008 | Clark et al. |
| 7,457,503 B2 | 11/2008 | Solheid et al. |
| 7,471,869 B2 | 12/2008 | Reagan et al. |
| 7,493,002 B2 | 2/2009 | Coburn et al. |
| 7,515,805 B2 | 4/2009 | Vongseng et al. |
| 7,519,259 B2 | 4/2009 | Vongseng et al. |
| 7,534,135 B2 | 5/2009 | Follingstad |
| 7,544,090 B2 | 6/2009 | Follingstad |
| 7,553,091 B2 | 6/2009 | McColloch |
| 7,555,193 B2 | 6/2009 | Rapp et al. |
| 7,623,749 B2 | 11/2009 | Reagan et al. |
| 7,627,204 B1 * | 12/2009 | Deane ............................ 385/14 |
| 7,646,958 B1 | 1/2010 | Reagan et al. |
| 7,686,658 B2 | 3/2010 | Clark et al. |
| 7,722,261 B2 | 5/2010 | Kadar-Kallen et al. |
| 7,738,755 B2 | 6/2010 | Shioda |
| 7,738,760 B2 | 6/2010 | Fredrickson et al. |
| 7,747,125 B1 | 6/2010 | Lee et al. |
| RE41,460 E | 7/2010 | Wheeler |
| 7,775,725 B2 | 8/2010 | Grinderslev |
| 7,805,043 B2 | 9/2010 | Puetz et al. |
| 7,809,232 B2 | 10/2010 | Reagan et al. |
| 7,809,233 B2 | 10/2010 | Smith et al. |
| 7,809,234 B2 | 10/2010 | Smith et al. |
| 7,809,235 B2 | 10/2010 | Reagan et al. |
| 7,822,313 B2 | 10/2010 | Rapp et al. |
| 7,826,706 B2 | 11/2010 | Vongseng et al. |
| 7,841,775 B2 | 11/2010 | Smith et al. |
| 7,844,159 B2 | 11/2010 | Solheid et al. |
| 7,844,161 B2 | 11/2010 | Reagan et al. |
| 7,873,255 B2 | 1/2011 | Reagan et al. |
| 7,889,961 B2 | 2/2011 | Cote et al. |
| 7,934,948 B2 | 5/2011 | Follingstad |
| 7,942,004 B2 | 5/2011 | Hodder |
| 7,961,999 B2 | 6/2011 | Frohlich et al. |
| 7,983,521 B2 | 7/2011 | Rapp et al. |
| 8,019,192 B2 | 9/2011 | Puetz et al. |
| 8,078,017 B2 | 12/2011 | Kodama et al. |
| 8,085,472 B2 | 12/2011 | Kadar-Kallen |

(56) References Cited

U.S. PATENT DOCUMENTS

| | | | |
|---|---|---|---|
| 8,139,913 B2 | 3/2012 | Bolster et al. | |
| 8,195,022 B2 | 6/2012 | Coburn et al. | |
| 8,358,900 B2 | 1/2013 | Rapp et al. | |
| 8,374,477 B2 | 2/2013 | Hill | |
| 8,406,587 B2 | 3/2013 | Mudd et al. | |
| 8,417,074 B2 | 4/2013 | Nhep et al. | |
| 8,428,418 B2 | 4/2013 | Smrha | |
| 8,600,208 B2 | 12/2013 | Badar et al. | |
| 8,649,648 B2 | 2/2014 | Coburn et al. | |
| 8,690,593 B2 | 4/2014 | Anderson et al. | |
| 8,712,206 B2 | 4/2014 | Cooke et al. | |
| 2001/0041025 A1* | 11/2001 | Farahi | 385/14 |
| 2002/0034290 A1 | 3/2002 | Pershan | |
| 2002/0097962 A1* | 7/2002 | Yoshimura et al. | 385/50 |
| 2002/0131719 A1 | 9/2002 | Grois et al. | |
| 2002/0150372 A1 | 10/2002 | Schray | |
| 2002/0181893 A1 | 12/2002 | White et al. | |
| 2002/0181922 A1 | 12/2002 | Xin et al. | |
| 2003/0002812 A1 | 1/2003 | Lampert | |
| 2003/0007767 A1 | 1/2003 | Douglas et al. | |
| 2003/0042040 A1 | 3/2003 | Komiya et al. | |
| 2003/0044141 A1 | 3/2003 | Melton et al. | |
| 2003/0072537 A1* | 4/2003 | Eichenberger et al. | 385/89 |
| 2003/0095772 A1 | 5/2003 | Solheid et al. | |
| 2003/0147597 A1 | 8/2003 | Duran | |
| 2003/0165315 A1 | 9/2003 | Trebesch et al. | |
| 2003/0174953 A1 | 9/2003 | Carnevale et al. | |
| 2003/0174996 A1 | 9/2003 | Henschel et al. | |
| 2003/0182015 A1 | 9/2003 | Domaille et al. | |
| 2003/0223724 A1 | 12/2003 | Puetz et al. | |
| 2004/0028368 A1 | 2/2004 | Hileman et al. | |
| 2004/0074852 A1 | 4/2004 | Knudsen et al. | |
| 2004/0109660 A1 | 6/2004 | Liberty | |
| 2004/0126069 A1 | 7/2004 | Jong et al. | |
| 2004/0136638 A1* | 7/2004 | Baechtle et al. | 385/14 |
| 2004/0165852 A1 | 8/2004 | Erwin et al. | |
| 2004/0172492 A1* | 9/2004 | Farnworth et al. | 710/300 |
| 2004/0175090 A1 | 9/2004 | Vastmans et al. | |
| 2004/0228598 A1 | 11/2004 | Allen et al. | |
| 2004/0264873 A1 | 12/2004 | Smith et al. | |
| 2005/0002633 A1 | 1/2005 | Solheid et al. | |
| 2005/0003697 A1 | 1/2005 | Neer et al. | |
| 2005/0018950 A1 | 1/2005 | Arellano | |
| 2005/0048831 A1 | 3/2005 | Neer et al. | |
| 2005/0053337 A1* | 3/2005 | Mayer | 385/89 |
| 2005/0084200 A1 | 4/2005 | Meis et al. | |
| 2005/0129379 A1 | 6/2005 | Reagan et al. | |
| 2006/0029353 A1 | 2/2006 | Bolster et al. | |
| 2006/0093274 A1 | 5/2006 | Kahle et al. | |
| 2006/0093301 A1 | 5/2006 | Zimmel et al. | |
| 2006/0177175 A1* | 8/2006 | Mayer et al. | 385/24 |
| 2006/0210222 A1 | 9/2006 | Watte et al. | |
| 2006/0210229 A1 | 9/2006 | Scadden | |
| 2006/0228086 A1 | 10/2006 | Holmberg et al. | |
| 2006/0269205 A1 | 11/2006 | Zimmel | |
| 2006/0269206 A1 | 11/2006 | Zimmel | |
| 2007/0025675 A1 | 2/2007 | Kramer | |
| 2007/0047893 A1 | 3/2007 | Kramer et al. | |
| 2007/0189692 A1 | 8/2007 | Zimmel et al. | |
| 2007/0230863 A1 | 10/2007 | Fukuda et al. | |
| 2008/0008436 A1 | 1/2008 | Reagan et al. | |
| 2008/0008437 A1 | 1/2008 | Reagan et al. | |
| 2008/0019655 A1 | 1/2008 | Vongseng et al. | |
| 2008/0025684 A1 | 1/2008 | Vongseng et al. | |
| 2008/0089656 A1 | 4/2008 | Wagner et al. | |
| 2008/0131067 A1 | 6/2008 | Ugolini et al. | |
| 2008/0273846 A1 | 11/2008 | Register | |
| 2008/0317425 A1 | 12/2008 | Smith et al. | |
| 2009/0041417 A1 | 2/2009 | Rapp et al. | |
| 2009/0067800 A1 | 3/2009 | Vazquez et al. | |
| 2009/0074372 A1 | 3/2009 | Solheid et al. | |
| 2009/0087157 A1 | 4/2009 | Smith et al. | |
| 2009/0097800 A1 | 4/2009 | Gurreri et al. | |
| 2009/0097813 A1 | 4/2009 | Hill | |
| 2009/0190896 A1 | 7/2009 | Smith et al. | |
| 2009/0196565 A1 | 8/2009 | Vongseng et al. | |
| 2009/0245743 A1 | 10/2009 | Cote et al. | |
| 2009/0257726 A1 | 10/2009 | Redmann et al. | |
| 2009/0269018 A1 | 10/2009 | Frohlich et al. | |
| 2009/0274431 A1 | 11/2009 | Krampotich et al. | |
| 2009/0285540 A1 | 11/2009 | Reagan et al. | |
| 2009/0290843 A1 | 11/2009 | Reagan et al. | |
| 2009/0297111 A1 | 12/2009 | Reagan et al. | |
| 2009/0324189 A1 | 12/2009 | Hill et al. | |
| 2010/0129028 A1 | 5/2010 | Nhep et al. | |
| 2010/0142910 A1 | 6/2010 | Hill et al. | |
| 2010/0316335 A1* | 12/2010 | Furuyama | 385/88 |
| 2010/0322562 A1* | 12/2010 | Barnes et al. | 385/59 |
| 2010/0322576 A1 | 12/2010 | Rhoney et al. | |
| 2010/0322577 A1 | 12/2010 | Bolster et al. | |
| 2010/0322579 A1 | 12/2010 | Cooke et al. | |
| 2011/0019964 A1 | 1/2011 | Nhep et al. | |
| 2011/0044599 A1 | 2/2011 | Kowalczyk et al. | |
| 2011/0065909 A1 | 3/2011 | Lange et al. | |
| 2011/0085771 A1 | 4/2011 | Matsuyama et al. | |
| 2011/0096404 A1 | 4/2011 | Kadar-Kallen | |
| 2011/0110673 A1 | 5/2011 | Elberbaum | |
| 2011/0182558 A1 | 7/2011 | Garcia et al. | |
| 2011/0222829 A1 | 9/2011 | Loeffelholz et al. | |
| 2011/0262077 A1 | 10/2011 | Anderson et al. | |
| 2011/0268414 A1 | 11/2011 | Giraud et al. | |
| 2011/0274400 A1* | 11/2011 | Mudd et al. | 385/134 |
| 2011/0317973 A1 | 12/2011 | Rapp et al. | |
| 2012/0008900 A1 | 1/2012 | Schneider | |
| 2012/0014645 A1 | 1/2012 | Kadar-Kallen | |
| 2012/0020618 A1 | 1/2012 | Erdman et al. | |
| 2012/0020619 A1 | 1/2012 | Kadar-Kallen et al. | |
| 2012/0051706 A1 | 3/2012 | Van Geffen et al. | |
| 2012/0051708 A1 | 3/2012 | Badar et al. | |
| 2012/0263415 A1 | 10/2012 | Tan et al. | |
| 2012/0301098 A1 | 11/2012 | Benedetto et al. | |
| 2013/0064495 A1* | 3/2013 | Eberle, Jr. | 385/14 |
| 2013/0064506 A1* | 3/2013 | Eberle et al. | 385/49 |
| 2013/0077913 A1 | 3/2013 | Schneider et al. | |
| 2013/0089292 A1 | 4/2013 | Ott et al. | |

FOREIGN PATENT DOCUMENTS

| | | |
|---|---|---|
| CN | 2426610 Y | 4/2001 |
| DE | 27 35 106 A1 | 2/1979 |
| DE | 33 08 682 A1 | 9/1984 |
| DE | 42 07 531 A1 | 9/1992 |
| DE | 42 29 510 A1 | 3/1994 |
| EP | 0 146 478 A2 | 6/1985 |
| EP | 0 149 250 A2 | 7/1985 |
| EP | 0 196 102 A2 | 10/1986 |
| EP | 0 211 208 A1 | 2/1987 |
| EP | 0 293 183 A2 | 11/1988 |
| EP | 0 349 290 A1 | 1/1990 |
| EP | 0 406 151 A2 | 1/1991 |
| EP | 0 479 226 A1 | 4/1992 |
| EP | 0 196 102 B1 | 3/1993 |
| EP | 0 538 164 A1 | 4/1993 |
| EP | 0 585 809 A1 | 3/1994 |
| EP | 0 697 610 A1 | 2/1996 |
| EP | 0 743 701 A2 | 11/1996 |
| EP | 0 788 002 A1 | 8/1997 |
| EP | 0 871 047 A1 | 10/1998 |
| EP | 0 563 995 B1 | 10/1999 |
| EP | 0 975 180 A1 | 1/2000 |
| EP | 1 045 267 A1 | 10/2000 |
| FR | 2 531 576 A1 | 2/1984 |
| FR | 2 587 127 A1 | 3/1987 |
| JP | 59-74523 | 4/1984 |
| JP | 60-169811 | 9/1985 |
| JP | 61-55607 | 3/1986 |
| JP | 61-90104 | 5/1986 |
| JP | 63-229409 | 9/1988 |
| JP | 1144266 S | 6/2002 |
| JP | 3307618 B2 | 7/2002 |
| JP | 3761762 B2 | 3/2006 |
| WO | WO 91/10927 | 7/1991 |
| WO | WO 94/17534 | 8/1994 |
| WO | WO 95/20175 | 7/1995 |

(56) References Cited

FOREIGN PATENT DOCUMENTS

| | | |
|---|---|---|
| WO | WO 98/53347 | 11/1998 |
| WO | WO 99/27404 | 6/1999 |
| WO | WO 00/05611 | 2/2000 |
| WO | WO 00/07053 | 2/2000 |
| WO | WO 00/52504 | 9/2000 |
| WO | WO 00/75706 | 12/2000 |
| WO | WO 01/75495 | 10/2001 |
| WO | WO 0175495 A2 * | 10/2001 |
| WO | WO 02/21182 | 3/2002 |
| WO | WO 02/103429 | 12/2002 |
| WO | WO 03/021312 | 3/2003 |
| WO | WO 03/093883 A2 | 11/2003 |
| WO | WO 2008/089192 | 7/2008 |
| WO | WO 2009/120280 | 10/2009 |

OTHER PUBLICATIONS

"OMX™ 600 Optical Distribution Frame," ADC Telecommunications, Inc., Publication No. 854, front cover, table of contents, pp. 1-13, rear cover (Apr. 2000).

21 photographs showing what AFL Telecommunications LLC purports to be the ECOE cabinet referenced in the Prior art statement and the Supplemental prior art statement listed above. AFL Telecommunications LLC asserts the cabinet was on sale as early as 2001.

24 photos of LambdaUnite® Blank Card; "LambdaUnite® MultiService Switch (MSS)" brochure (2003); and "Lucent's LambdaUnite® Busts Out" official release (Jan. 29, 2002) (33 pages total).

ADC Telecommunications brochure entitled "Fiber Cable Management Products, Second Edition," 144 pages, dated Oct. 1995.

ADC Telecommunications, Inc. brochure entitled "FL2000 Products," Publication No. 803, 51 pages (Nov. 1996).

ADC Telecommunications brochure entitled "Next Generation Frame (NGF) Product Family Ordering Guide," 22 pages, dated Oct. 1998.

ADC Telecommunications, Inc., brochure entitled "Value-Added Module (VAM) System: Monitor, Splitter, WDM and CWDM Modules and Chassis for Switching Office, Central Exchange and Headend Applications, 1st edition," Part No. 101663BE, 36 pages (Feb. 2008).

ADC Telecommunications, Inc., "Value-Added Module (VAM) System—Monitor, Splitter, WDM/CWDM/DWDM Modules and Chassis—5th Edition," Oct. 2009, 32 Pages.

ADC Telecommunications, Inc., 600 mm Products, Value-Added Module System, pp. 53-78 (Oct. 2003).

ADC Telecommunications, Inc., brochure entitled "Value-Added Module System," Publication No. 891, 29 pages (Apr. 2000).

ADC Telecommunications, Inc., brochure entitled "Value-Added Module System: Optical Distribution Frame (OMX™ 600)," Publication No. 891-OMX, 11 pages (Jan. 2002).

ADC Telecommunications, Inc., brochure entitled "Fiber Management Tray: 2 Rack Unit (2 RU) Style FMT-G Series," Publication No. 1258896, 8 pages (Mar. 2003).

ADC Telecommunications, Inc., FMT Micro Value Added Monitor Module Configuration Scheme, pp. 1-2 (Feb. 6, 2003).

ADC Telecommunications, Inc., Mini VAM Connector Cleaning Instructions, ADCP-90-412, Issue 3, pp. 1-8 (Sep. 2002).

ADC Telecommunications, Inc., Mini VAM Splitter Mod (Installation Drawing), Drawing No. 1128185, 2 pages (Mar. 14, 2001).

ADC Telecommunications, Inc., Next Generation Frame (NGF) Product Tour, Value Added Modules (VAMs), Copyright 2003, 1 page, (admitted as offered for sale as of Apr. 25, 2006).

ADC Telecommunications, Inc., brochure entitled "Fiber Panel Products, Second Edition," front cover, Table of Contents, and pp. 1-111, Publication No. 846 (Jul. 1996) (116 pages total).

ADC Telecommunications, Inc.'s 6th Edition of Next Generation Frame (NGF) Product Family Ordering Guide; front cover, Table of Contents, pp. 1-41, and back cover; Item No. 820 (revised Feb. 2003) (44 pages total).

ADC Telecommunications, Inc.'s Fiber Optic, Cable Assemblies and Accessories Brochure; front cover, Table of Contents, pp. 1-23, and back cover; Item No. 100300 (revised Apr. 2003).

ADC Telecommunications, Inc., Next Generation Frame (NGF) Product Family, Publication No. 832, 8 pages, (Dec. 2000).

ADC Telecommunications, Inc., brochure entitled "Secure Fiber Entrance Terminal (SFET), " front cover, pp. 2-7, and back cover, Item No. 1005 (revised May 1998) (8 pages total).

ADC Telecommunications, Inc., brochure entitled "Outside Plant, Fiber Cross-Connect Solutions," front cover, Table of Contents, pp. 1-48, and back cover, Item No. 1047 (Jun. 2002).

AMP Inc. catalog entitled "Fiber Optic Products," front and back covers and p. 59, (4 pgs.) (© 1991).

Assembly reference drawings having drawing No. 1067101, dated Aug. 17, 1999 (8 pages).

AT&T Network Systems catalog entitled "Fiber Optic Products Innovation for wide ranging applications," front and back covers and pp. 6-1 through 6-16 (18 pages total) (© 1995).

AT&T Network Systems, Product Bulletin, "High Density Interconnect System (HDIC)," 2987D-DLH-7/89, Issue 2, 4 pages (Copyright 1989).

ATI Optique Catalog, ATI Optique Division of TI electronique, Version 2.6, released Mar. 27, 2002 (50 pages).

Bockstaele et al., "A scalable parallel optical interconnect family," IO Overview Paper—Apr. 2004.

Amphenol Corp., brochure entitled "Amphenol® 954 Series one piece SC Connector," F122-00311, Issue 1, 2 pages (Aug. 1990).

Connectorized splitter drawings having drawing No. 1067961, dated Aug. 18, 1999 (2 pages).

Alcoa Fujikura Ltd., brochure entitled "Couplers: Couplers WDMS Packaging,", 5 pages (copyright 2000).

Fiber distribution drawings having drawing No. 1069967, dated Aug. 17, 1999 (2 pages).

FONS Corporation, MDC Series Rack or Wall Mount Enclosures product sheet, 3 pages (2002).

FONS Corporation, Modular Distribution Cabinets Rack Mount Enclosures, Model MDC-7, product sheet, 2 pages (2005).

FONS Corporation's Technical Drawing No. 11669, Rev. D, of Distribution Cabinet Assembly MFDC-7, 1 page (technical drawing depicting the device shown in Exhibit M).

Grimes, Gary J., "Applications of Parallel Optical Interconnects," Lasers and Electro-Optics Society Annual Meeting, Nov. 18-21, 1996, vol. 2, pp. 6-7.

Hasegawa et al., "100GHz-48CH Athermal AWG with a Novel Temperature Insensitive Principle," National Fiber Optics Engineers Conference, 2003 Technical Proceedings, pp. 801-808.

Hirose Electric Co., Ltd., catalog entitled "Optical Fibre Connectors," Catalog No. O.F. (9) 3K, front and back covers and pp. 16, 17 and 49 (Mar. 1991) (5 pages total).

Installation drawings having drawing No. 1069965, dated Aug. 14, 1999 (3 pages).

Corning Cable Systems, "Installation Instructions for 12-position Splice Protector Insert," SRP-001-276, Issue 4, 1 page (Jul. 2001).

International Standard, "Fiber optic connector interfaces—Part 4-1: Type SC connector family—Simplified receptacle SC-PC connecter interfaces," Copyright IEC 61754-4-1, First edition, Jan. 2003 (9 pages).

Iwano, S. et al., "MU-type Optical Fiber Connector System," *NTT Review*, vol. 9, No. 2, pp. 63-71 (Mar. 1997).

Corning Cable Systems, "Jumper Routing Procedure for Enhanced Management Frame," SRP-003-599, Issue 2, 4 pages (Apr. 2002).

Nexans, "Cross-Connect Cabinet III: Plastic Watertight Cabinet for FTTH Applications," 2 pages (Oct. 2002).

Nexans, "Cross-Connect Cabinet V: Metallic Watertight Cabinet for FTTH Applications," 2 pages (Oct. 2002).

Northern Telecom Bulletin #91-004, Issue #2, 16 pages (May 1991).

NTT International, brochure entitled "Fiber Termination Module (FTM) & Premises Optical Distribution Cabinets (PODC)," 3 pages, undated.

"Optical fiber coupler review," Manufacturing Group at the Optoelectronics Division, Technical Report 2001, Products Presentation, showing Sumitomo Osaka Cement Co. Ltd's Optical Coupler (pp. 41-42).

(56) References Cited

OTHER PUBLICATIONS

Precision Mechanical, in Chinese with English Translation, 5 pages (publicly known at least as early as Aug. 2002).

Preface to the book "Structure, Installation, Connection and Protection of Communication Optical Fiber Cable," in Chinese with English Translation, 14 pages (Mar. 1992).

Schneider et al., "Fibre Optic Circuits," TechCon 2011 (10 pages).

Shahid, et al., "Flexible High Density Optical Circuits," National Fiber Optic Engineers Conference, 2001 Technical Proceedings.

Sugita et al., "SC-Type Single-Mode Optical Fiber Connectors," *Journal of Lightwave Technology*, vol. 7, No. 11, pp. 1689-1696 (Nov. 1989).

Tachikura et al., Newly Developed Optical Fiber Distribution System and Cable Management in Central Office, International Wire & Cable Symposium, Proceedings of the 50th IWCS, pp. 98-105.

\* cited by examiner

FIG. 9
FIG. 10
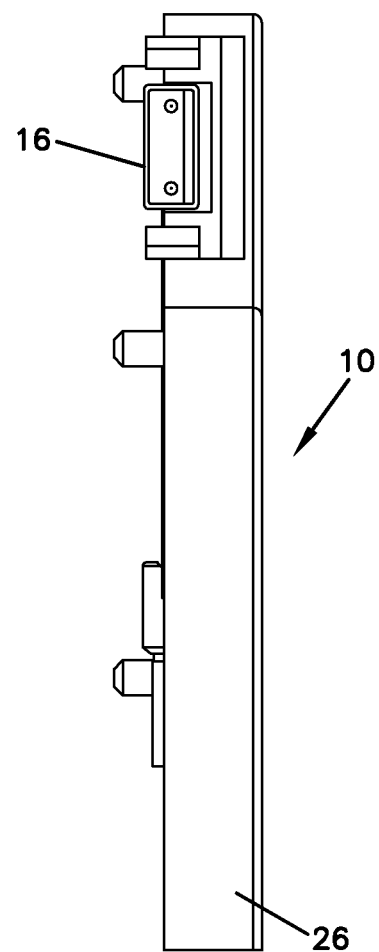
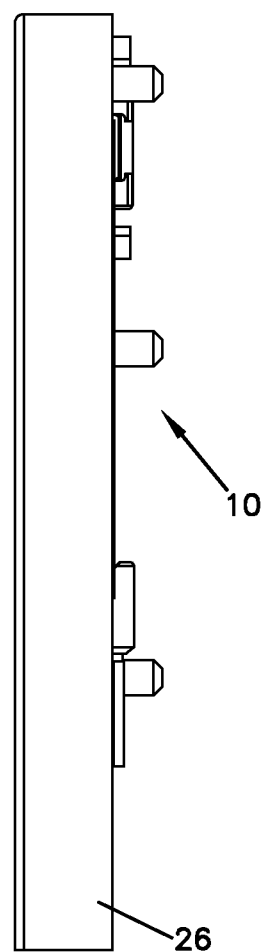

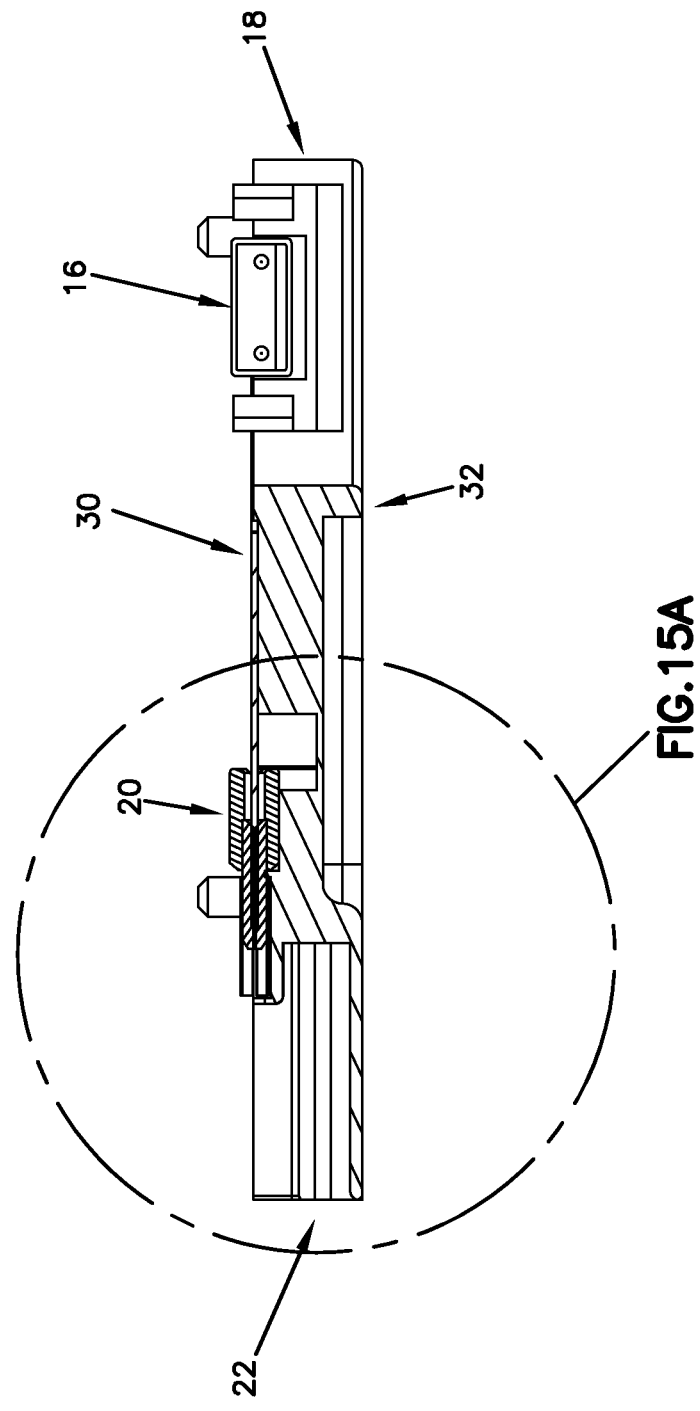

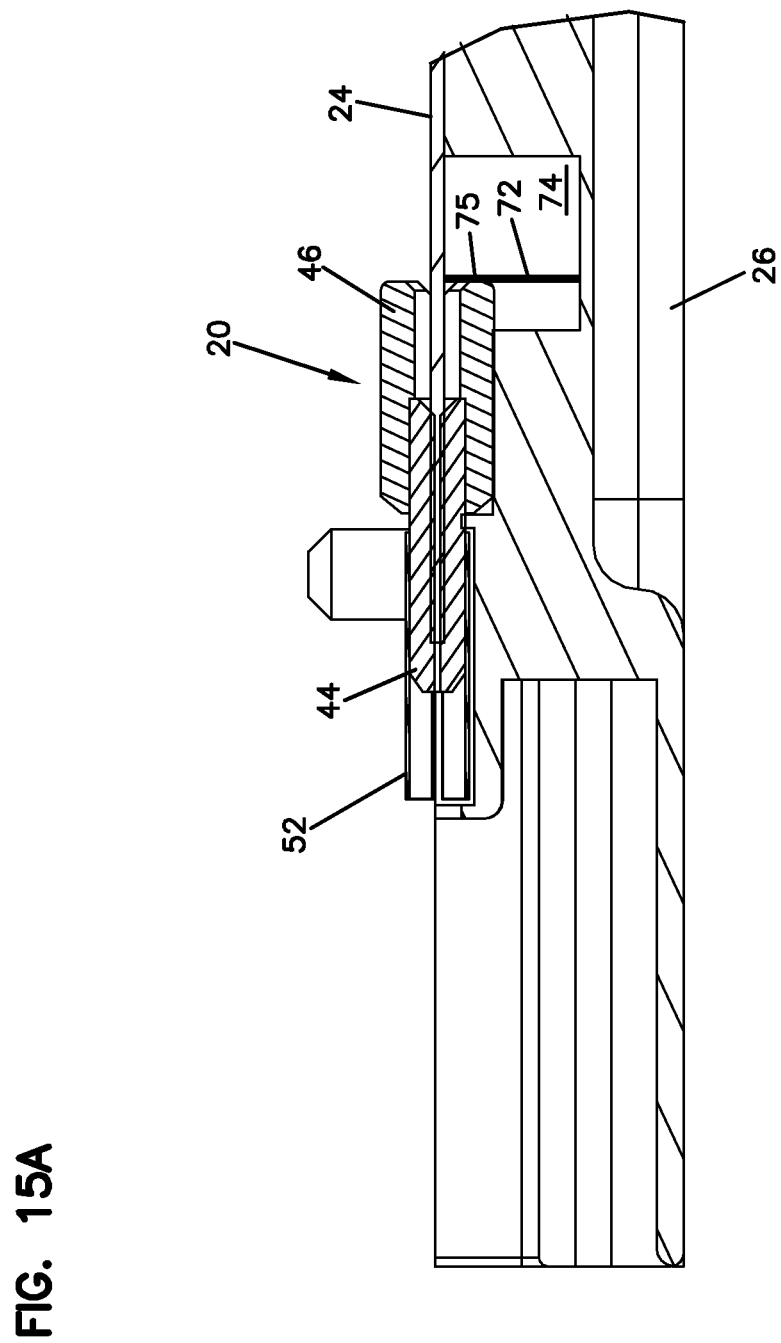

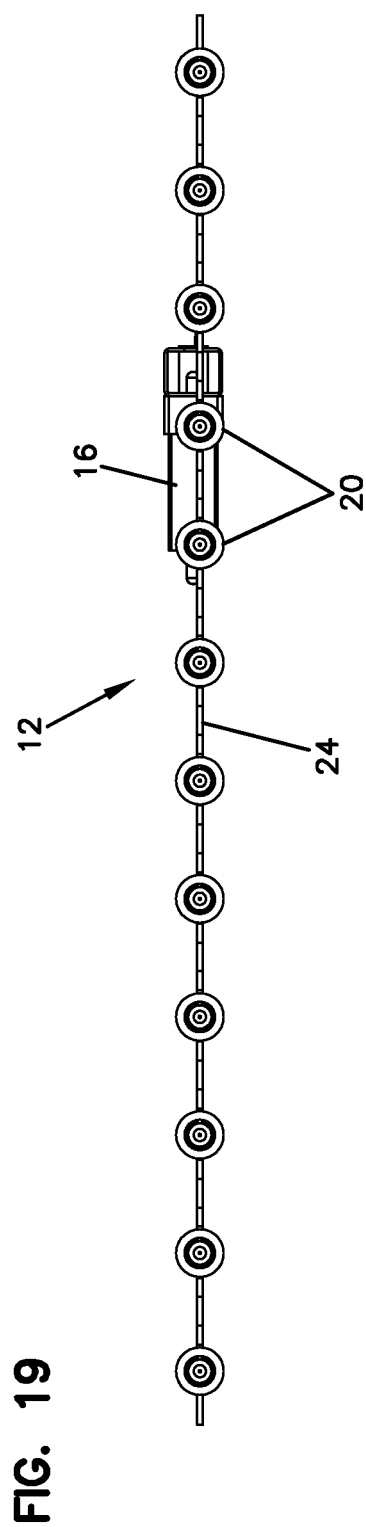
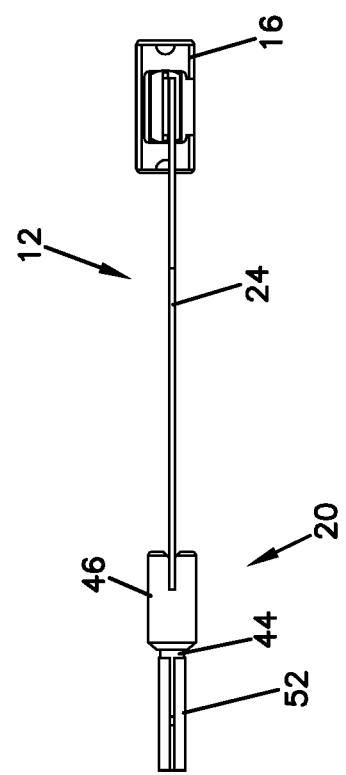
FIG. 19
FIG. 20

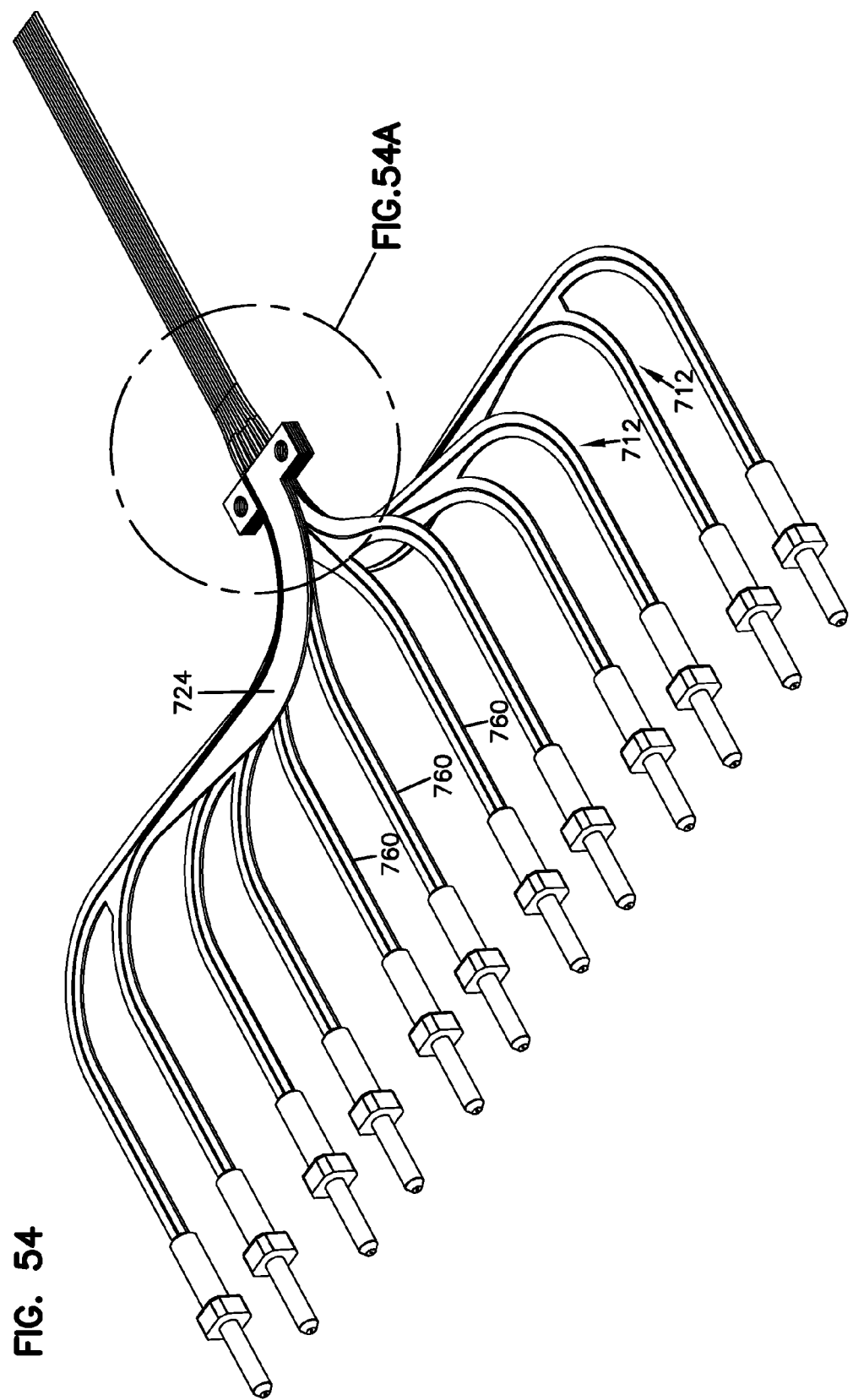

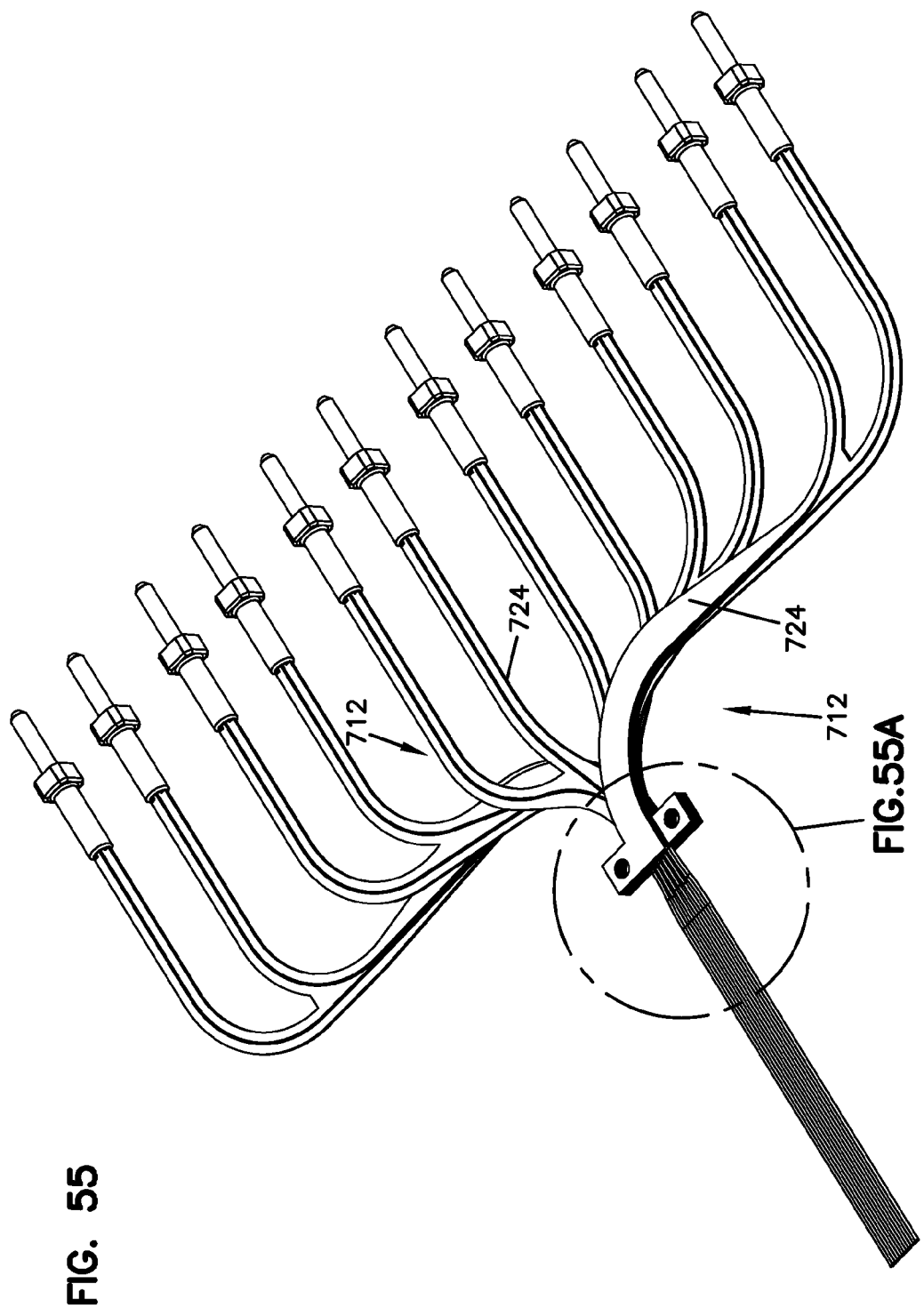

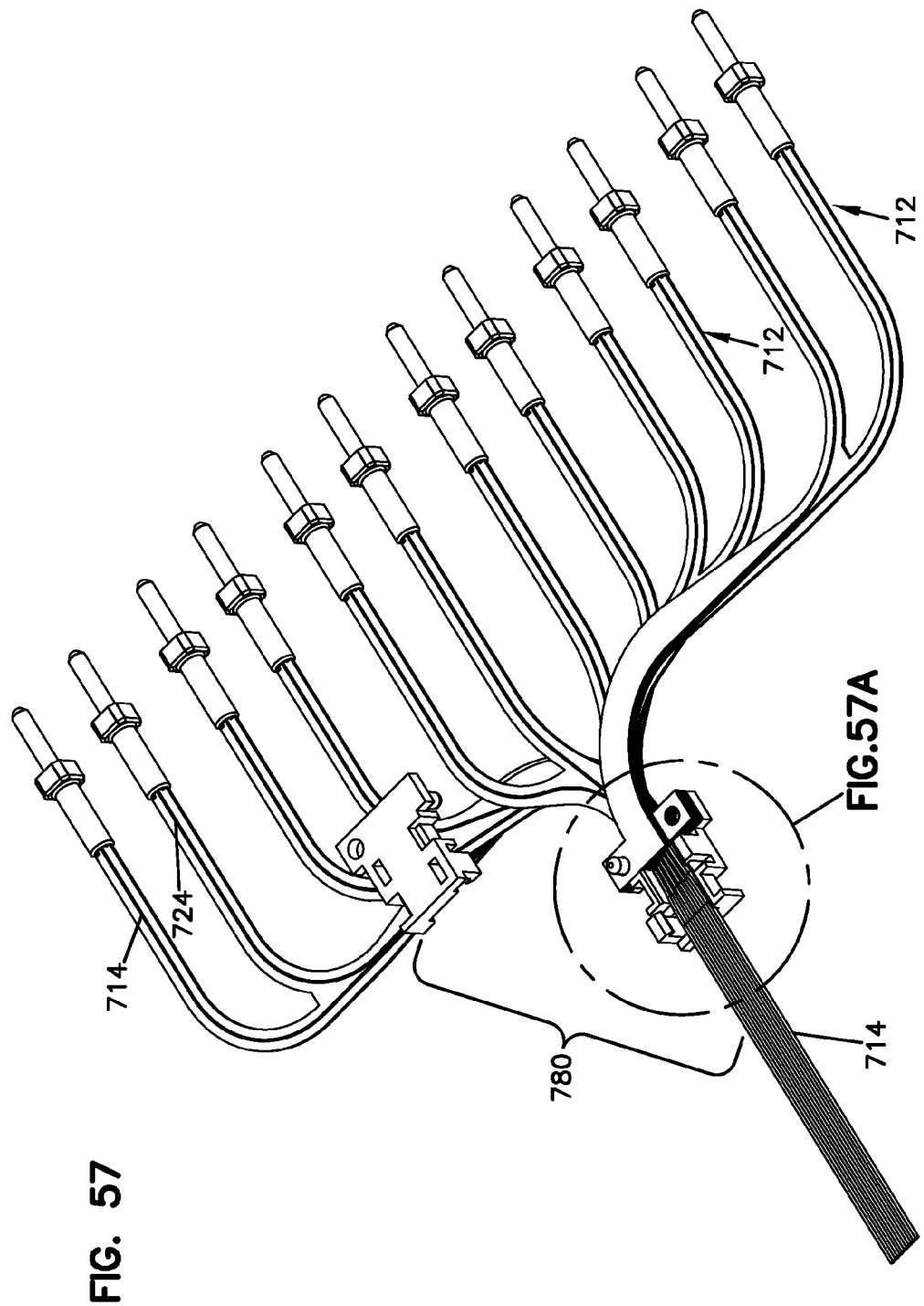

FLEXIBLE OPTICAL CIRCUIT, CASSETTES, AND METHODS

CROSS REFERENCE TO RELATED APPLICATIONS

This application claims the benefit of U.S. Provisional Application No. 61/710,519, filed Oct. 5, 2012, and titled "FLEXIBLE OPTICAL CIRCUIT, CASSETTES, AND METHODS," the disclosure of which is hereby incorporated herein by reference.

BACKGROUND OF THE INVENTION

As demand for telecommunications increases, fiber optic networks are being extended in more and more areas. Management of the cables, ease of installation, and ease of accessibility for later management are important concerns. As a result, there is a need for fiber optic devices which address these and other concerns.

SUMMARY

An aspect of the present disclosure relates to fiber optic devices in the form of fiber optic cassettes that include at least one connector that provides a signal entry location and at least one connector that provides a signal exit location and a flexible fiber optical circuit therein between for relaying the signal from the entry location to the exit location. The cassette can have many forms. The cassette is optional, if desired to use the flexible fiber optical circuit in other equipment.

Another aspect of the present disclosure relates to a fiber optic cassette including a body defining a front and an opposite rear. A cable entry location is defined on the body for a cable to enter the cassette, wherein a plurality of optical fibers from the cable extend into the cassette and form terminations at one or more connectors adjacent the front of the body. A flexible substrate is positioned between the cable entry location and the connector adjacent the front of the body, the flexible substrate rigidly supporting the plurality of optical fibers. Each connector adjacent the front of the body includes a ferrule. A connector at the rear also includes a ferrule. Single fiber connectors or multi-fiber connectors can be used. Also, various combinations of the front, the rear, the sides, the top and the bottom of the cassette can be used for the connectors, as desired. For example, only front access is possible.

According to another aspect of the present disclosure, a method of assembling a fiber optic cassette includes providing a body, mounting a multi-fiber connector terminated to a multi-fiber cable to the body, fixedly supporting the plurality of the optical fibers extending from the multi-fiber connector on a flexible substrate, and terminating only a portion of the plurality of optical fibers supported by the flexible substrate with another multi-fiber connector that includes a ferrule. Dark fibers on the flexible substrate fill any unused holes in the ferrules of the multi-fiber connectors.

According to another aspect of the present disclosure, a flexible optical circuit includes a flexible substrate and a plurality of optical fibers physically supported by the flexible substrate, wherein a first end of each of the optical fibers is terminated to a multi-fiber connector that is coupled to the flexible substrate and a second end of each of the optical fibers is terminated to another fiber optic connector that is coupled to the flexible substrate, the other fiber optic connector including a ferrule. Dark fibers can be used. Fibers can be separated and connected to different connectors. Multiple layers of the flexible optical circuit can be provided, as desired.

One aspect of the present invention includes using multi-fiber connectors to connect to other multi-fiber connectors.

Another aspect of the present invention includes using multi-fiber connectors connected to a flexible foil wherein some of the fibers in the connectors are inactive, or dark. The flexible foil includes fiber stubs integral with the flexible foil which fill the multi-fiber connectors with the desired inactive fibers.

Another aspect of the present invention relates to utilizing multi-foil layers in combination with a multi-fiber connector.

A further aspect of the present invention includes using multilayers of flexible foils and connectors with multiple rows of fibers. In some cases, the fibers from different layers can be mixed with different rows of the connectors.

According to another aspect of the present invention, some fibers on the flexible foils can be passed through to other connectors and other fibers can be looped back to the same connector or another connector for transfer of signal to another connector.

According to another aspect of the present invention, the flexible foils can be used to manage the optical fibers wherein certain of the connectors of a cassette are positioned in more accessible locations. For example, instead of a front to rear arrangement, some of the connectors can be positioned on the side of the cassette to permit improved technician access.

According to another aspect of the present invention, multiple flexible foils can be used with a single fiber connector wherein the foils are connected to different sources, such as an Ethernet source, and a system control source.

A further aspect of the present invention relates to utilizing a 12 multi-fiber connector having one or more rows of 12 fibers, and a flexible foil in combination with additional multi-fiber connectors. In one embodiment, the fibers of multiple connectors are combined to connect to a second connector. For example, from a 12 fiber 10 Gigabit Ethernet channel connector which uses twelve fibers can be connected to a 40 Gigabit Ethernet channel connector wherein only 8 fibers are used. In such an arrangement, 4 of the fibers, typically the middle 4 fibers, can be dark fibers, or can be utilized by connection to a different source. In such an arrangement, three 40 Gigabit Ethernet connectors can be connected to two 10 Gigabit ethernet connectors, and the additional fibers of the 40 Gigabit Ethernet connectors can be dark fibers, or connected to an alternate source. In this example, eight fibers from a first connector and four fibers from a second connector are routed on the flexible foil to one connector, and eight fibers from a third connector and four fibers from the second connector are routed to another connector. The arrangement is a 3 to 2 connector cable arrangement, making use of twelve fiber connectors (or multiples of 12).

In the case of a 100 Gigabit Ethernet connector, two rows of 12 fibers in the connector can be provided wherein 10 pairs are utilized for signal transmission. The outer fibers of each row are not utilized, and can be dark fibers on the flexible foil, or can be connected to an alternate source.

A variety of additional inventive aspects will be set forth in the description that follows. The inventive aspects can relate to individual features and combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

FIG. 9 is a right side view of the fiber optic cassette of FIG. 1;

FIG. 10 is a left side view of the fiber optic cassette of FIG. 1;

FIG. 15 is a cross-sectional view taken along line 15-15 of FIG. 7;

FIG. 15A is a close-up view showing the internal features of one of the ferrule assemblies of the flexible optical circuit placed within the cassette of FIG. 1;

FIG. 19 is a front elevational view of the flexible optical circuit of FIG. 16;

FIG. 20 is a left side view of the flexible optical circuit of FIG. 16;

FIG. 54 illustrates a top, front, right side perspective view of the plurality of duplex flexible optical circuits of FIG. 53 in a stacked arrangement;

FIG. 55 illustrates a top, rear, left side perspective view of the plurality of duplex flexible optical circuits of FIG. 53 in a stacked arrangement;

FIG. 57 is a top, rear, left side exploded perspective view of the clamp structure of FIG. 56, the clamp structure shown with the stack of the duplex flexible optical circuits placed therein;

DETAILED DESCRIPTION

Figure 1:
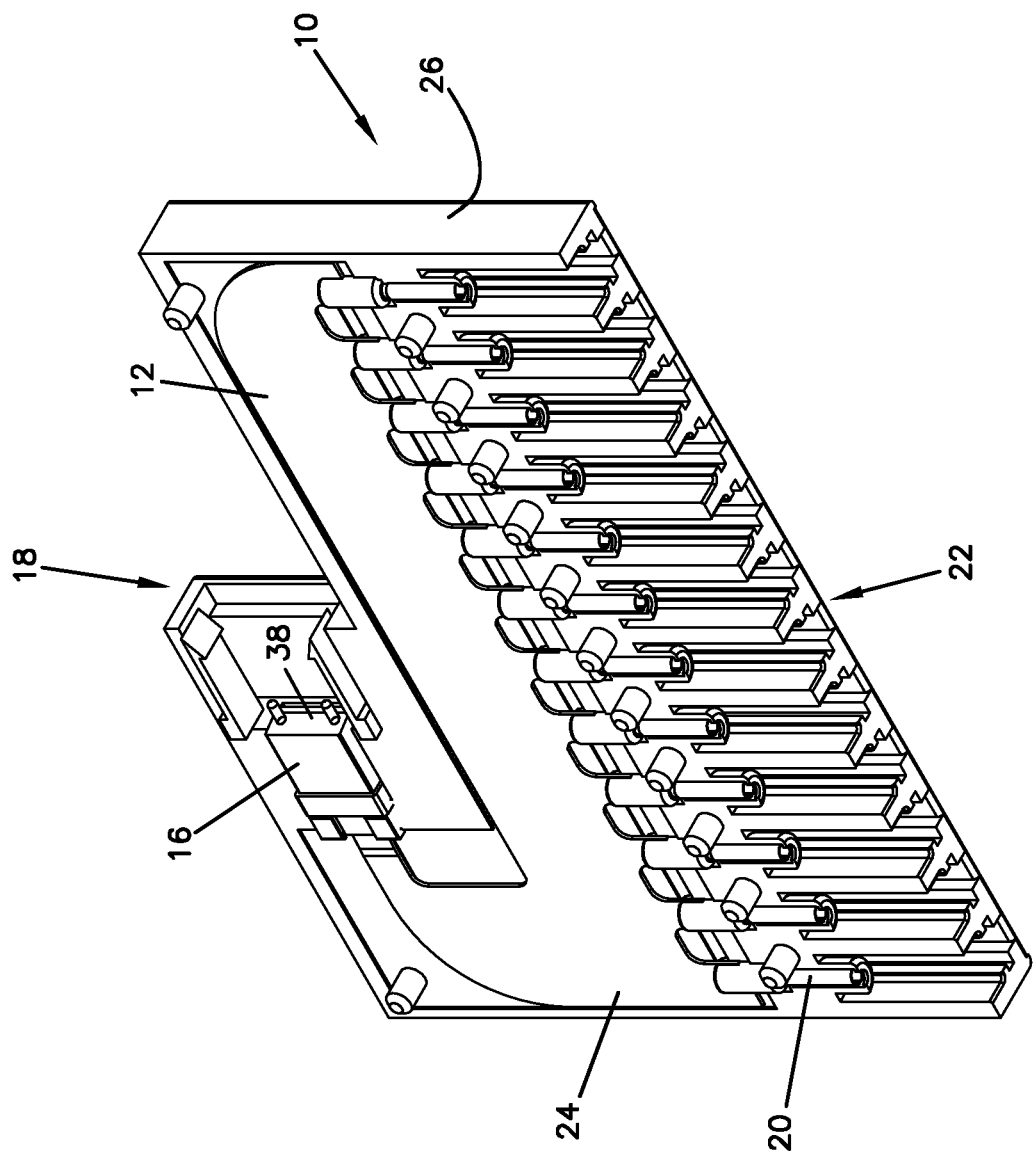
FIG. 1 is a top, front, right side perspective view of a fiber optic cassette having features that are examples of inventive aspects in accordance with the present disclosure.
Figure 2:
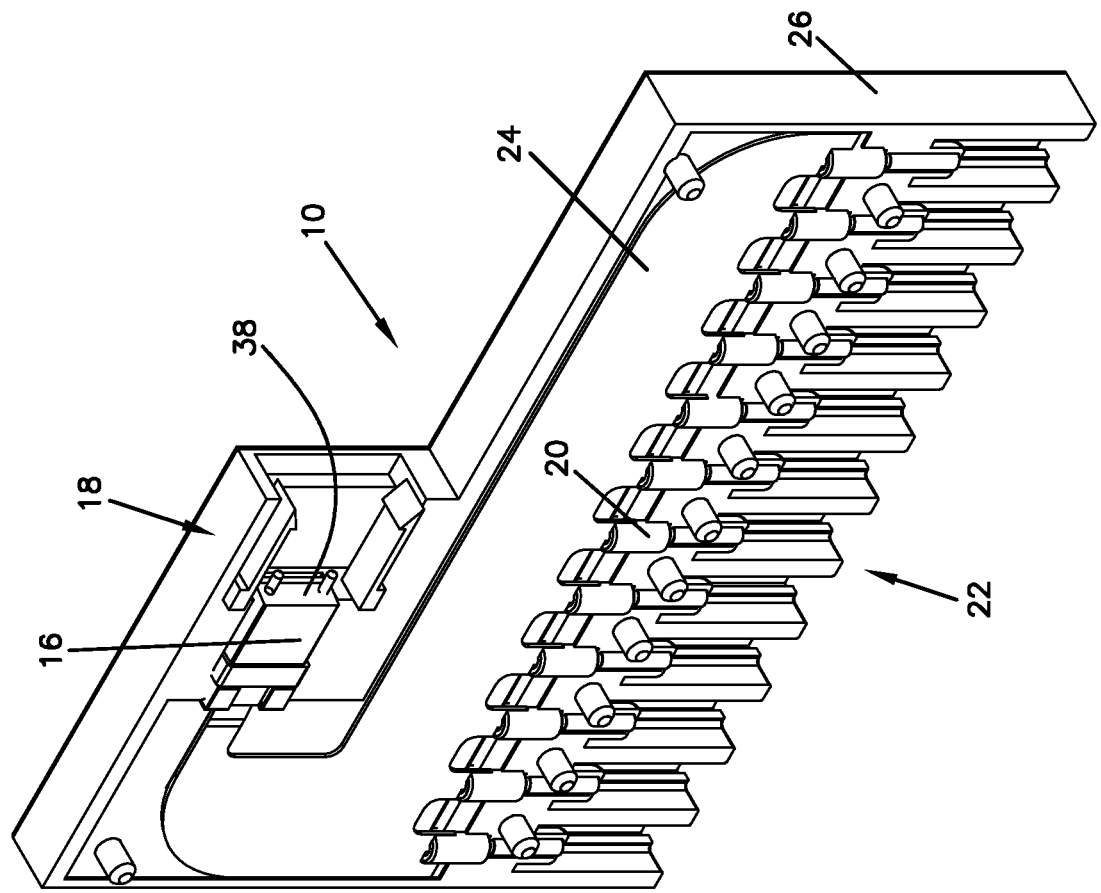
FIG. 2 is a top, rear, right side perspective view of the fiber optic cassette of FIG. 1.
Figure 3:
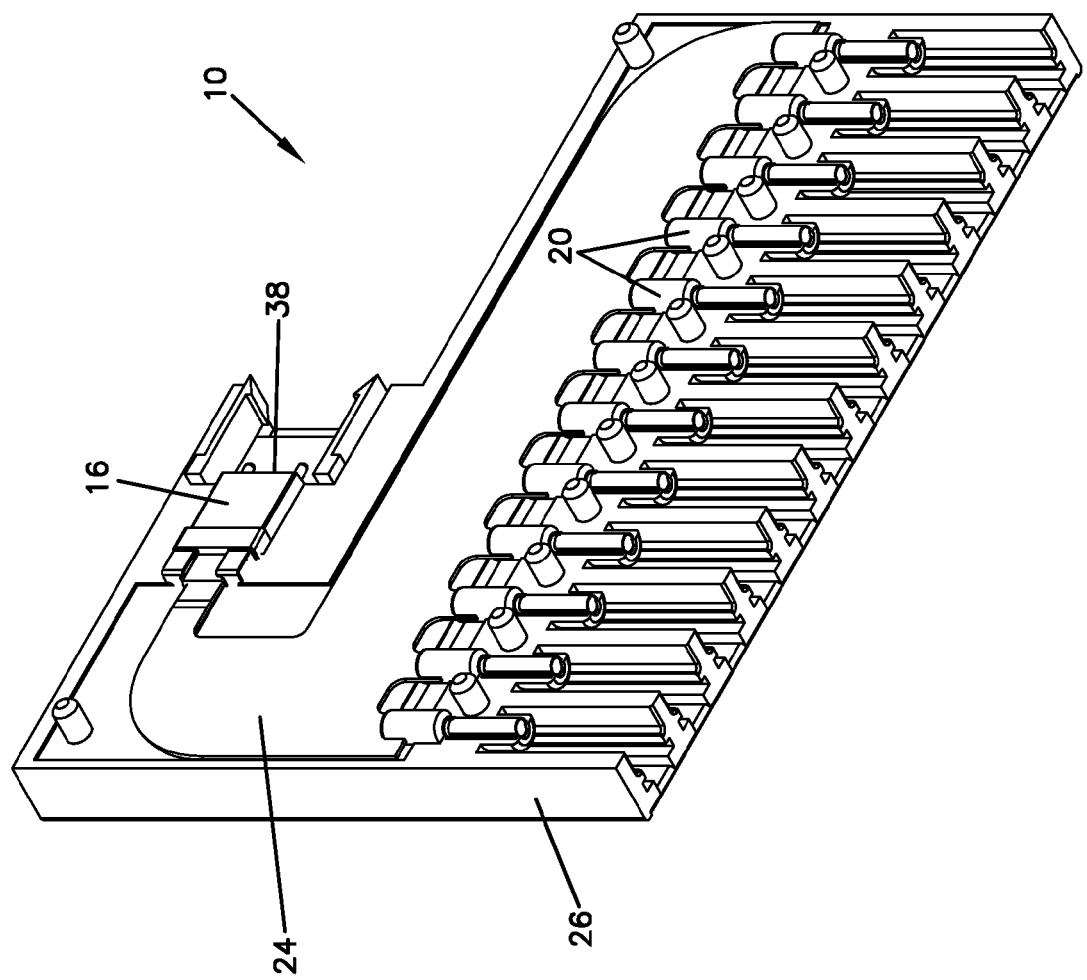
FIG. 3 is a top, front, left side perspective view of the fiber optic cassette of FIG. 1.
Figure 4:
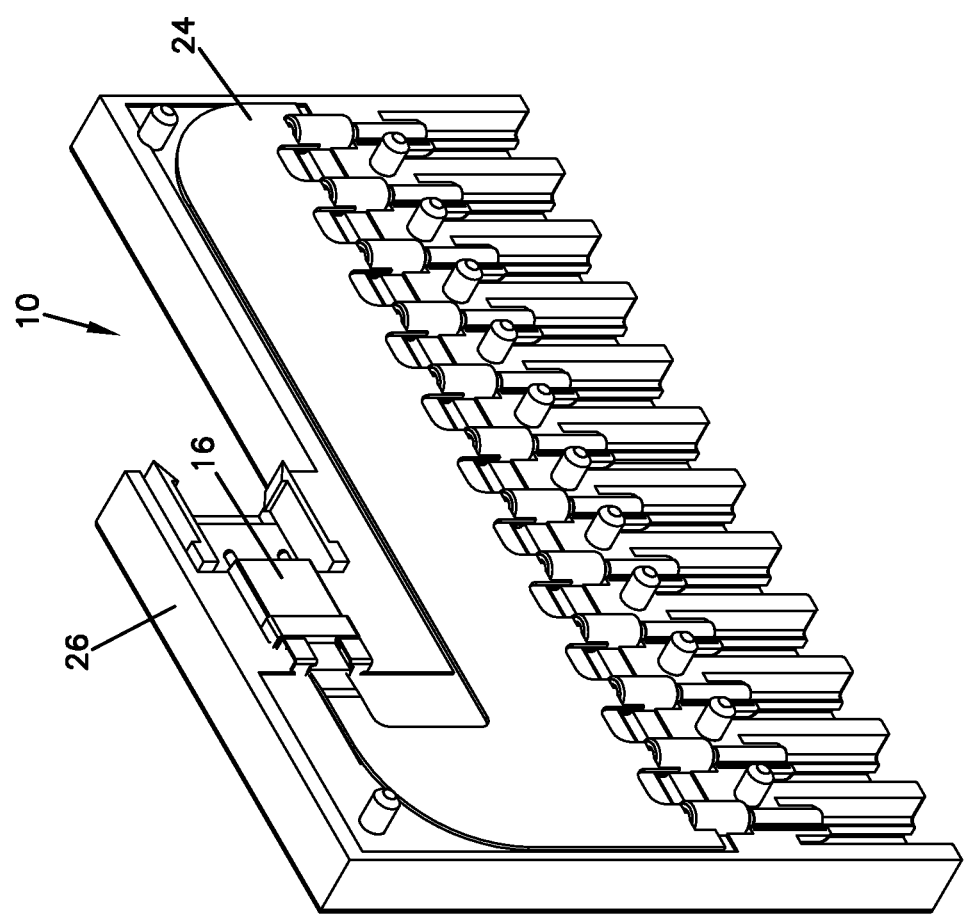
FIG. 4 is a top, rear, left side perspective view of the fiber optic cassette of FIG. 1.
Figure 5:
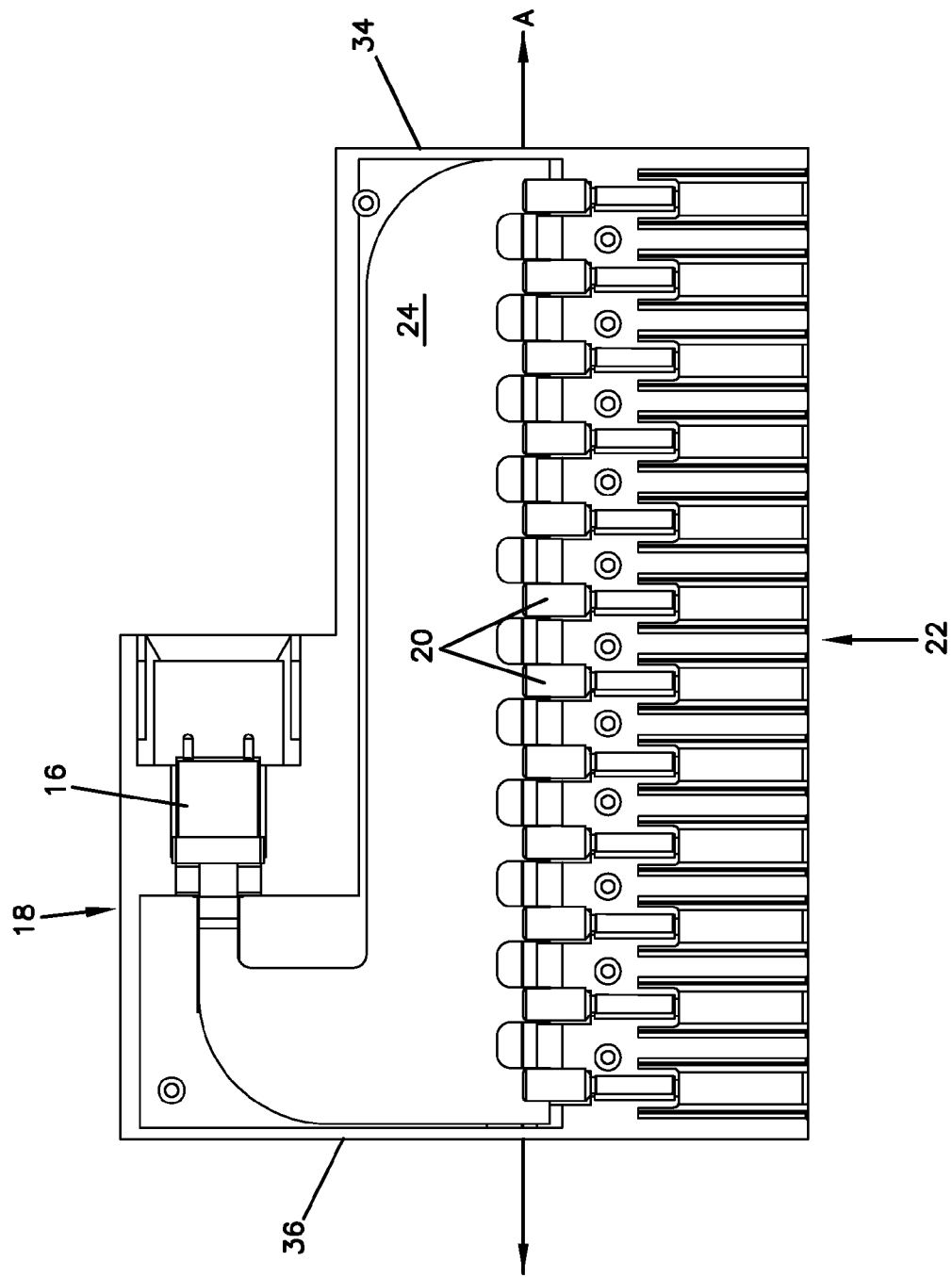
FIG. 5 is a top plan view of the fiber optic cassette of FIG. 1.
Figure 6:
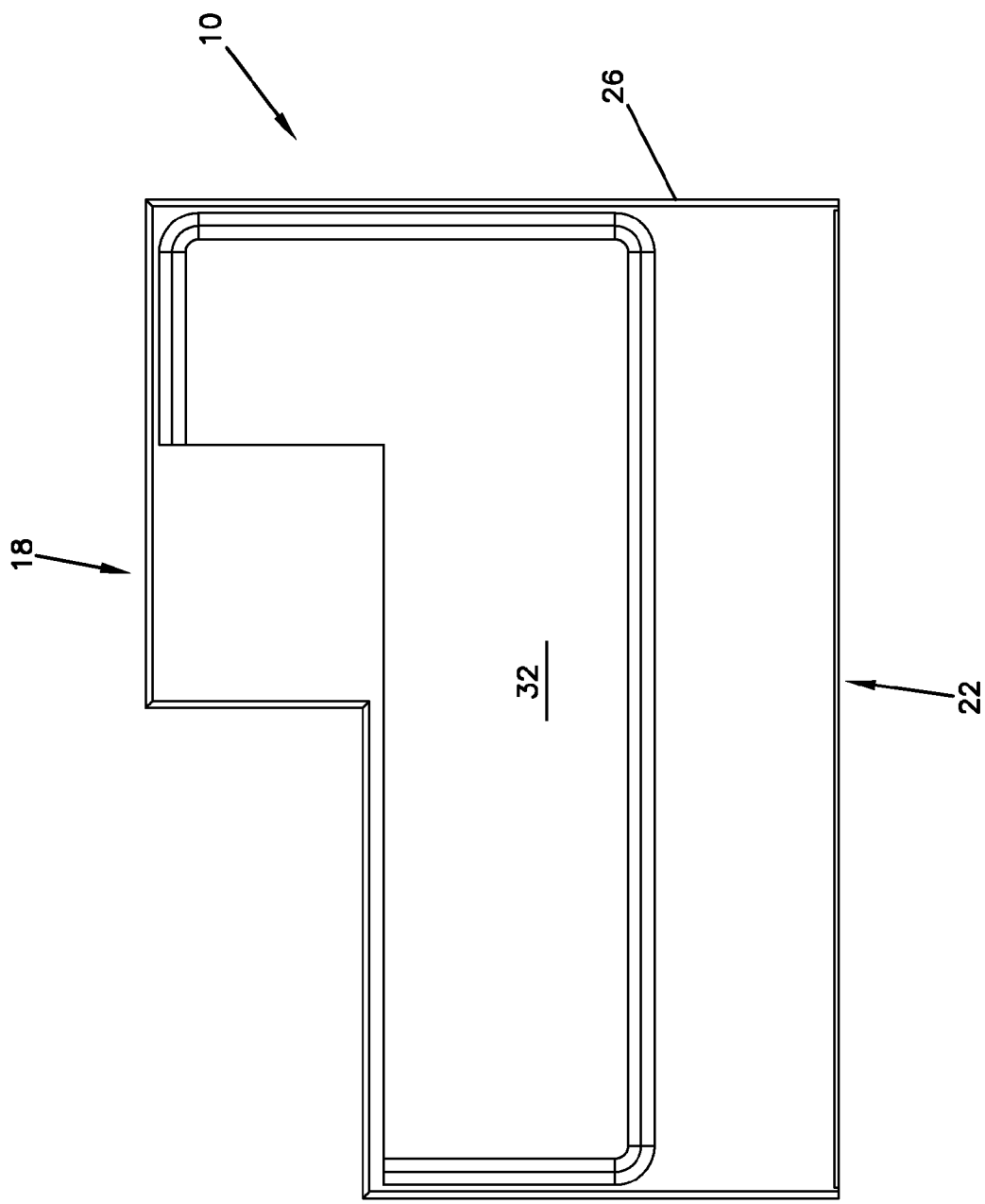
FIG. 6 is a bottom plan view of the fiber optic cassette of FIG. 1.
Figure 7:
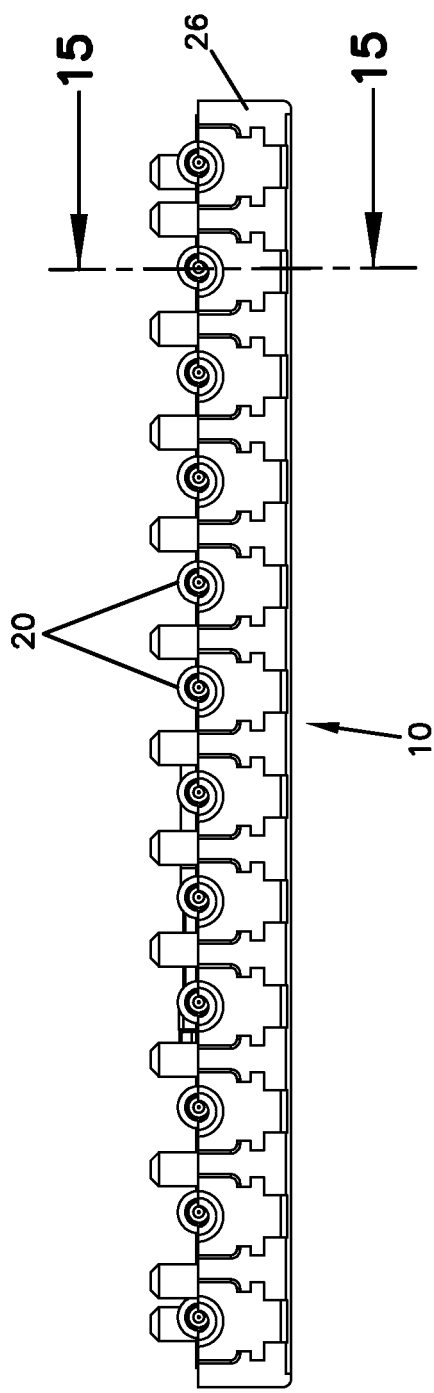
FIG. 7 is a front elevational view of the fiber optic cassette of FIG. 1.
Figure 8:
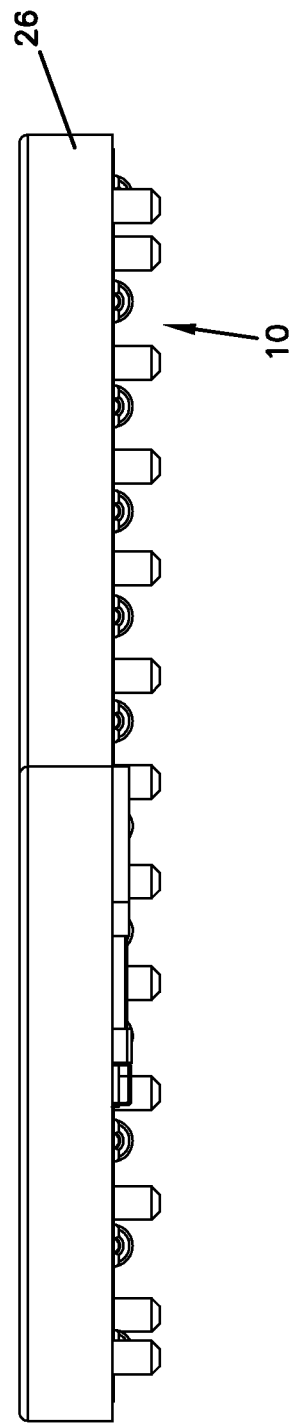
FIG. 8 is a rear elevational view of the fiber optic cassette of FIG. 1.
Figure 11:
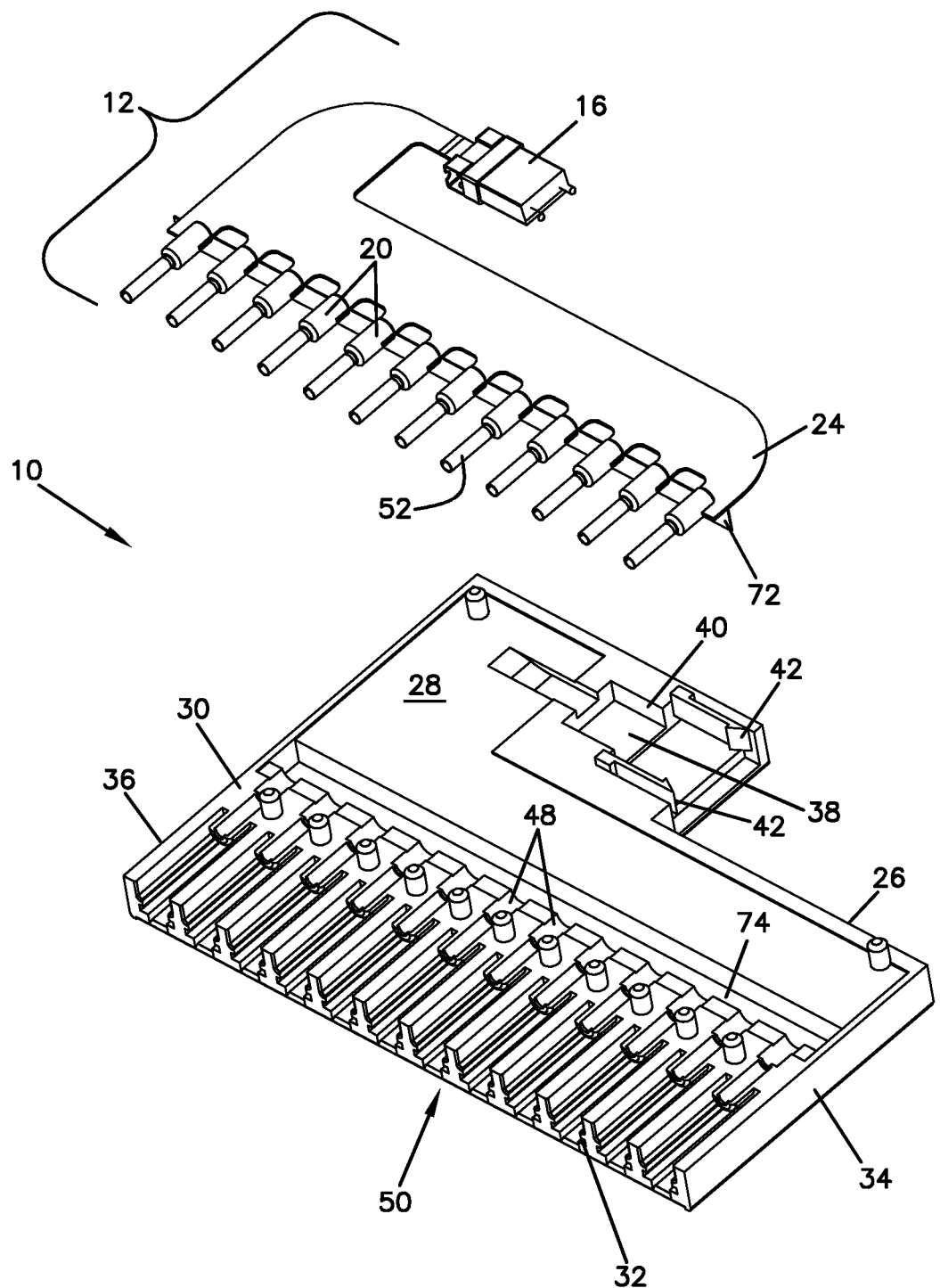
FIG. 11 is a partially exploded perspective view of the fiber optic cassette of FIG. 1.
Figure 12:
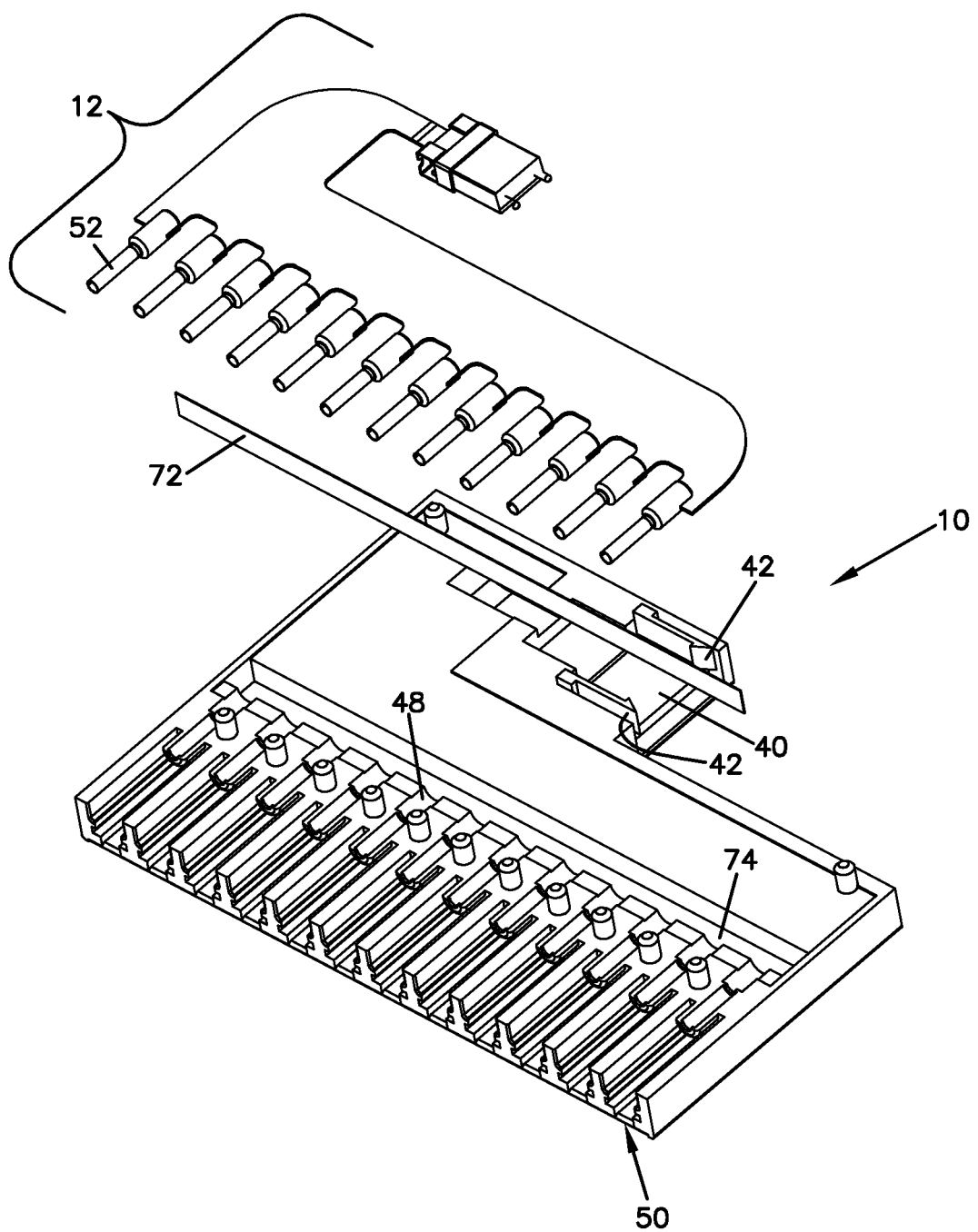
FIG. 12 is another partially exploded perspective view of the fiber optic cassette of FIG. 1.
Figure 13:
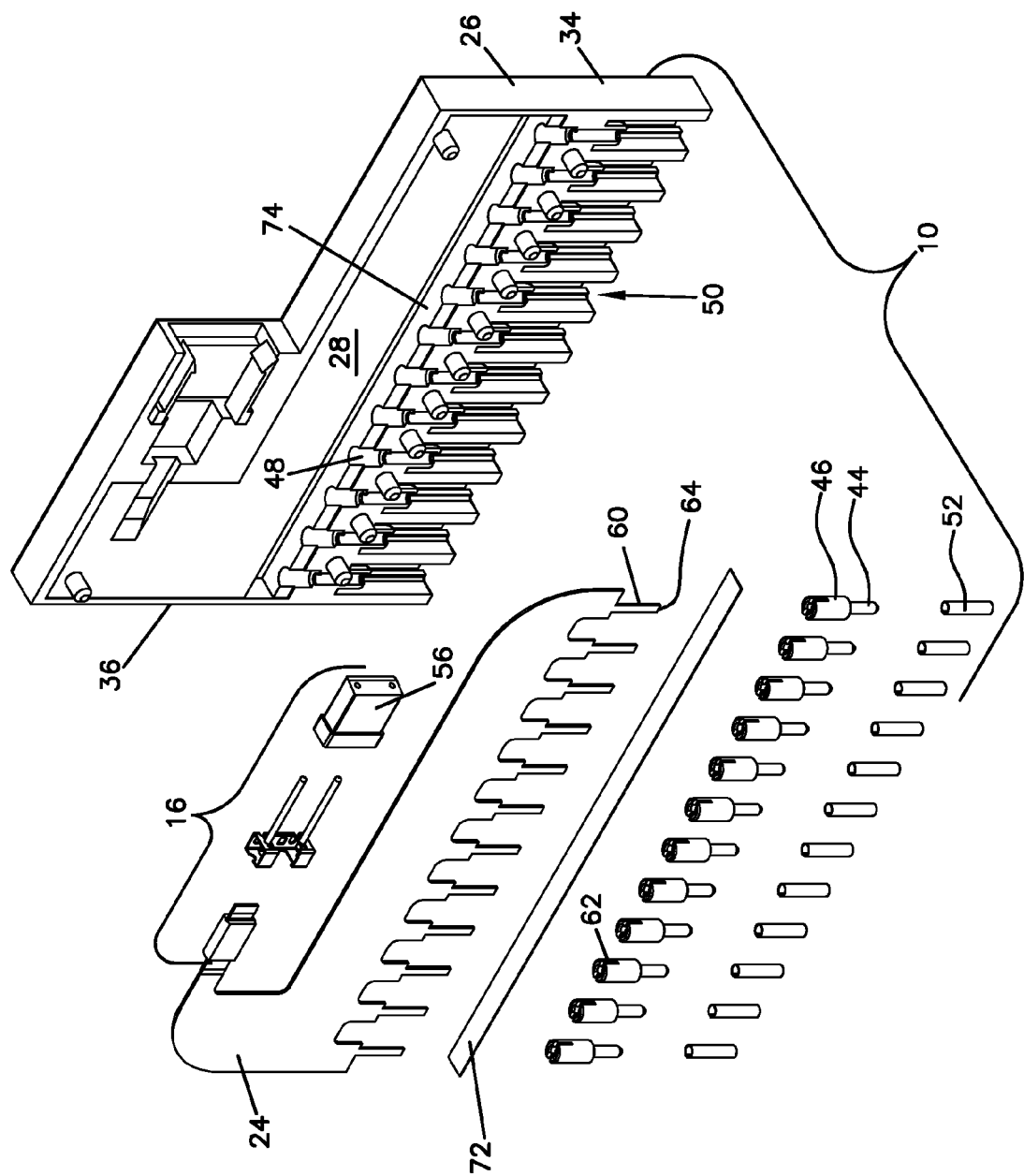
FIG. 13 is a fully exploded perspective view of the fiber optic cassette of FIG. 1.
Figure 14:
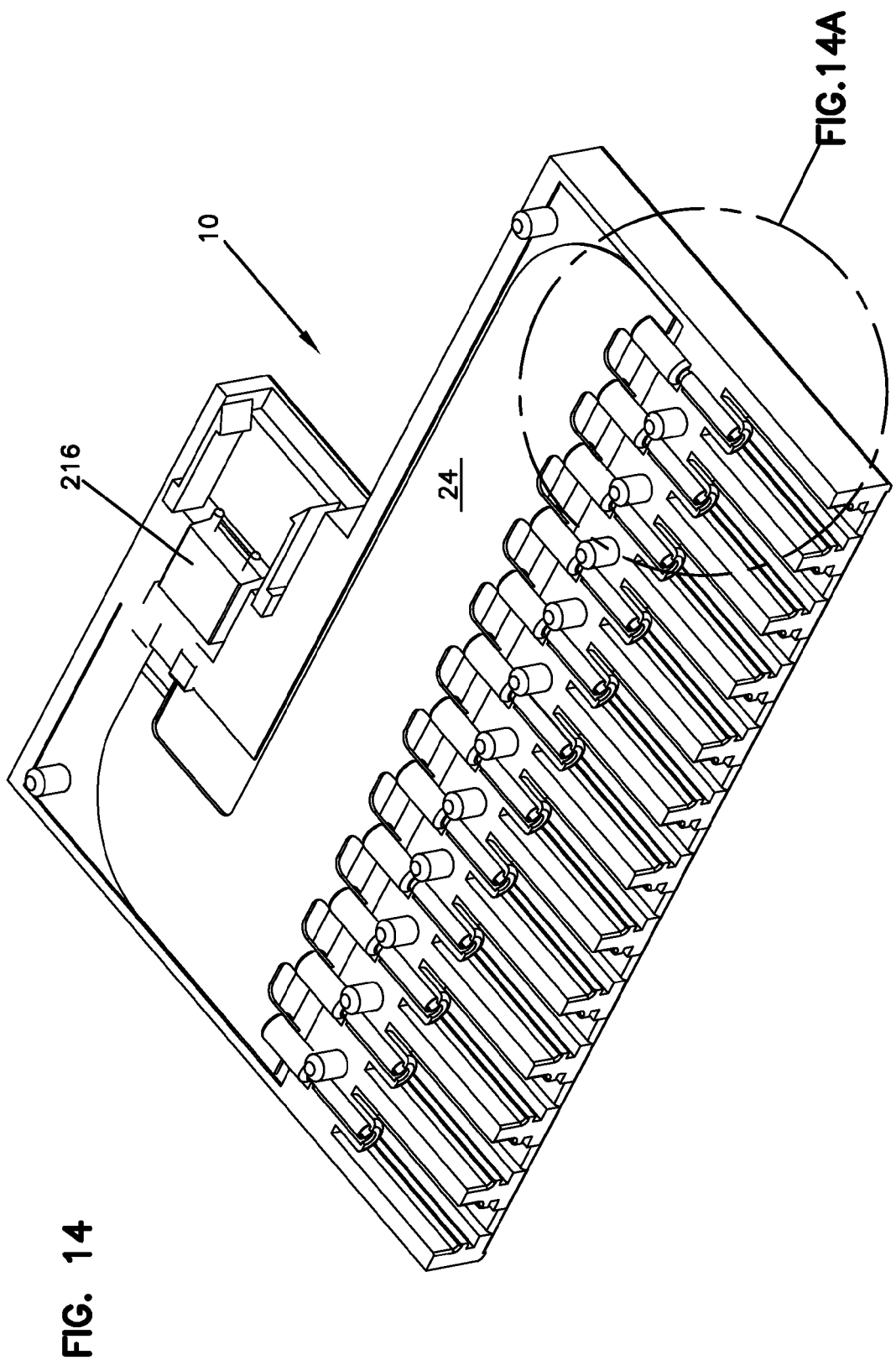
FIG. 14 is another top, front, right side perspective view of the fiber optic cassette of FIG. 1.
Figure 14A:
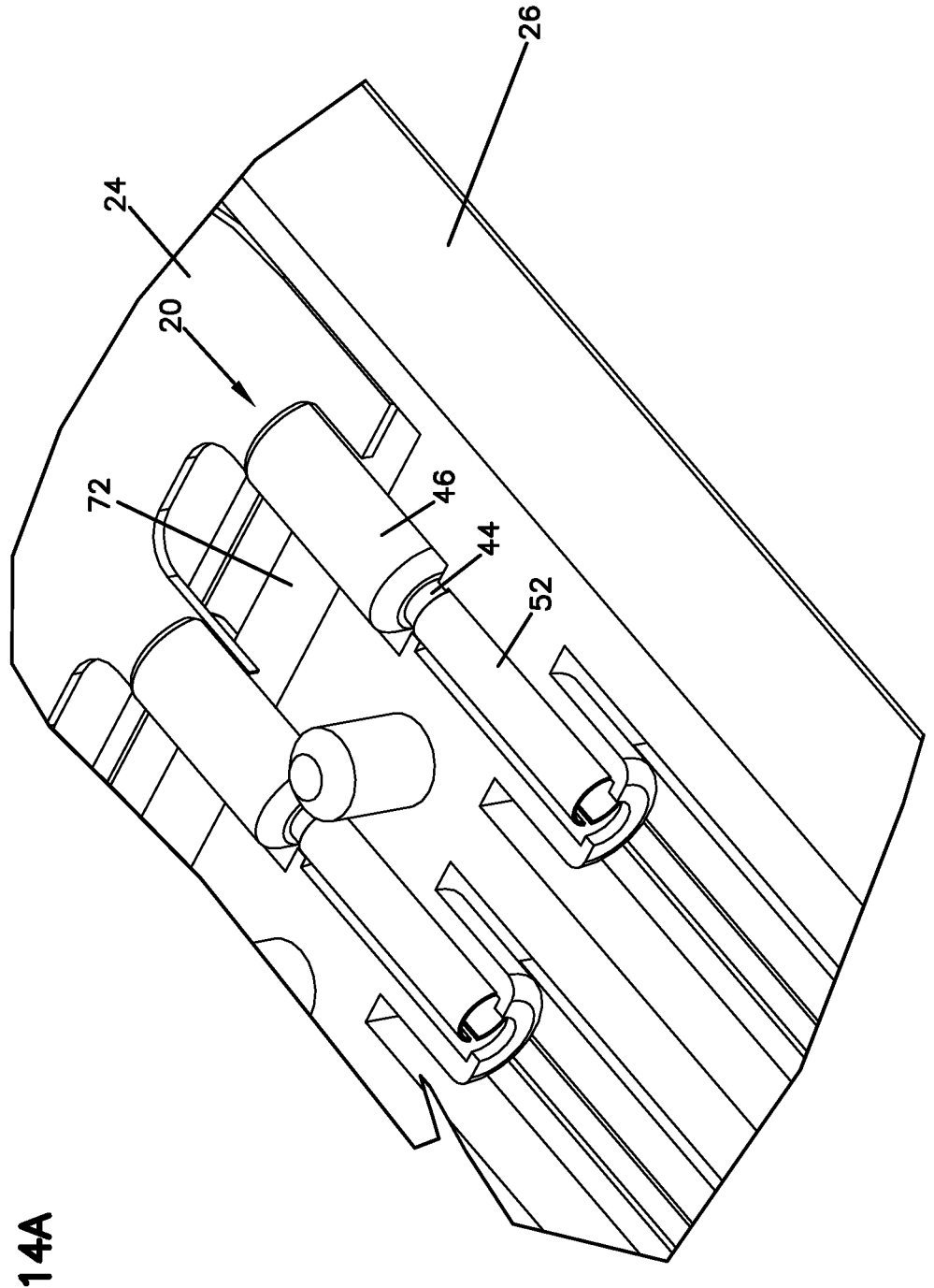
FIG. 14A is a close-up view illustrating the ferrule assemblies of the flexible optical circuit placed within the body of the cassette of FIG. 1.
Figure 16:
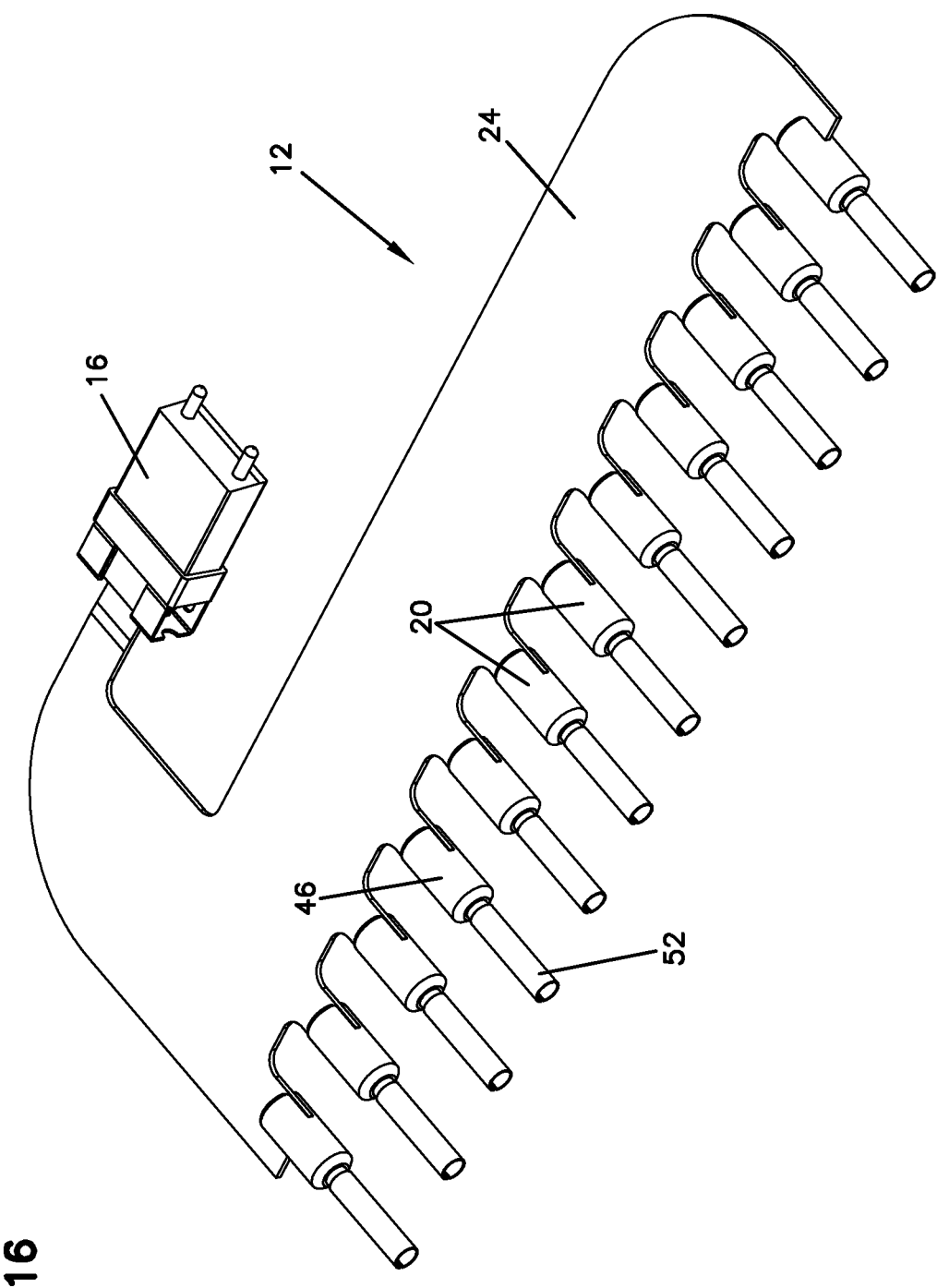
FIG. 16 is a top, front, right side perspective view of the flexible optical circuit of the fiber optic cassette of FIG. 1.
Figure 17:
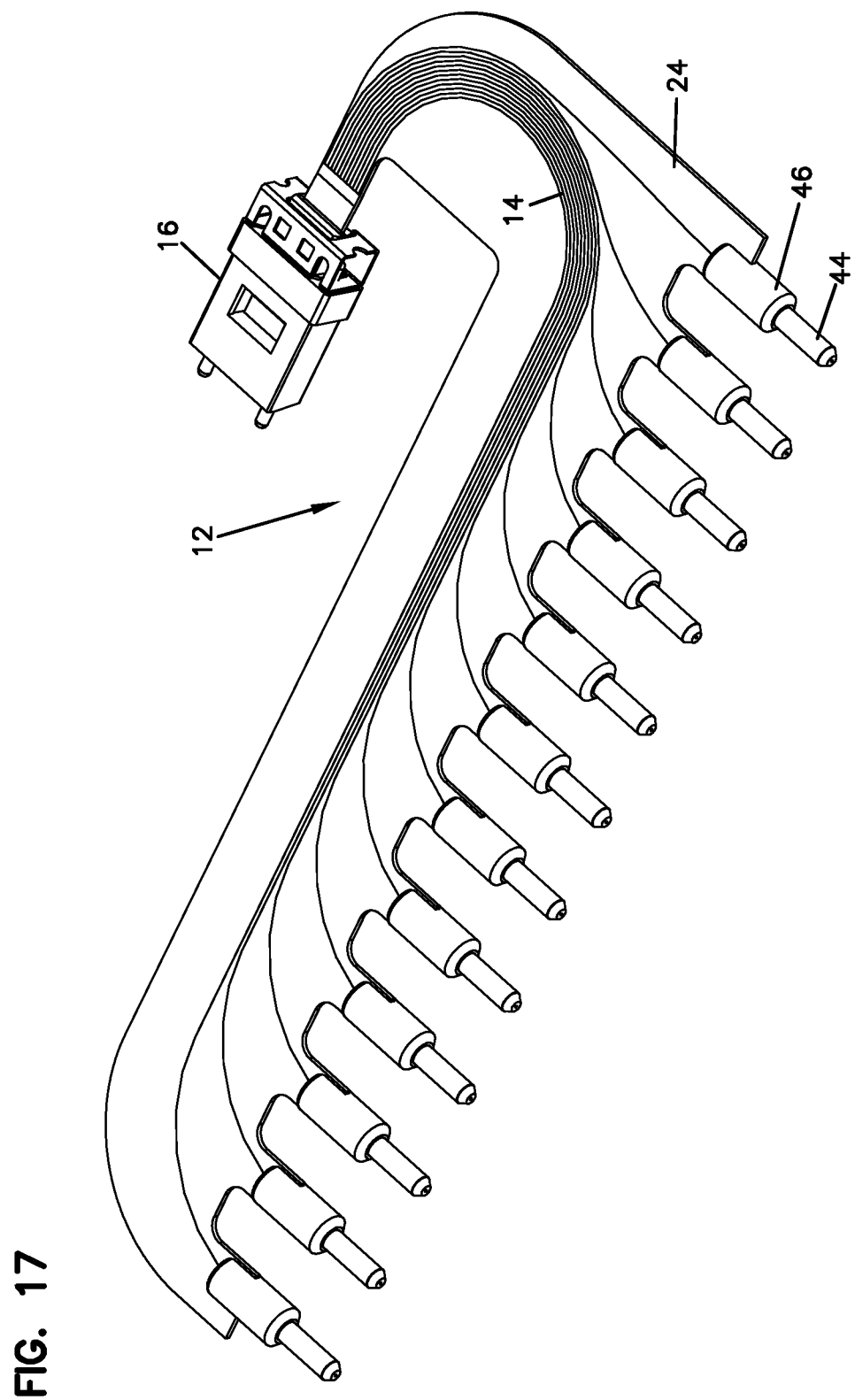
FIG. 17 is a bottom, front, left side perspective view of the flexible optical circuit of FIG. 16.
Figure 18:
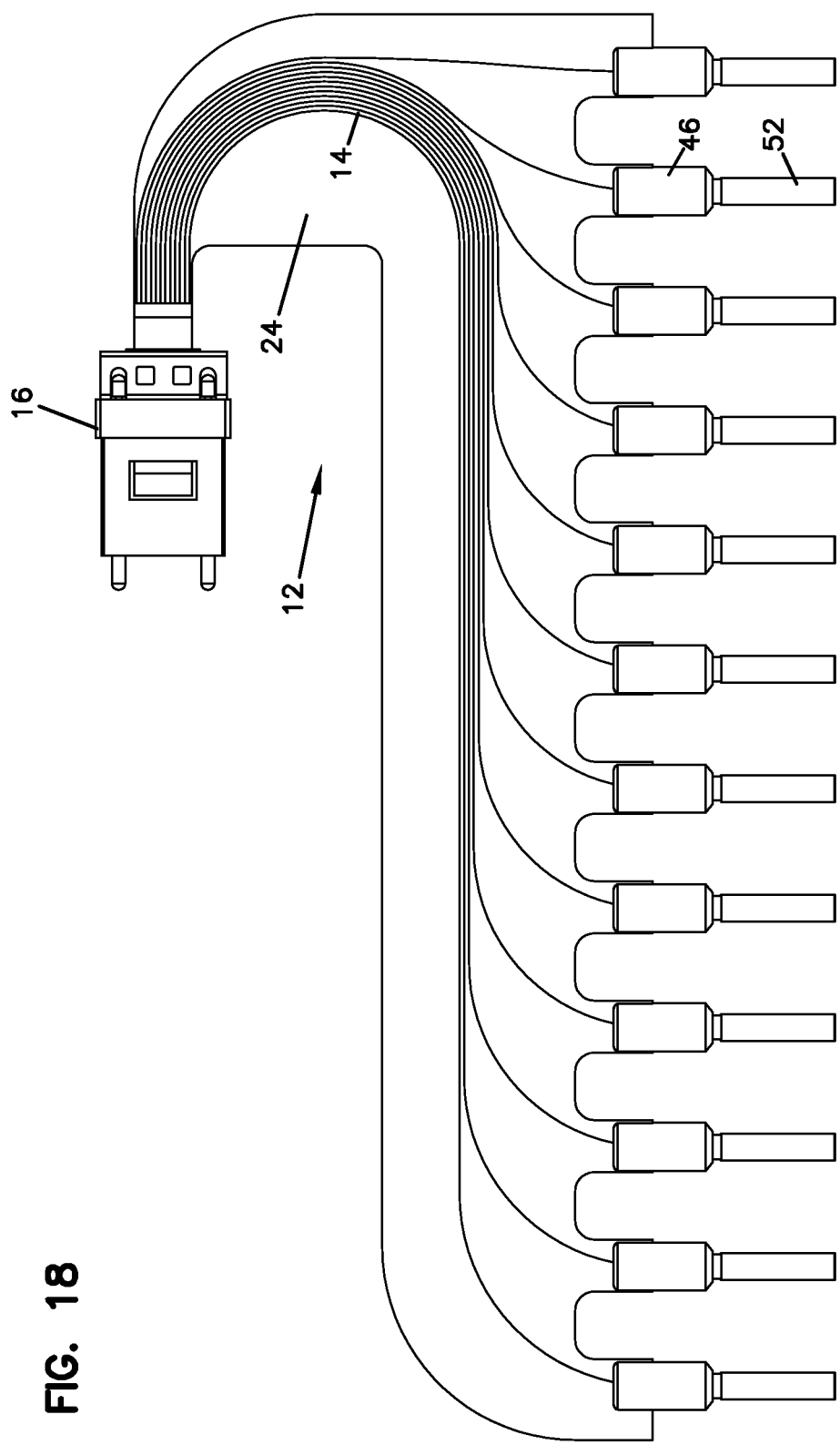
FIG. 18 is a bottom plan view of the flexible optical circuit of FIG. 16.
Figure 21:
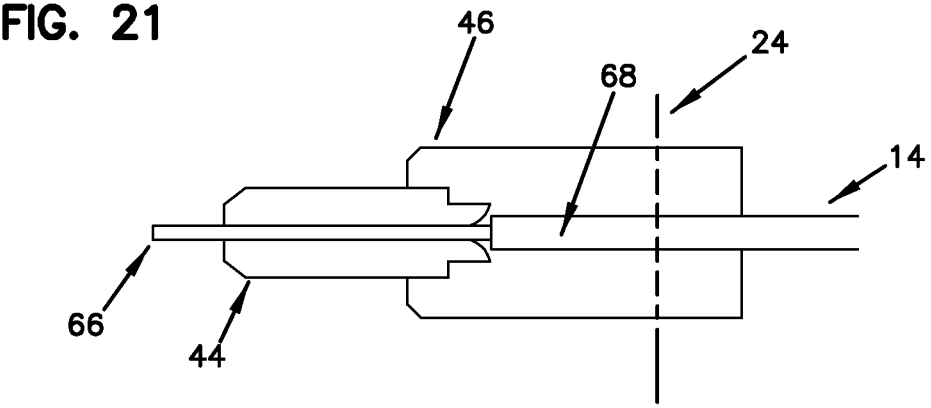
FIG. 21 is a diagrammatic view illustrating a top cross-sectional view of one of the ferrule assemblies of the flexible optical circuit placed within the cassette of FIG. 1, the cross-section taken by bisecting the ferrule assembly along its longitudinal axis.
Figure 22:
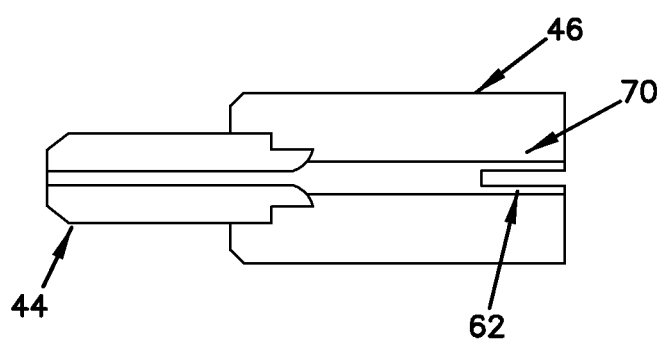
FIG. 22 is a diagrammatic view illustrating a side cross-sectional view of the ferrule assembly of FIG. 21, the cross-section taken by bisecting the ferrule assembly along its longitudinal axis.
Figure 23:
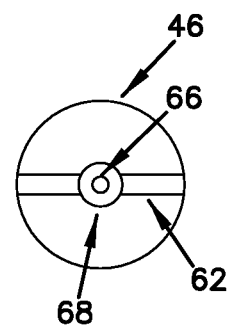
FIG. 23 is a diagrammatic view illustrating the ferrule assembly of FIG. 21 from the rear side.
Figure 24:
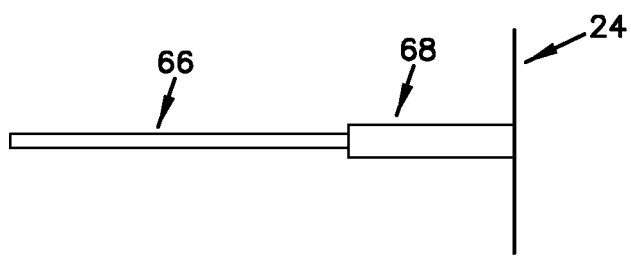
FIG. 24 is a diagrammatic view illustrating a side view of one of the pigtails extending from the substrate of the flexible optical circuit to be terminated to the ferrule assembly of FIG. 21.
Figure 25:
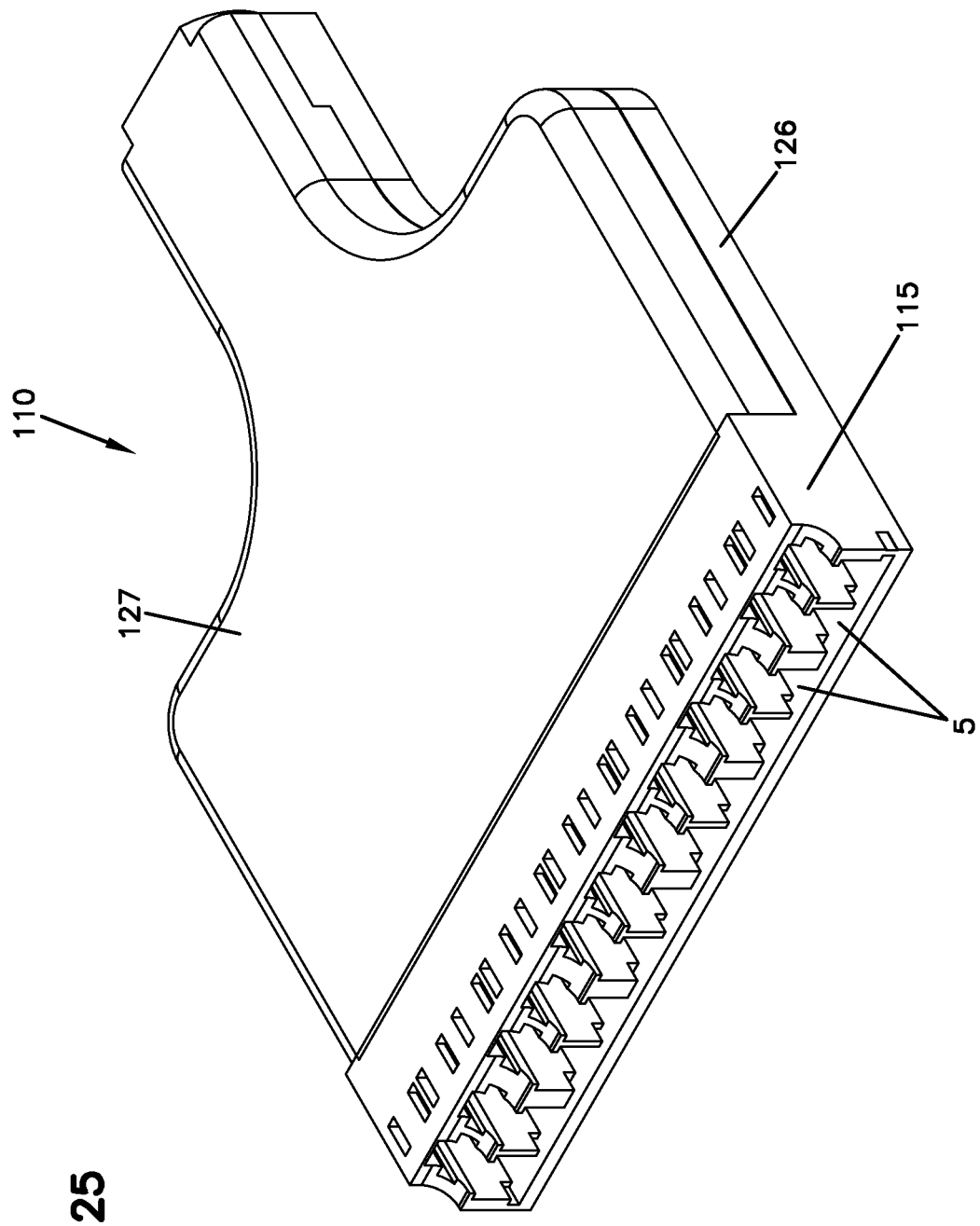
FIG. 25 is a top, front, right side perspective view of a second embodiment of a fiber optic cassette having features that are examples of inventive aspects in accordance with the present disclosure, the fiber optic cassette shown in a fully-assembled configuration.
Figure 26:
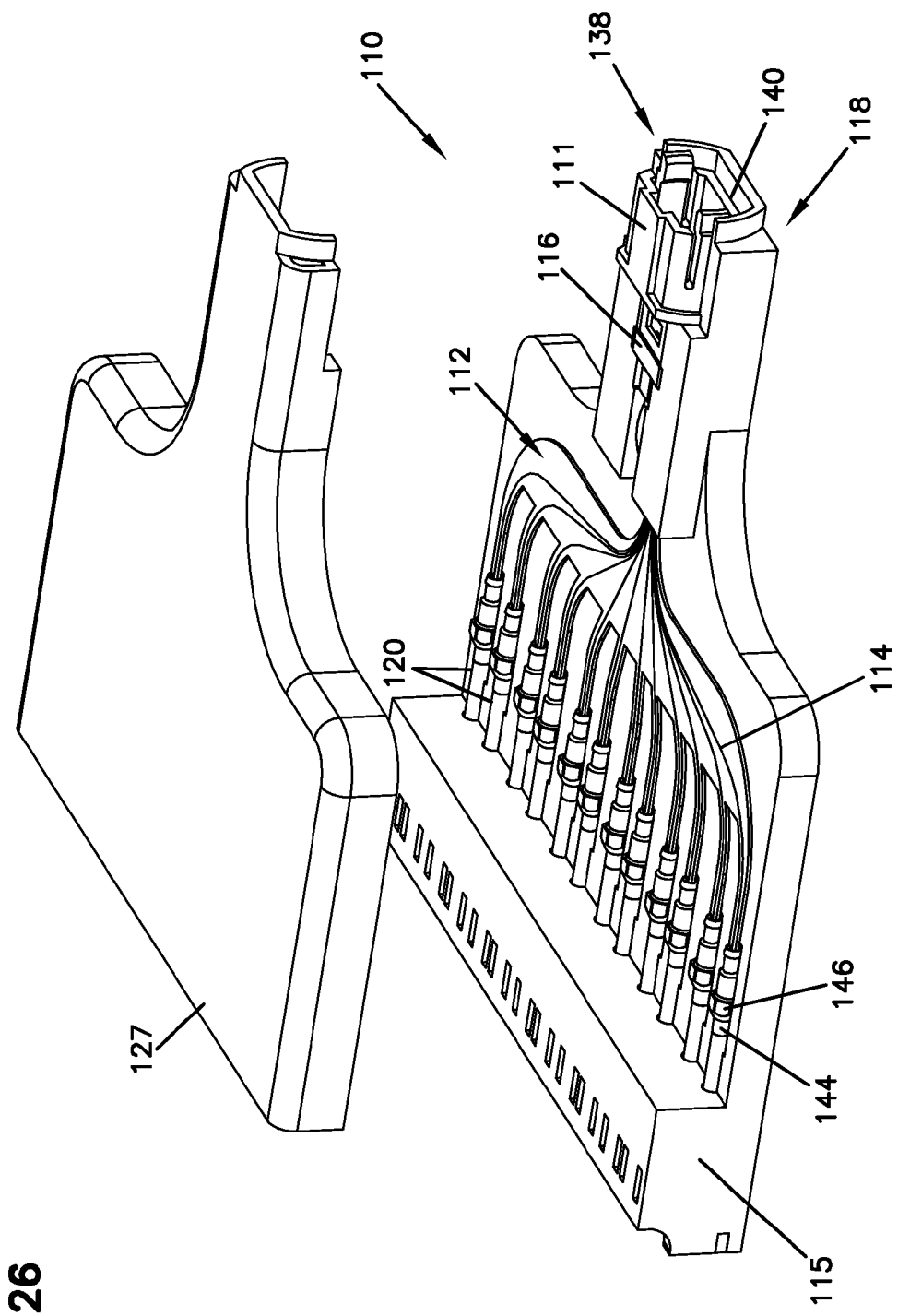
FIG. 26 is a partially exploded view of the fiber optic cassette of FIG. 25 taken from a top, rear, right side perspective of the fiber optic cassette.
Figure 27:
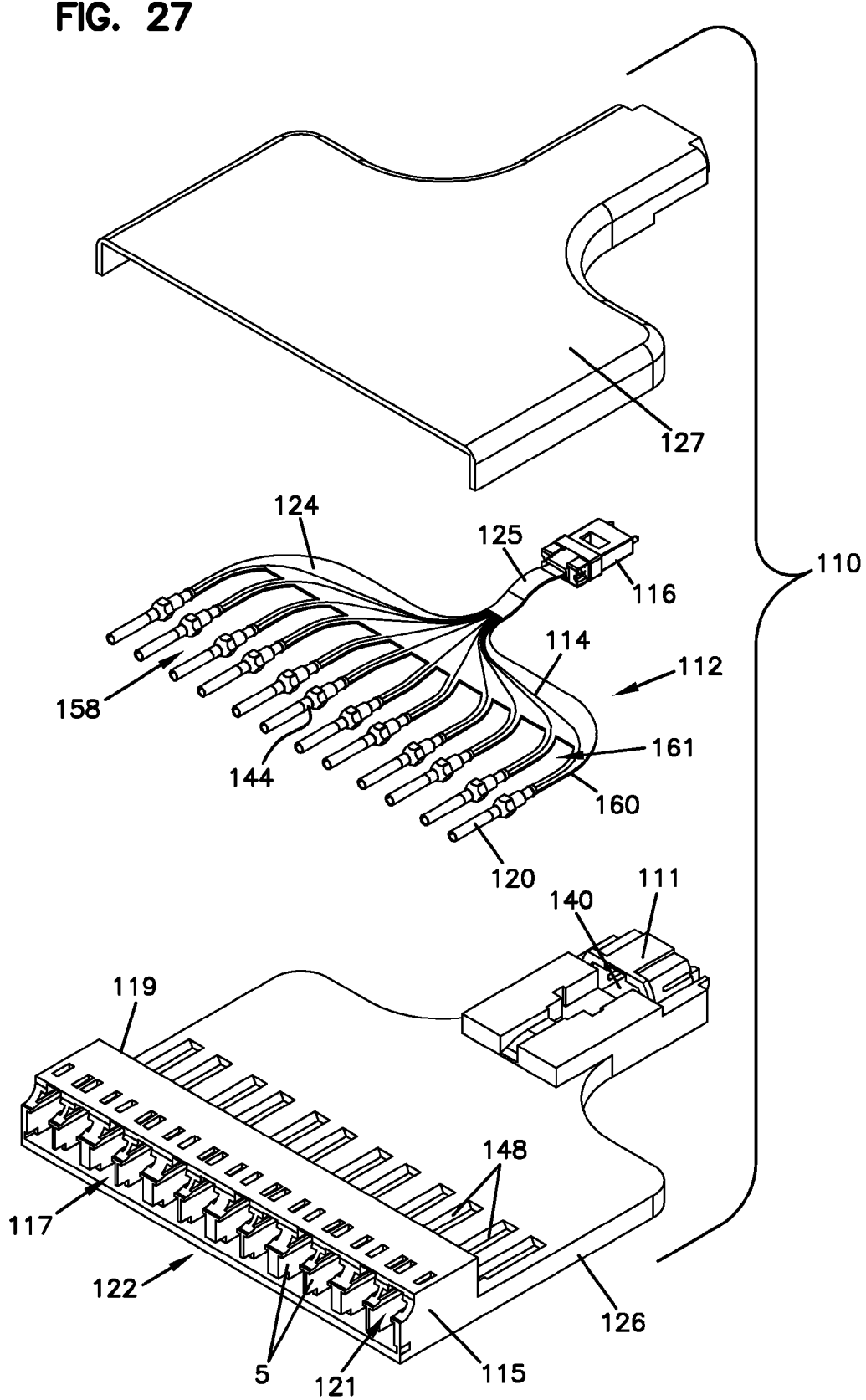
FIG. 27 is a fully exploded view of the fiber optic cassette of FIG. 25 taken from a top, front, right side perspective of the fiber optic cassette.
Figure 28:
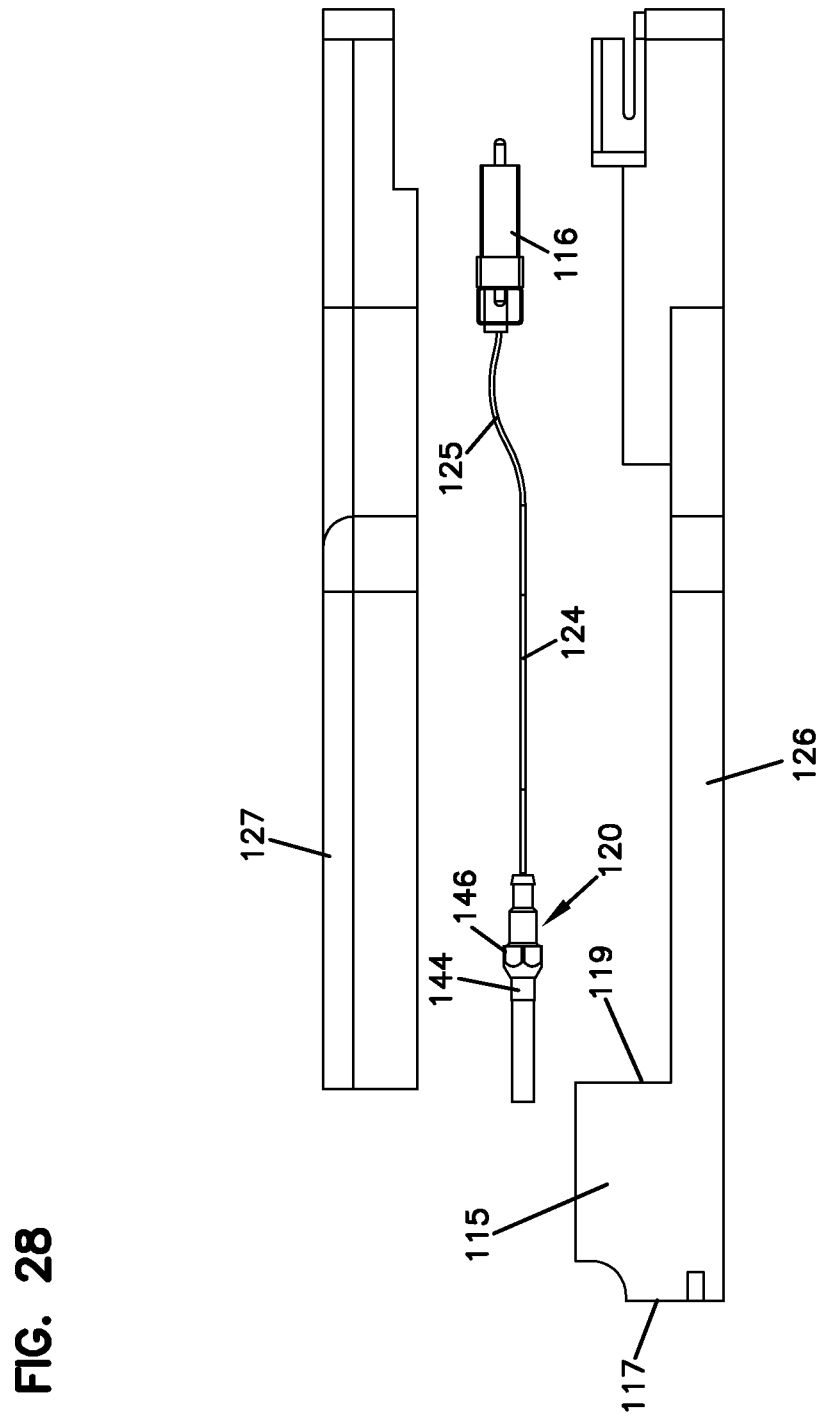
FIG. 28 is a fully exploded right side view of the fiber optic cassette of FIG. 25.
Figure 29:
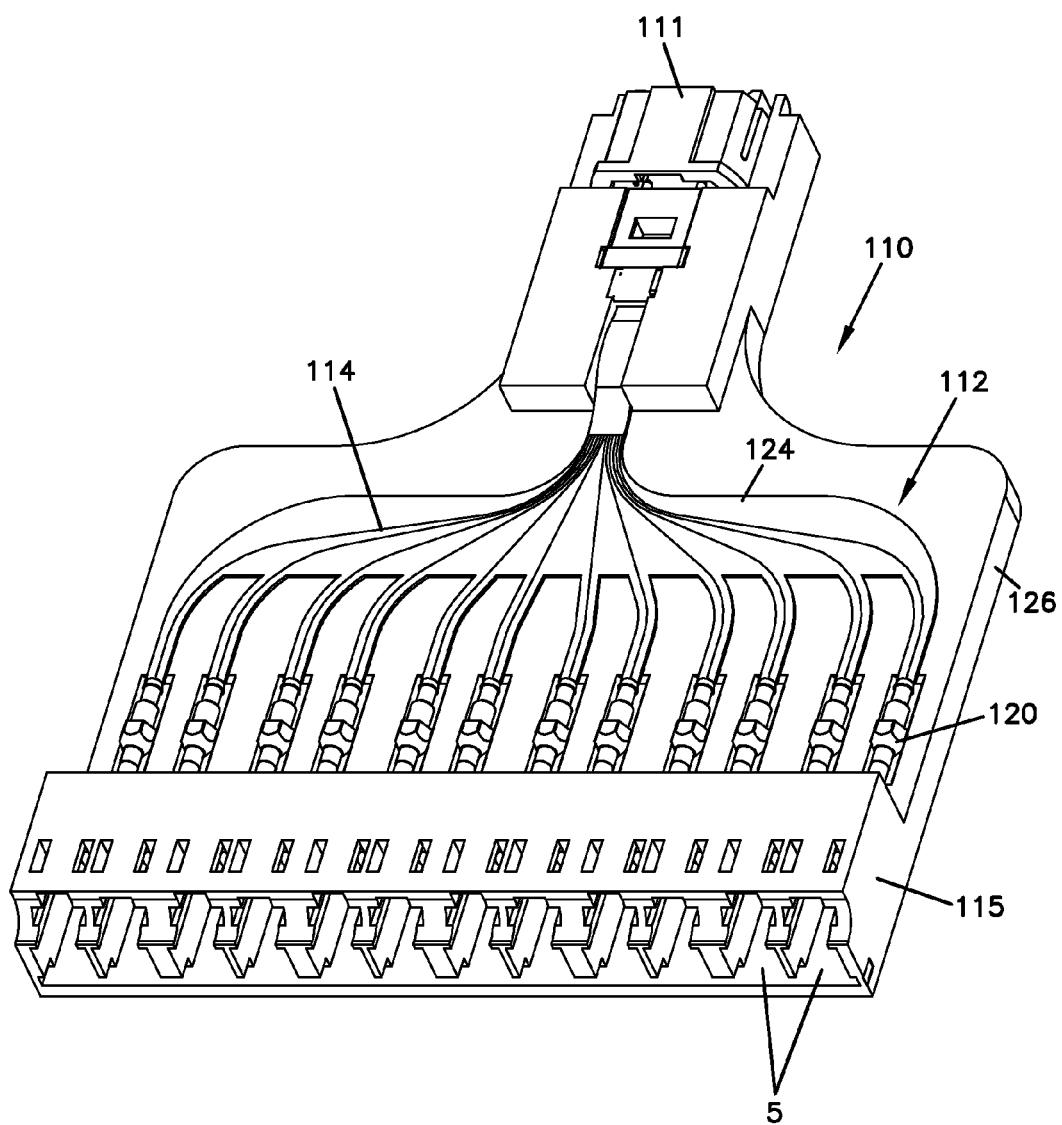
FIG. 29 is a partially assembled view of the fiber optic cassette of FIG. 25 taken from a top, front, right side perspective of the fiber optic cassette, wherein the cover has been removed to expose the interior features of the fiber optic cassette.
Figure 30:
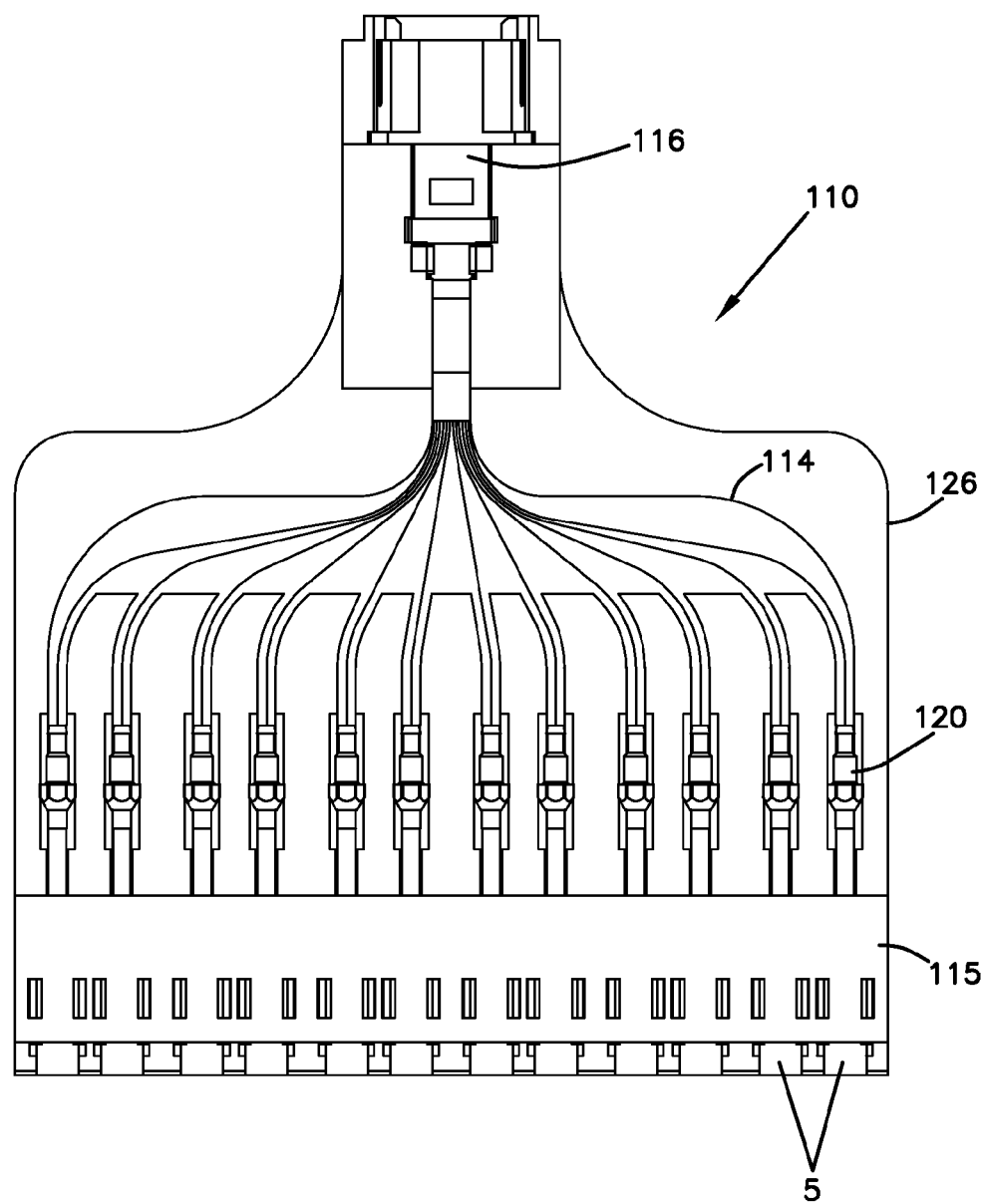
FIG. 30 is a top plan view of the partially assembled fiber optic cassette of FIG. 29.
Figure 31:
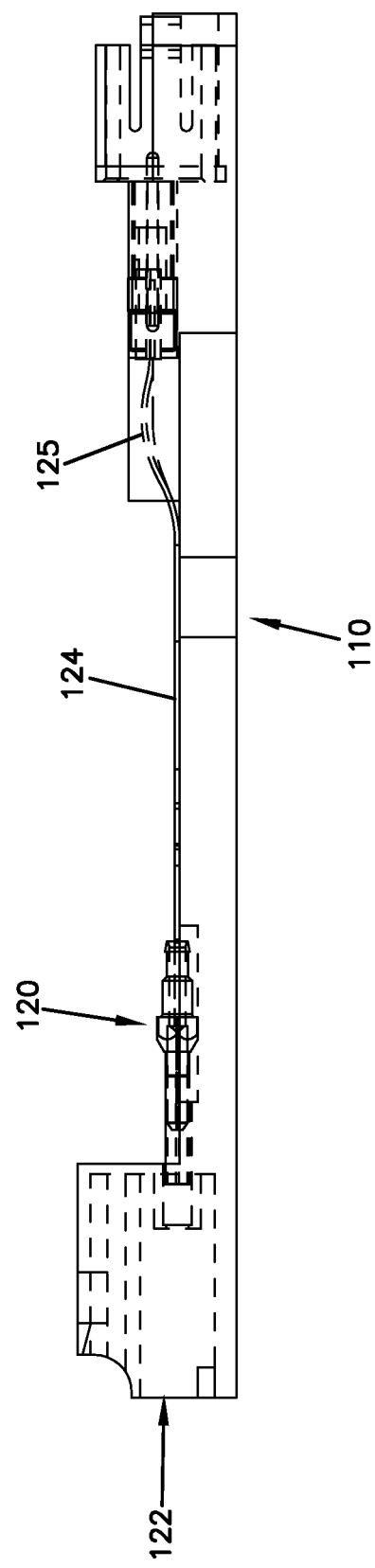
FIG. 31 is a right side view of the partially assembled fiber optic cassette of FIG. 29.
Figure 32:
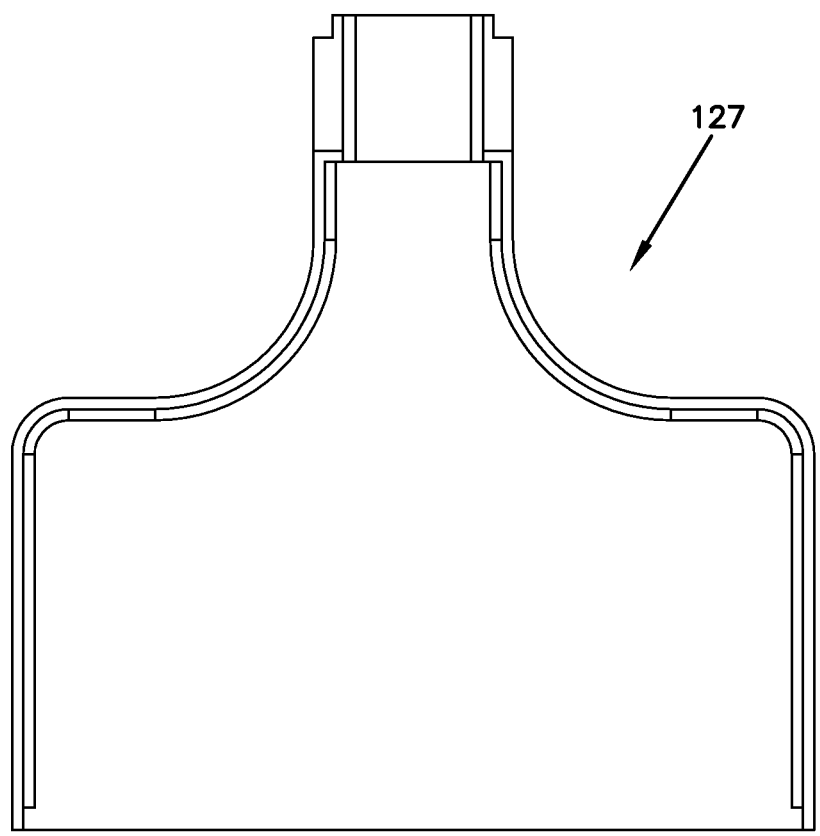
FIG. 32 is a bottom plan view of the cover of the fiber optic cassette of FIG. 25.
Figure 33:
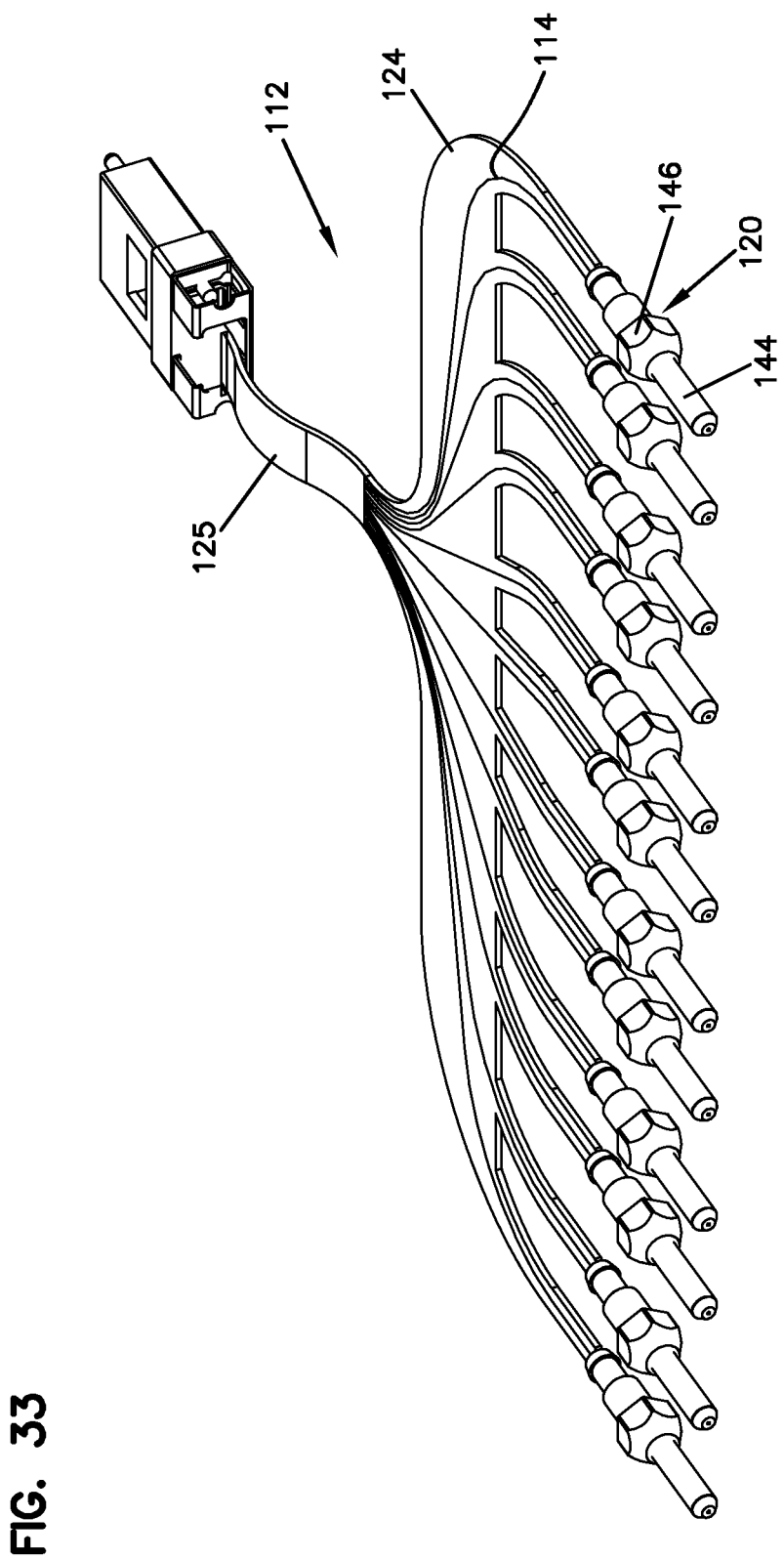
FIG. 33 is a top, front, right side perspective view of the flexible optical circuit of the fiber optic cassette of FIG. 25.
Figure 34:
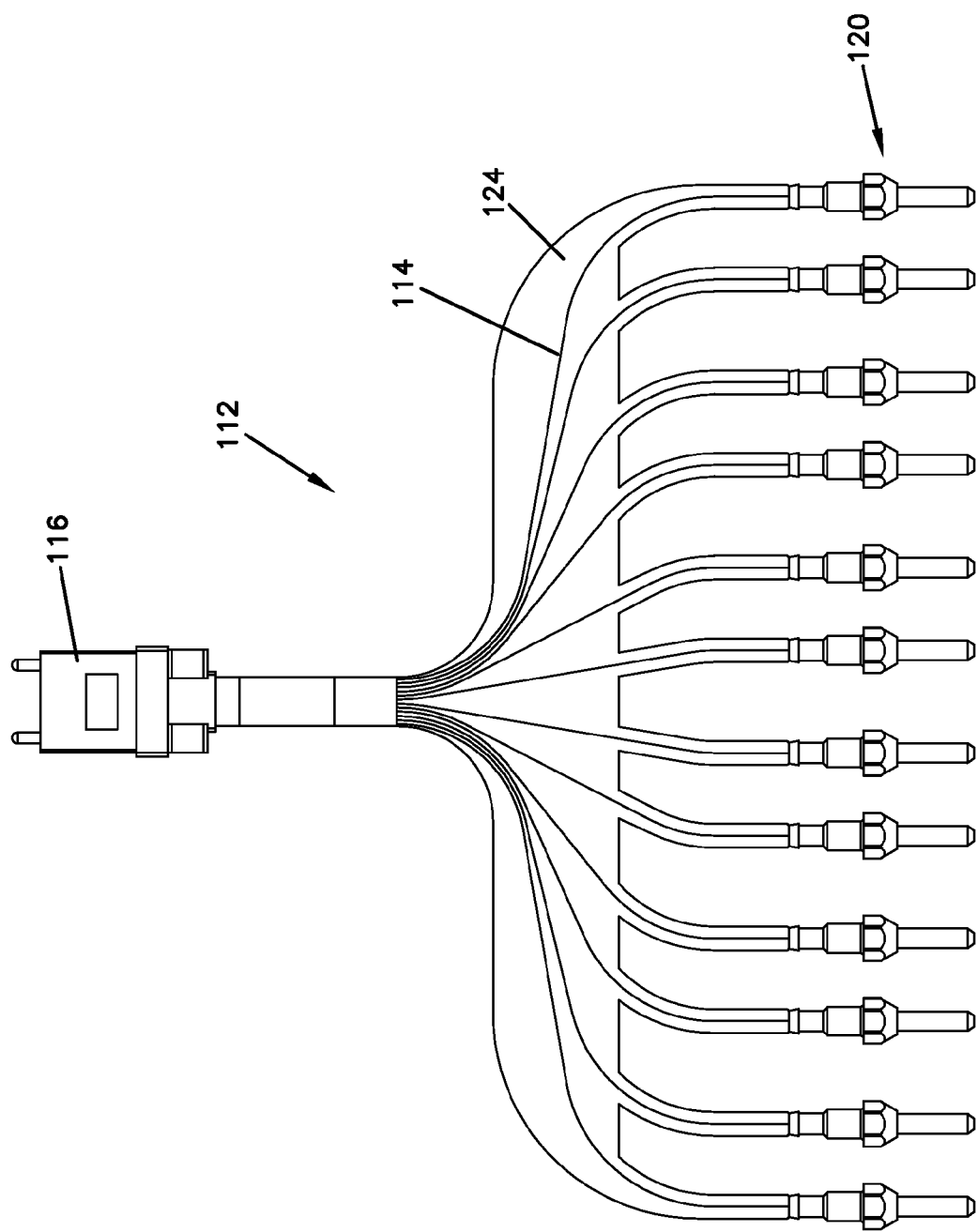
FIG. 34 is a top plan view of the flexible optical circuit of FIG. 33.
Figure 35:
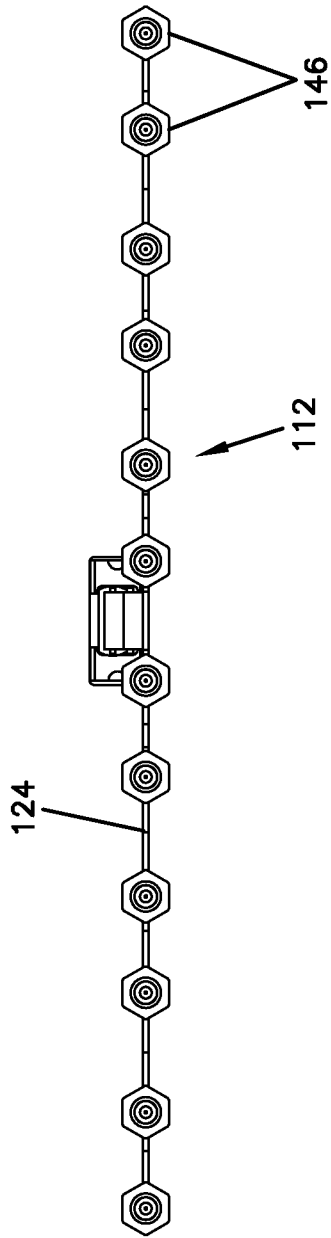
FIG. 35 is a front elevational view of the flexible optical circuit of FIG. 33.
Figure 36:
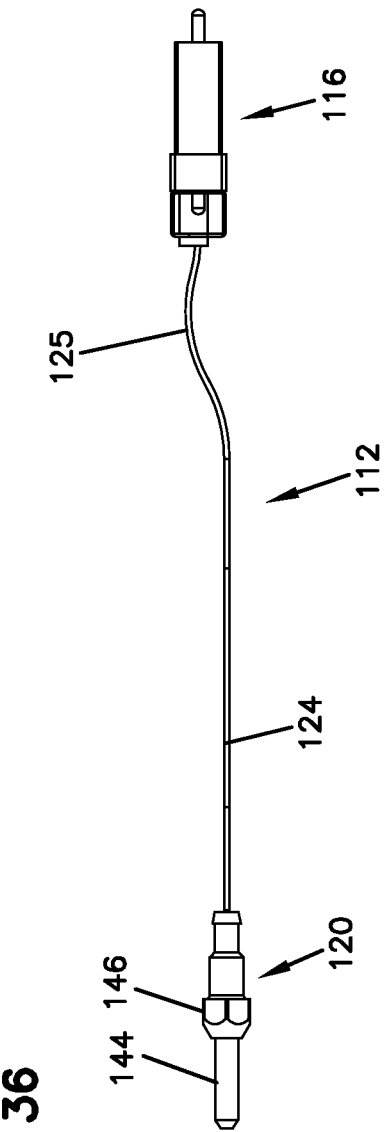
FIG. 36 is a right side view of the flexible optical circuit of FIG. 33.

The present disclosure is directed generally to fiber optic devices in the form of fiber optic cassettes. As will be described in further detail below, the different embodiments of the fiber optic cassettes of the present disclosure are designed to relay multiple fibers which terminate at a rear connector, such as an MPO style connector, to a plurality of ferrules positioned at a generally front portion of the cassette. The fiber optic cassettes of the present disclosure, thus, provide a transition housing or support between multi-fibered connectors, such as the MPO style connectors having MT ferrules, and single or dual fiber connectors, such as LC or SC type connectors.

As will be described in further detail below, the different embodiments of the fiber optic cassettes of the present disclosure utilize flexible optical circuits for the transition between the multi-fibered connectors positioned at one end of the cassette and the single or dual connectors positioned at an opposite end of the cassette.

Flexible optical circuits are passive optical components that comprise one or more (typically, multiple) optical fibers imbedded on a flexible substrate, such as a Mylar™ or other flexible polymer substrate. Commonly, although not necessarily, one end-face of each fiber is disposed adjacent one longitudinal end of the flexible optical circuit substrate and the other end face of each fiber is disposed adjacent the opposite longitudinal end of the flexible optical circuit substrate. The fibers extend past the longitudinal ends of the flexible optical circuit (commonly referred to as pigtails) so that they can be terminated to optical connectors, which can be coupled to fiber optic cables or other fiber optic components through mating optical connectors.

Flexible optical circuits essentially comprise one or more fibers sandwiched between two flexible sheets of material, such as Mylar™ or another polymer. An epoxy may be included between the two sheets in order to adhere them together. Alternately, depending on the sheet material and other factors, the two sheets may be heated above their melting point to heat-weld them together with the fibers embedded between the two sheets.

The use of flexible optical circuits within the fiber optic cassettes of the present disclosure provides a number of advantages, which will be discussed in further detail below. For example, the substrate of a flexible optical circuit is mechanically flexible, being able to accommodate tolerance variations in different cassettes, such as between connector ferrules and the housings that form the cassettes. The flexibility of the optical circuits also allow for axial movement in the fibers to account for ferrule interface variation. Also, by providing a rigid substrate within which the fibers are positionally fixed, use of flexible optical circuits allows a designer to optimize the fiber bend radius limits and requirements in configuring the cassettes, thus, achieving reduced dimensions of the cassettes. The bend radius of the fibers can thus be controlled to a minimum diameter. By utilizing optical fibers such as bend insensitive fibers (e.g., 8 mm bend radius) in combination with a flexible substrate that fixes the fibers in a given orientation, allowing for controlled bending, small form cassettes may be produced in a predictable and automated manner. Manual handling and positioning of the fibers within the cassettes may be reduced and eliminated through the use of flexible optical circuits.

Now referring to FIGS. 1-24, a first embodiment of a fiber optic cassette 10 that utilizes a flexible optical circuit 12 is shown. In the fiber optic cassette 10 of FIGS. 1-24, the flexible optical circuit 12 is depicted as transitioning optical fibers 14 between a conventional connector 16 (e.g., an MPO connector) at the rear 18 of the cassette 10 and a plurality of non-conventional connectors 20 at the opposite front end 22 of the cassette 10, wherein portions of a substrate 24 of the flexible optical circuit 12 are physically inserted into the non-conventional connectors 20.

It should be noted that the term "non-conventional connector" may refer to a fiber optic connector that is not of a conventional type such as an LC or SC connector and one that has generally not become a recognizable standard footprint for fiber optic connectivity in the industry.

The elimination of conventional mating connectors inside the cassette 10 may significantly reduce the overall cost by eliminating the skilled labor normally associated with terminating an optical fiber to a connector, including polishing the end face of the fiber and epoxying the fiber into the connector. It further allows the fiber optic interconnect device such as the optical cassette 10 to be made very thin.

Still referring to FIGS. 1-24, the cassette 10 includes a body 26 defining the front 22, the rear 18 and an interior 28. Body 26 further includes a top 30, a bottom 32, and sides 34, 36.

A signal entry location 38 may be provided by the MPO connector 16, which in the illustrated embodiment is along the rear 18 of the cassette body 26. A pocket 40 seats the MPO connector 16 while flexible cantilever arms 42 may be provided for coupling a second mating MPO connector to the cassette 10 with a snap-fit interlock. Non-conventional connectors 20 are arranged linearly adjacent the front 22 of the cassette 10 and positioned along a longitudinal axis A defined by the body 26. In the depicted embodiment of the cassette 10, the MPO connector 16 of the cassette 10 is positioned to extend parallel to the longitudinal axis A and generally perpendicular to ferrules 44 of the non-conventional connectors 20 at the front 22 of the cassette 10.

In general, cassette 10 includes the top 30 and bottom 32 which are generally parallel to each other and define the major surfaces of cassette body 26. Sides 34, 36, front 22, and rear 18 generally define the minor sides of cassette body 26. The cassette 10 can be oriented in any position, so that the top and bottom surfaces can be reversed, or positioned vertically, or at some other orientation.

In the embodiment of the fiber optic cassette 10 shown in FIGS. 1-24, the non-conventional connectors 20 that are positioned adjacent the front 22 of the cassette 10 each defines a hub 46 mounted over the ferrule 44. A cross-section of the interface is seen in FIGS. 15 and 15A. Each ferrule 44 is configured to terminate one of the fibers 14 extending out from the flexible circuit 12, as shown in FIGS. 21-24.

The non-conventional connectors 20 are placed within pockets 48 provided at a connection block or array 50 located at the front 22 of the cassette 10. A split sleeve 52 is also provided for ferrule alignment between the hub 46 and ferrule 44 of each non-conventional connector 20 and the ferrule of another mating connector that enters the cassette 10 from the front 22.

The mating connectors entering the cassette 10 from the front 22 of the cassette 10 may be connected through fiber optic adapters that are mounted on the connection block 50. The cassette 10 of FIGS. 1-24 is shown without the rows of adapters at the front 22 of the cassette 10 that would allow conventional connectors such as LC connectors to be mated to the non-conventional connectors 20 located within the interior 28 of the cassette 10. Such adapters or adapter blocks may be snap-fit, ultrasonically welded, or otherwise attached to the rest of the cassette body 26. In the versions of the fiber optic cassettes 110, 210 illustrated in FIGS. 25-36 and 40-42, respectively, the rows of fiber optic adapters 5 are shown on the cassettes 110, 210.

In the illustrated embodiment of the cassette 10 of FIGS. 1-24, the adapters that would be used with the cassette 10 are sized to receive mating LC connectors. SC connectors can also be used with appropriate sized adapters.

The cassette 10 of FIGS. 1-24 can be sealed or can be openable, so as to allow repair, or cleaning of the inner hubs 46 and ferrules 44. In some cases, the adapter blocks can be snap fit to a rest of the body 26 for ease of assembly. Adapter blocks can also preferably be removed from a rest of the cassette 10 to allow for cleaning of the inner non-conventional connector 20. The flexible fiber optic circuit 12 allows the entire fiber bundle, including the MPO connector 16 to be able to be removed for cleaning or replacement.

Referring specifically now to FIGS. 13 and 16-24, fiber pigtails 14 extending out from a rear end 54 of the substrate 24 forming the flexible optical circuit 12 are ribbonized for termination to an MT ferrule 56 of the MPO connector 16. The fiber pigtails 14 extending out from a front end 58 of the substrate 24 are individually terminated to the ferrules 44 to be positioned at the front 22 of the cassette 10. As shown, the substrate 24 defines front extensions 60 (one per fiber 14) each provided in a spaced apart configuration for providing some flexibility to the substrate 24. The individual fibers 14 are separated out from the ribbonized section at the rear 54 of the substrate 24 and are routed through the substrate 24 to the individual front extensions 60. Each ferrule hub 46 defines a notch or a cut-out 62 for receiving front portions 64 of the front extensions 60 of the substrate 24.

Fiber pigtails 14 that extend from each of the front extensions 60 of the substrate 24 are illustrated in FIGS. 21-24 diagrammatically. Referring now to the diagrammatic views of FIGS. 21-24, according to one example embodiment, the fiber pigtails 14 extending from the substrate 24 may be defined by an optical fiber 66 that is made up of a fiber core surrounded by a cladding layer. A portion 68 of the front extension 60 of the substrate 24 forming the flexible optical circuit 12 is inserted into a cylindrical bore 70 extending through the center of the ferrule hub 46, while an exposed optical fiber 66 that is made up of the fiber core and the surrounding cladding (after the primary coating has been stripped) is inserted into the ferrule 44 (see FIG. 21). The cut-out 62 of the ferrule hub 46 receives the portion 68 of the front extension 60 of the substrate 24 in stabilizing the termination.

According to one example process step, by using a rigid substrate, when the fibers are being terminated to the ferrules 44, the ends of the fibers may be cleaved and ends of all of the ferrules 44 extending from the substrate 24 may be polished simultaneously.

As shown in FIGS. 11-13, 15, and 15A, in addition to the inherent ability of the substrate 24 of the flexible optical circuit 12 to provide a bias for the ferrules 44 of the non-conventional connectors 20 at the front 22 of the cassette 10 for ferrule interface variations, other structures may be used to supplement the inherent bias of the flexible circuit 12. For example, in the depicted embodiment of the cassette 10, a spring clip 72 is positioned within a pocket 74 in the cassette 10 and extends parallel to the longitudinal axis A of the cassette body 26. In a conventional fiber optic connector, the ferrules assemblies normally include springs such that when they are mated in an adapter, the ferrules are pressed together against the bias of the spring. In the depicted cassette 10, the spring clip 72 may be positioned to abut rear ends 75 of the ferrule hubs 46 so as provide some bias to the ferrules 44 when they are mating incoming connectors. The flexibility of the substrate 24 of the flexible optical circuit 12 allows the ferrules 44 of the non-conventional connectors 20 to flex back and the spring clip 72 provides additional bias to force them forwardly. The spring clip 72 may be adhered to the portions of the cassette 10 for rigidly fixing the spring clip 72 within the cassette 10.

It should be noted that a structure such as the spring clip 72 can be used on any of the embodiments of the fiber optic cassettes described and illustrated in the present application.

Referring now to FIGS. 25-36, another embodiment of a fiber optic cassette 110 is illustrated. The fiber optic cassette 110, similar to the cassette 10 of FIGS. 1-24, utilizes a flexible fiber optic circuit 112 within the body 126 for relaying fibers 114. In this embodiment, a multi-fiber connector 116 (in the form of an MPO connector) is oriented parallel to non-conventional connectors 120 that are at the front 122 of the cassette 110, generally perpendicular to the longitudinal axis A defined by the cassette 110. The multi-fiber connector 116 is mounted to the cassette 110 via a multi-fiber adapter 111 seated within a pocket 140 at a rear 118 of the cassette 110.

The flexible circuit 112 is configured to transition fibers 114 from the multi-fiber connector 116 at the rear 118 defining the signal entry location 138 to non-conventional connectors 120 at the front 122 of the cassette 110. The cassette 110 is shown to include multiple rows of adapters 5 in the form of an adapter block 115 at the front 122 of the cassette 110. Via the adapters 5, conventional connectors such as LC connectors may be mated with ferrules 144 of the non-conventional connectors 120 located at the front 122 of the cassette 110. The adapters 5 are arranged linearly and positioned along longitudinal axis A. In the illustrated embodiment, adapters 5 are sized to receive front LC connectors. SC connectors can also be used with appropriate sized adapters. In the illustrated embodiment, the adapters 5 are formed in a block construction 115 having a front end 117, and an opposite rear end 119. Front end 115 includes a profile for receiving LC connectors. At the rear end 119 of the adapter block 115, the ferrule assemblies of the non-conventional connectors 120 including the ferrule hubs 146 and the ferrules 144 are seated in pockets 148 aligned with ports 121 of the adapters 5. For each connector pair, a split sleeve 152 is also provided for ferrule alignment between hub and ferrule of each non-conventional connector 120 and the ferrule of a conventional LC connector.

As shown and as discussed previously, the adapter blocks 115 may be snap fit, ultrasonically welded or otherwise attached to a rest of the cassette body 126 or formed as part of the body 126. A cover 127 may be used to cover an area behind blocks 115. In FIGS. 26-31, the cassette 110 has been shown with the cover 127 removed or without the cover 127 to illustrate the internal features of the cassette 110.

As in the first embodiment of the cassette 10, the cassette 110 of FIGS. 25-36 is configured such that it can be sealed or can be openable, so as to allow repair, or cleaning of the inner hub 146 and ferrule 144. In some cases, the adapter blocks 115 can be snap fit to a rest of the body 126 for ease of assembly. Adapter blocks 115 can also preferably be removed from a rest of the cassette 110 to allow for cleaning of the inner non-conventional connector 120. The flexible fiber optic circuit 112 allows the entire fiber bundle, including the MPO connector 116 to be able to be removed for cleaning or replacement.

The termination of the fiber pigtails 114 extending from a front 158 of the substrate 124 of the flexible circuit 112 is similar to the termination for the ferrule assemblies described above with respect to the cassette 10 of FIGS. 1-24. At the rear 154 of the substrate 124, as described previously, the fibers 114 are ribbonized for termination to an MT ferrule 156.

The substrate 124 includes extensions 160 at the front side 158. The extensions 160 define cut-outs 161 between each one. The cutouts 161 allow flexibility for the substrate 124 and essentially enable the ferrules 144 of the non-conventional connectors 120 to be generally free floating structures to allow for movement in two different axes (e.g., upward/downward, front/back).

Referring specifically to FIGS. 27, 28, 31, 33, and 36, the substrate 124 of the flexible optical circuit 112 is also illustrated with a bent portion 125 adjacent the rear pocket 140 of the cassette 110. As discussed previously, one advantage of using a flexible substrate 124 to anchor the fibers 114 is to allow limited controlled movement of the substrate 124 either to accommodate any tolerance variances between the internal components and the cassette body 126 or to accommodate any movement of the internal ferrules 144 during connection to incoming connectors.

Figure 37:
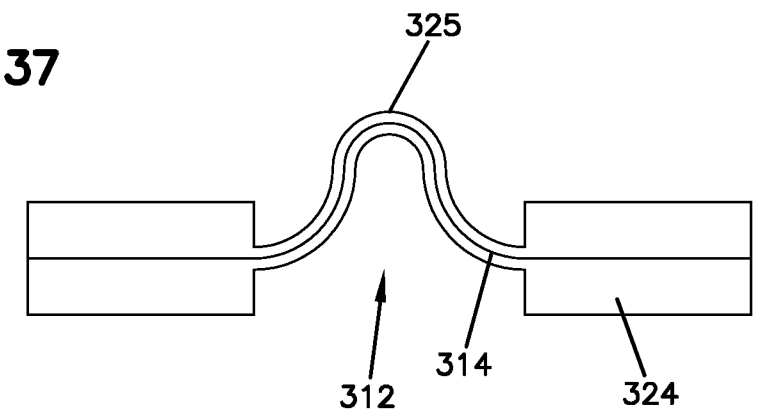
FIG. 37 is a top plan view of a flexible optical circuit illustrating a substrate of the circuit with a bend formed therein.
Figure 38:
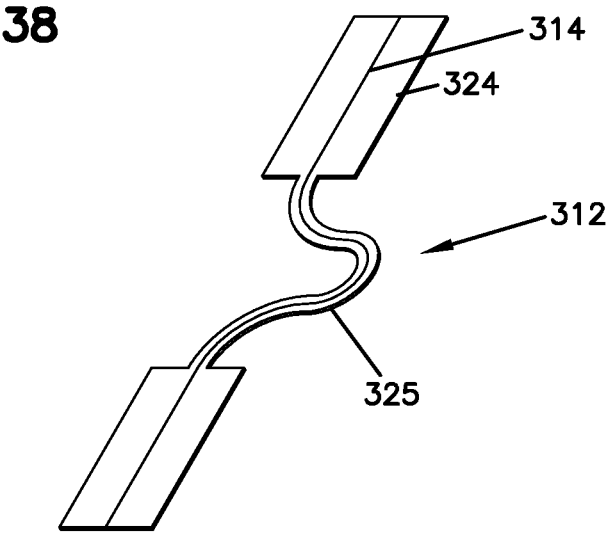
FIG. 38 is a perspective view of the flexible optical circuit of FIG. 37.
Figure 39:
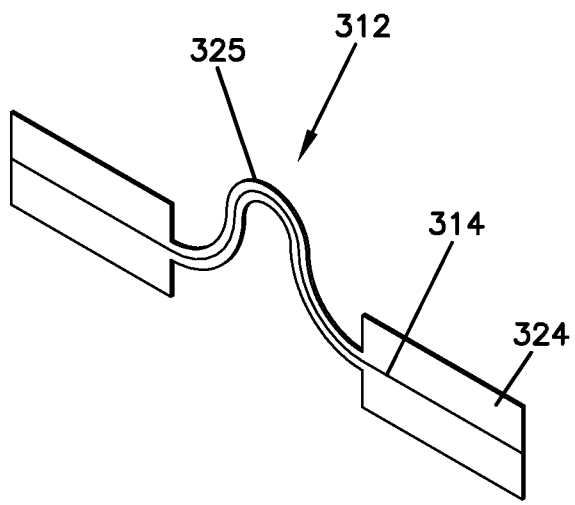
FIG. 39 is another perspective view of the flexible optical circuit of FIG. 37.

An example of a simple flexible optical circuit 312 having a substrate 324 that includes a design for controlled bending and allowing axial movement in the fibers 314 is illustrated in FIGS. 37-39. Either a U-bend or an S-bend 325 can be provided in the substrate 324 of the flexible optical circuit 312 for allowing axial movement for the fibers 314. With the tolerances of connector ferrules and molded polymeric structures (such as the cassette body), there can be a significant build up of ferrule interface variation. By allowing the substrate 324 of the flexible circuit 312 to bend in a controlled way, these tolerances can be accommodated.

Figure 40:
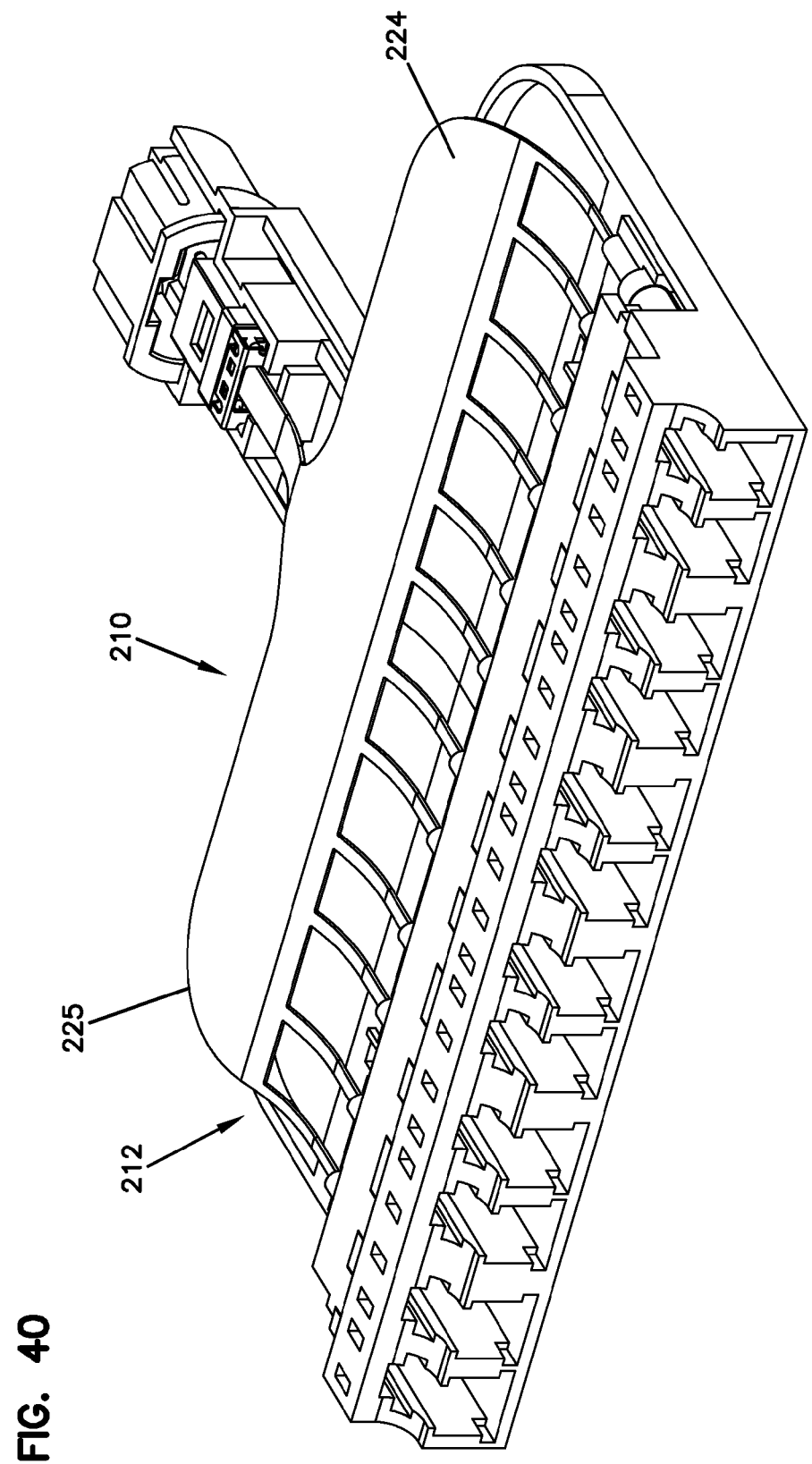
FIG. 40 is a top, front, right side perspective view of a third embodiment of a fiber optic cassette having features that are examples of inventive aspects in accordance with the present disclosure, the fiber optic cassette shown in a partially-assembled configuration without the cover thereof.
Figure 41:
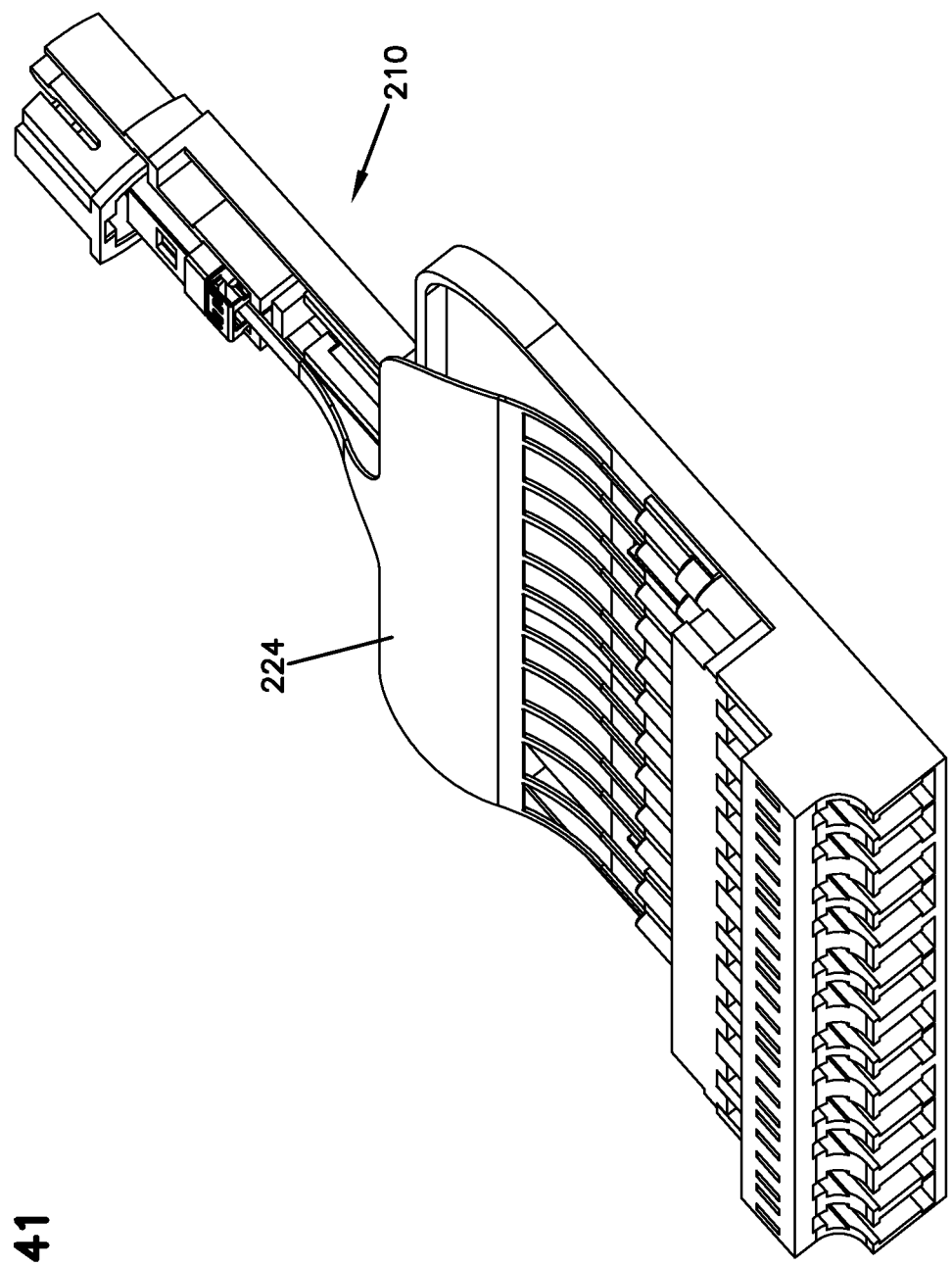
FIG. 41 is another top, front, right side perspective view of the fiber optic cassette of FIG. 40.
Figure 42:
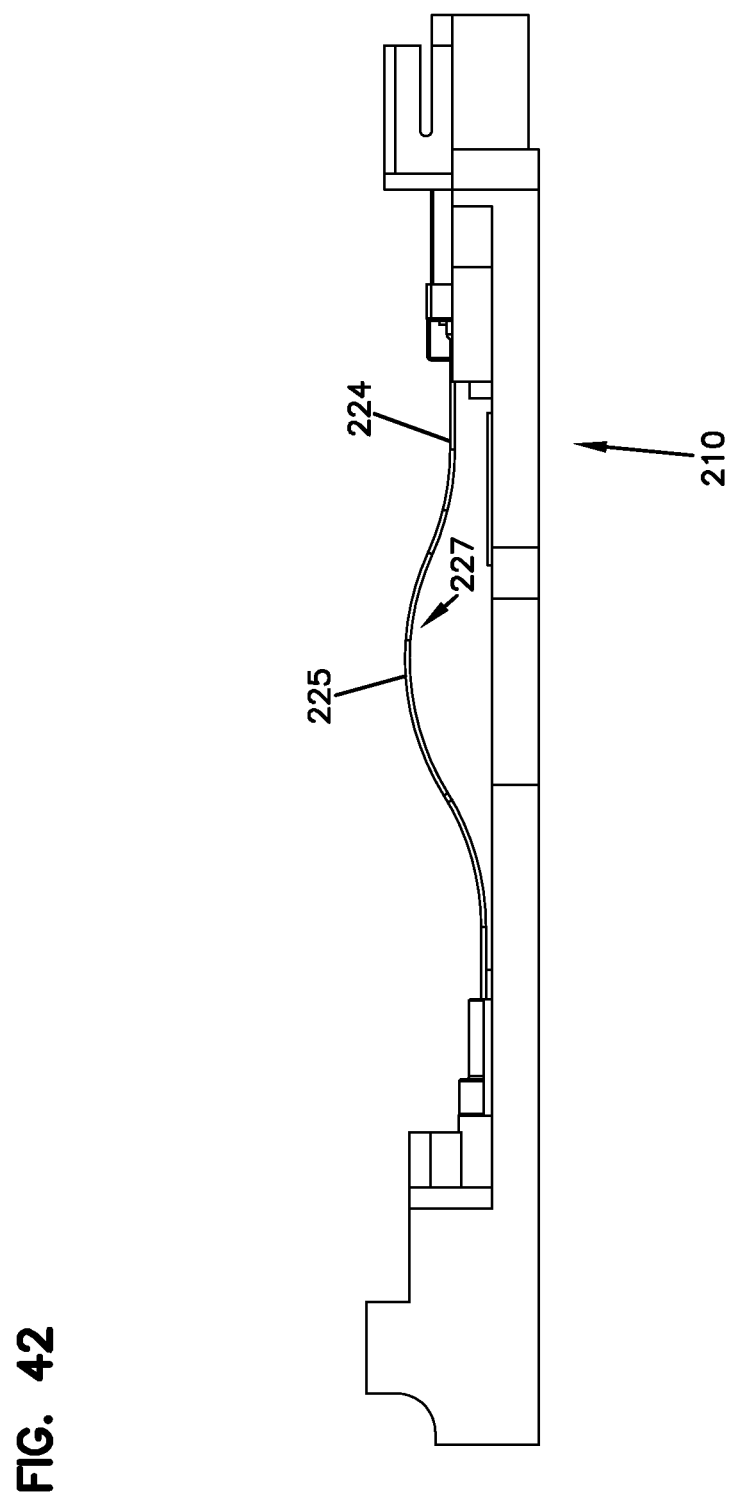
FIG. 42 is a right side view of the fiber optic cassette of FIG. 40.

FIGS. 40-42 illustrate another embodiment of a fiber optic cassette 210 utilizing a flexible optical circuit 212, wherein the bend 225 is provided generally in the middle portion 227 of the substrate 224 of the circuit 212. The substrate 224 of the cassette 210 of FIGS. 40-42 provides similar advantages as the cassettes 10, 210 described in previous embodiments.

Figure 43:
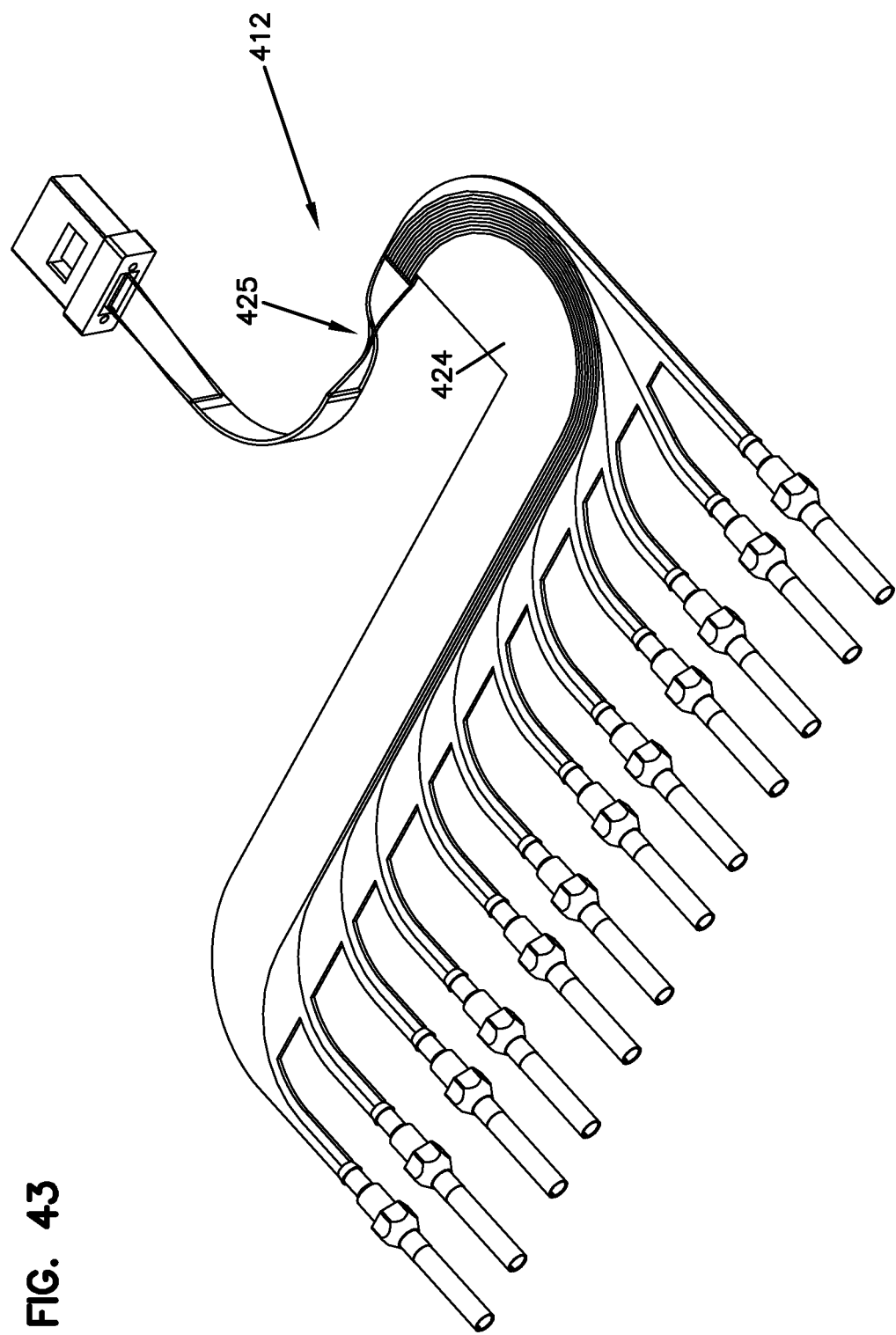
FIG. 43 illustrates a top, front, right side perspective view of a flexible optical circuit including a twist-bend in the substrate of the circuit.
Figure 44:
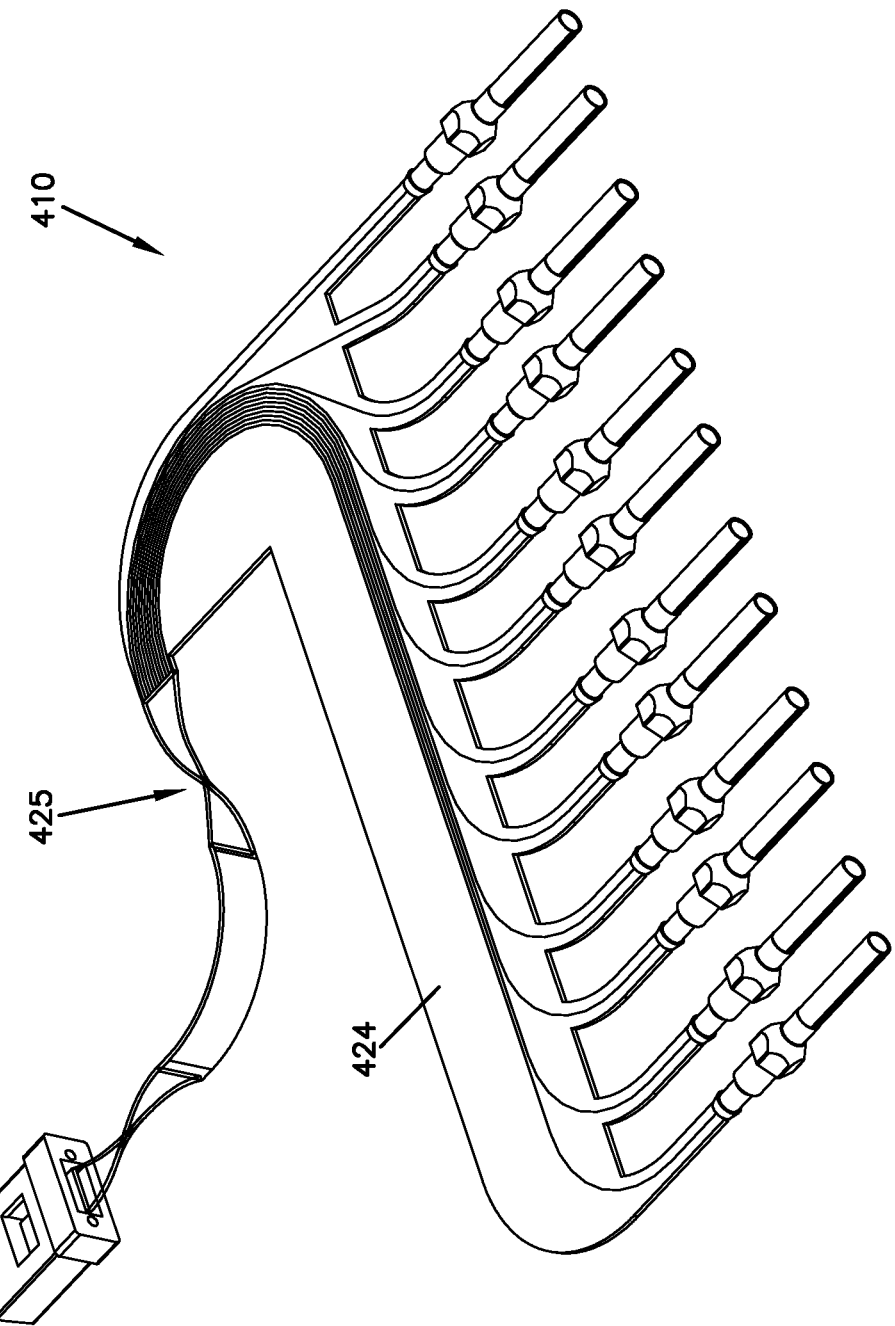
FIG. 44 is a top, front, left side perspective view of the flexible optical circuit of FIG. 43.
Figure 45:
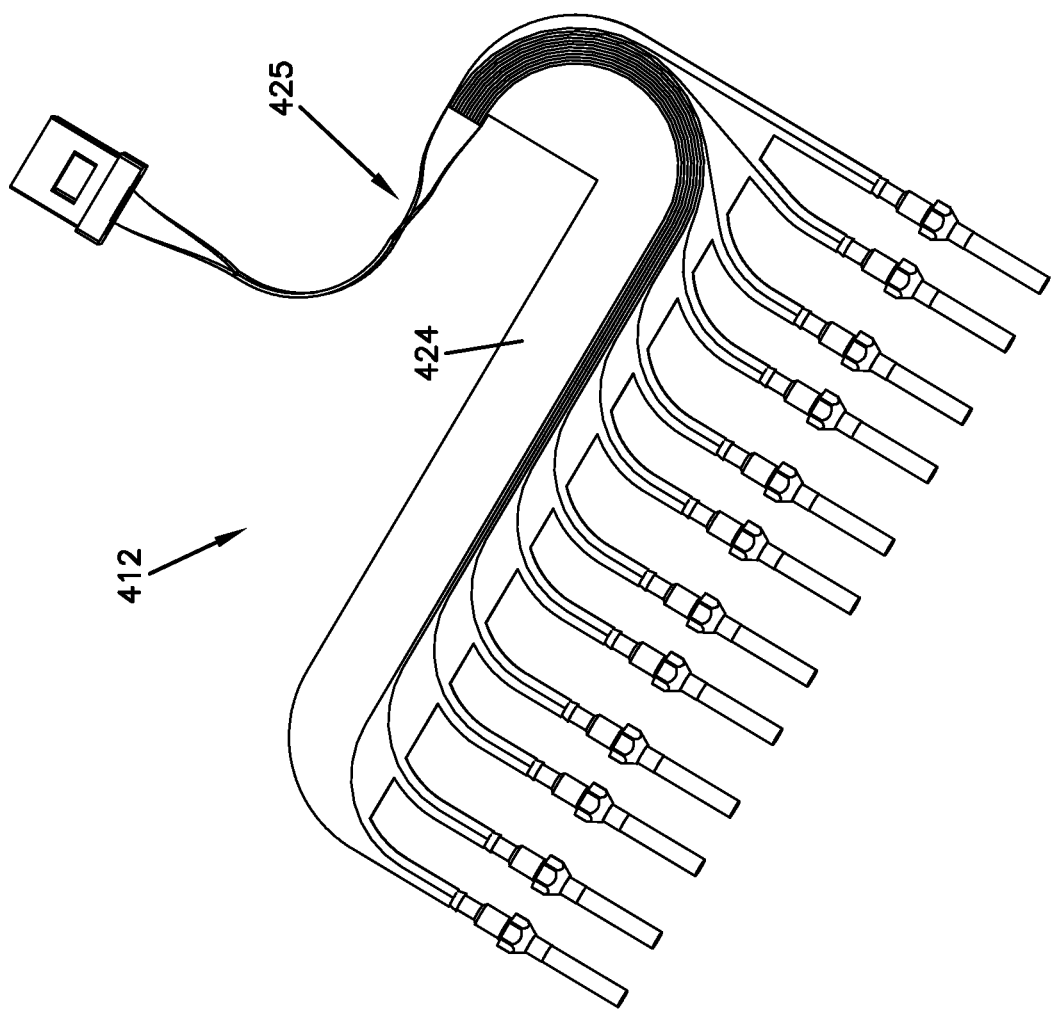
FIG. 45 is a top view of the flexible optical circuit of FIG. 43.
Figure 46:
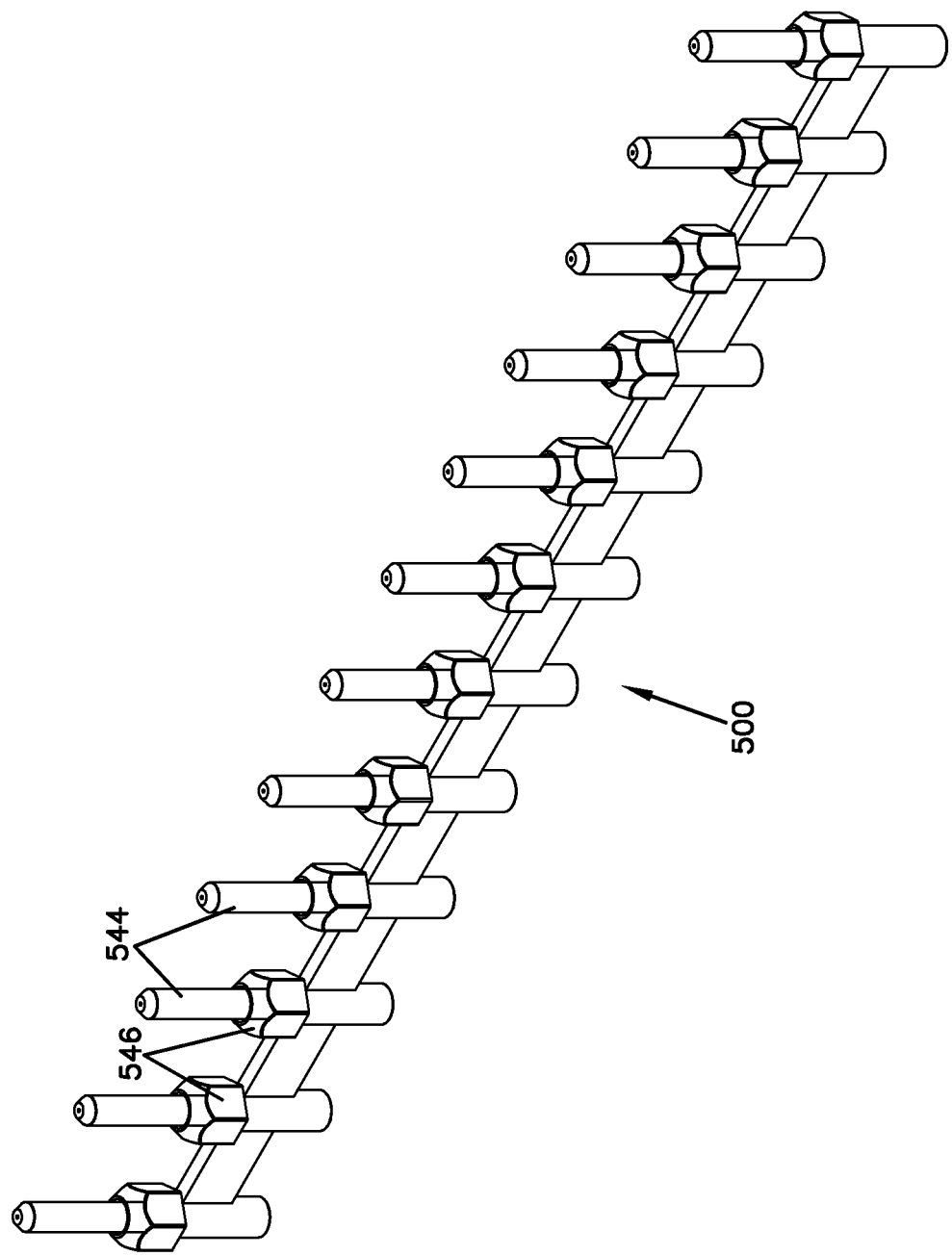
FIG. 46 is a perspective view of a multi-ferrule strip configured for use with the fiber optic cassettes of the present disclosure, the multi-ferrule strip including a plurality of ferrule hubs integrally molded together.
Figure 47:
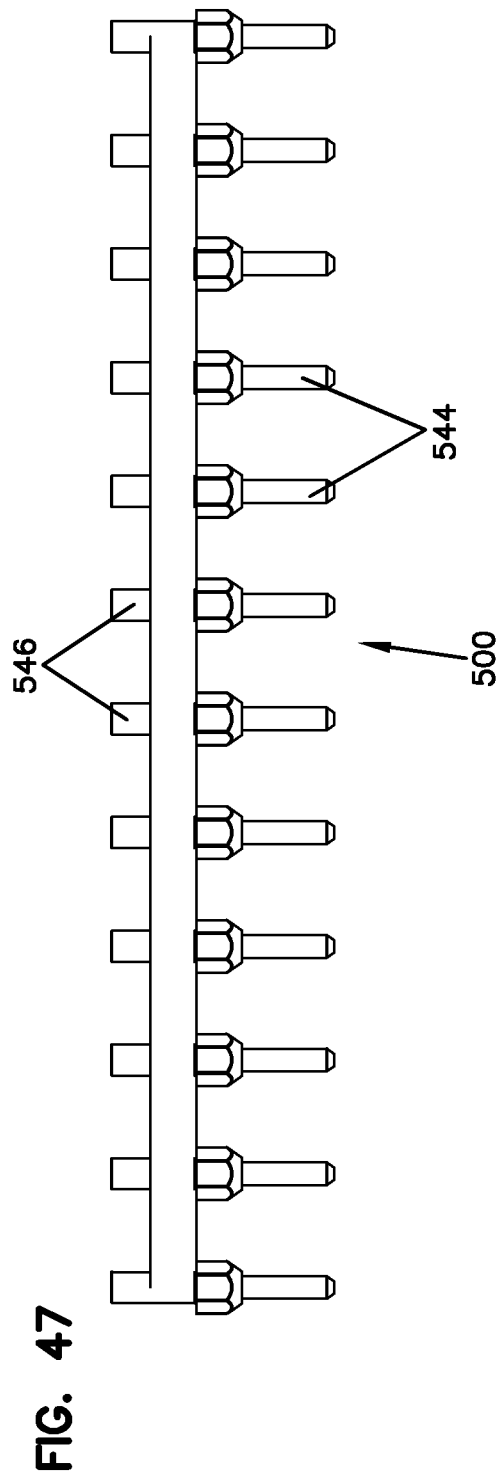
FIG. 47 is a top plan view of the multi-ferrule strip of FIG. 46.
Figure 48:
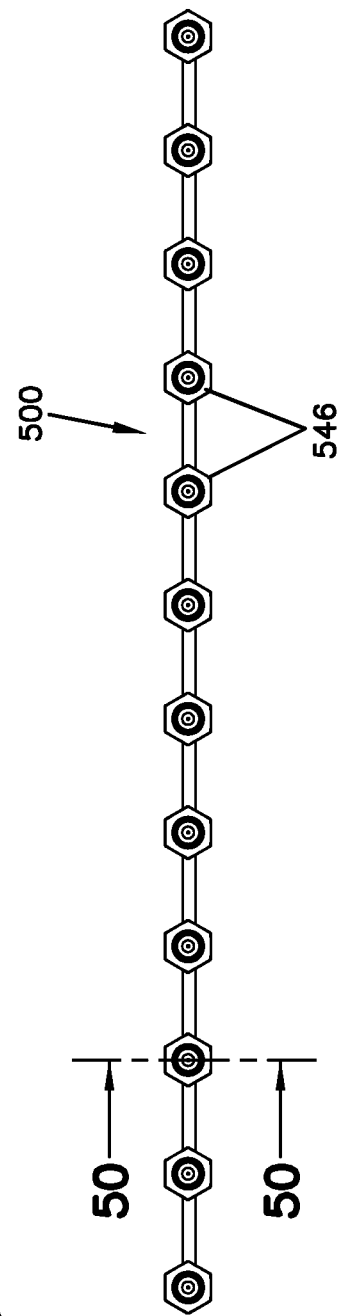
FIG. 48 is a front elevational view of the multi-ferrule strip of FIG. 46.
Figure 49:
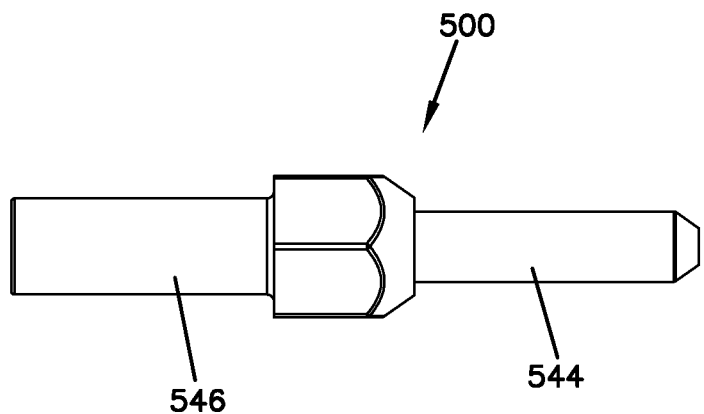
FIG. 49 is a left side view of the multi-ferrule strip of FIG. 46.
Figure 50:
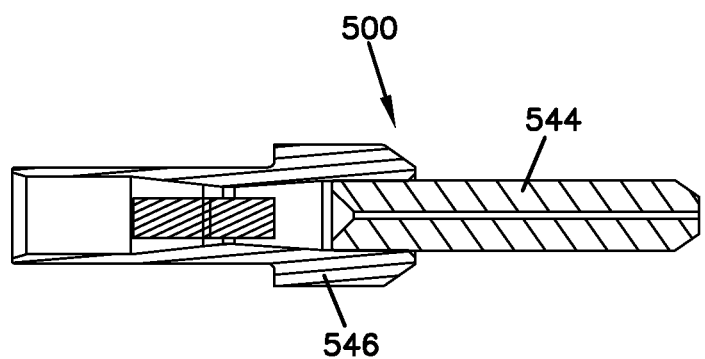
FIG. 50 is a cross-sectional view taken along line 50-50 of FIG. 48.

As another example, FIGS. 43-45 illustrate a flexible circuit 412 including a substrate 424 with a twist 425 in the ribbonized-fiber part of the substrate 424. Such a design can accommodate a large distance in variation between connector interfaces. As shown in the embodiment of the flexible circuit 412 of FIGS. 43-45, the MPO connector at the rear end of the substrate may define a longitudinal axis that is perpendicular to those of the non-conventional connectors at the front of the substrate 424. Thus, the fibers 14 extending from the MPO connector may follow an "S" or "Z" shaped pathway before being terminated to the front connectors. In the depicted embodiment, the optical fibers 14 enter the substrate 424 in a side-by-side, non-overlapping configuration and branch out therefrom as they extend to the non-conventional connectors at the front of the substrate. The substrate 424 allows the fibers 14 to follow such a path while preserving any minimum bend radius requirements. In a different example embodiment that will be discussed below shown in FIGS. 51, 52, the fibers entering the substrate at the back may be oriented parallel to the portions exiting from the front of the substrate. In such an example, the fibers may enter from the rear of the substrate, again, in a non-overlapping configuration and may branch out to the different non-conventional connectors at the front of the substrate, following minimum bend radius requirements.

Referring now to FIGS. 46-50, an embodiment of a ferrule strip 500 is illustrated. One of the issues normally encountered in assembly of the cassettes (e.g., 10, 110, 210) utilizing non-conventional connectors (e.g., 20, 120) at one end of the adapter blocks (e.g., 115) is the loading of the ferrule hubs (e.g., 46, 146) onto the flex circuit (e.g., 12, 112, 212) and handling of the ferrule hubs. According to one inventive method, the ferrules (e.g., 44, 144) may be overmolded with a polymeric multi-ferrule strip 500 that forms a plurality of integral hubs 546. The multi-ferrule strip 500 can be molded to hold the ferrules 544 at the correct pitch for insertion into the pockets (e.g., 48, 148) of the cassettes (e.g., 10, 110, 210).

Now referring generally to FIGS. 51-61, when using a flexible circuit that includes a plurality of fibers embedded therein, production yield may be a big issue, especially given that all of the individual fibers have to be separately terminated into individual ferrules at the front of the flexible optical circuit. If there is any damage to one of the terminations (e.g., either to a fiber or to a ceramic ferrule), the entire flexible circuit may become unusable. The present disclosure contemplates methodologies for allowing individual retermination of the fibers if one of the optical fibers or ferrules fails.

Figure 51:
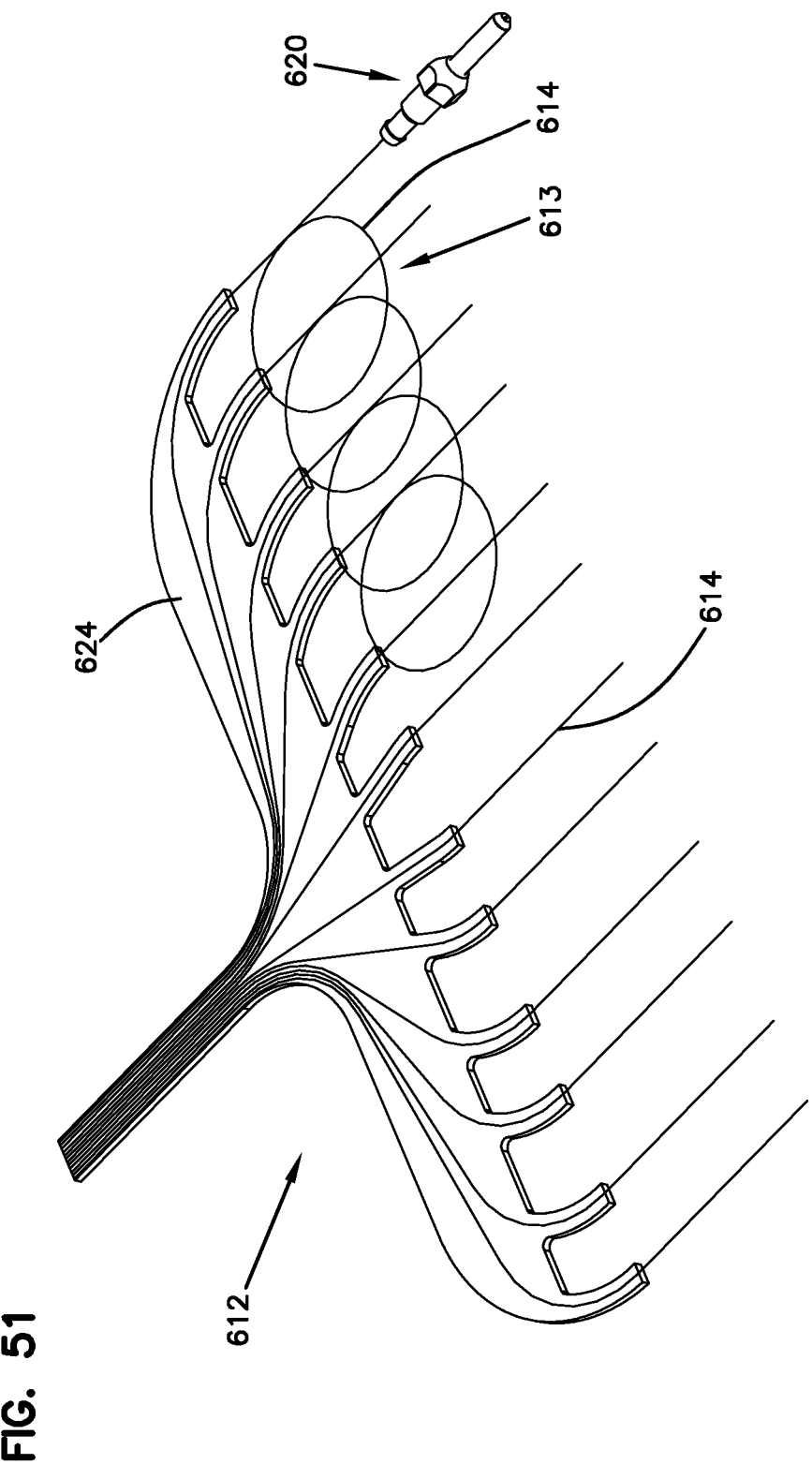
FIG. 51 is a perspective view of another embodiment of a flexible optical circuit including loops of buffered fiber between the substrate of the circuit and the ferrule assembly for repair/replacement.
Figure 52:
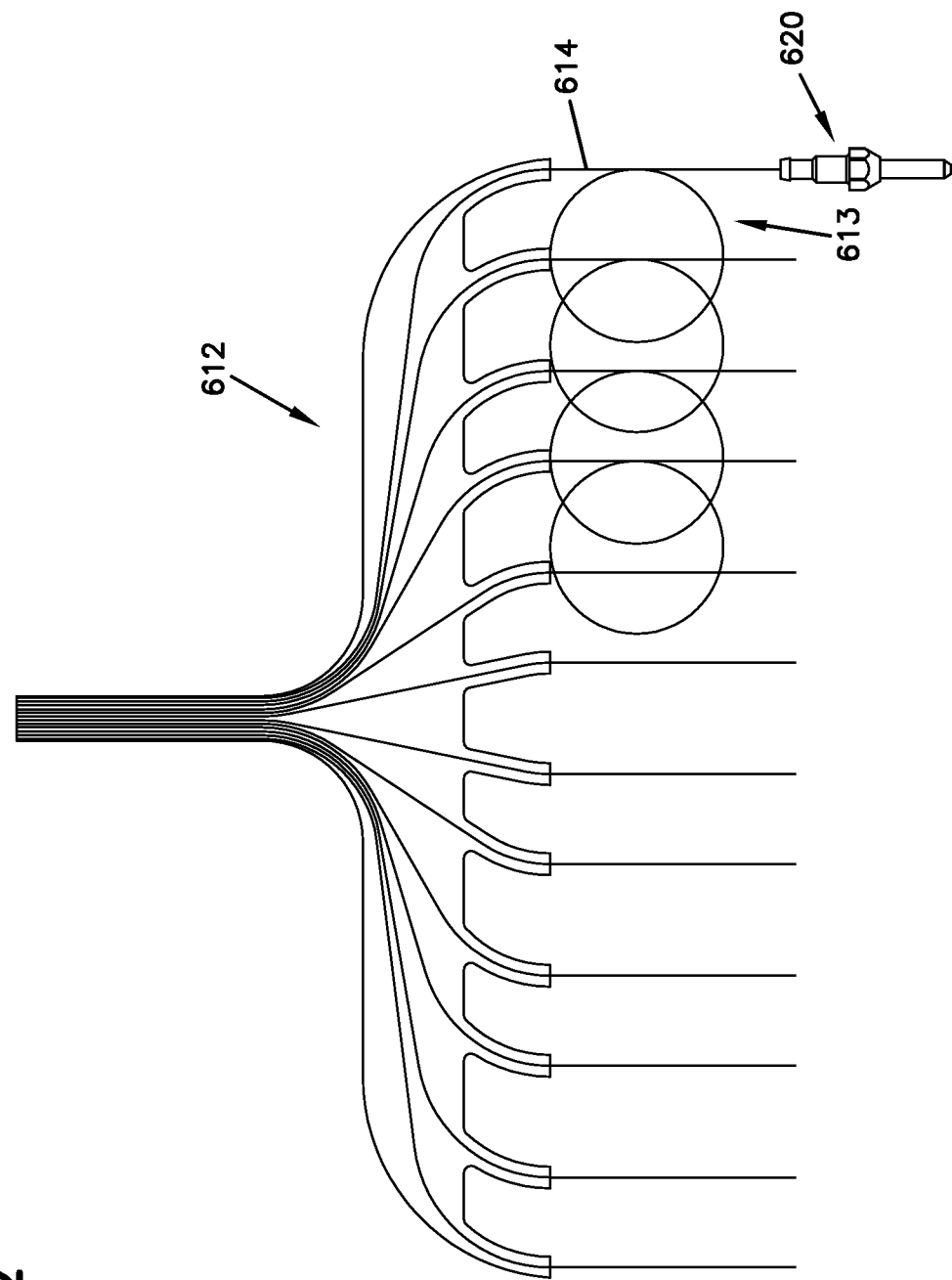
FIG. 52 is a top plan view of the flexible optical circuit of FIG. 51.

Referring specifically now to FIGS. 51-52, according to one embodiment methodology, a looped length 613 of buffered fiber 614 may be stored within the cassette between the flexible substrate 624 and each of the non-conventional connectors 620. If one of the terminations fails, a technician would be able to unloop the length 613 of fiber 614 and reterminate, saving the rest of the flexible circuit 612.

According to another methodology, as illustrated in FIGS. 53-61, instead of utilizing a single flexible substrate for all of the fibers relayed from the multi-fiber connector 716, a plurality of separate duplex substrates 724 can be used in a stacked arrangement. Each duplex stack can be mounted removably on the cassette and may be removed for repair or replacement if one of the terminations fails.

Figure 53:
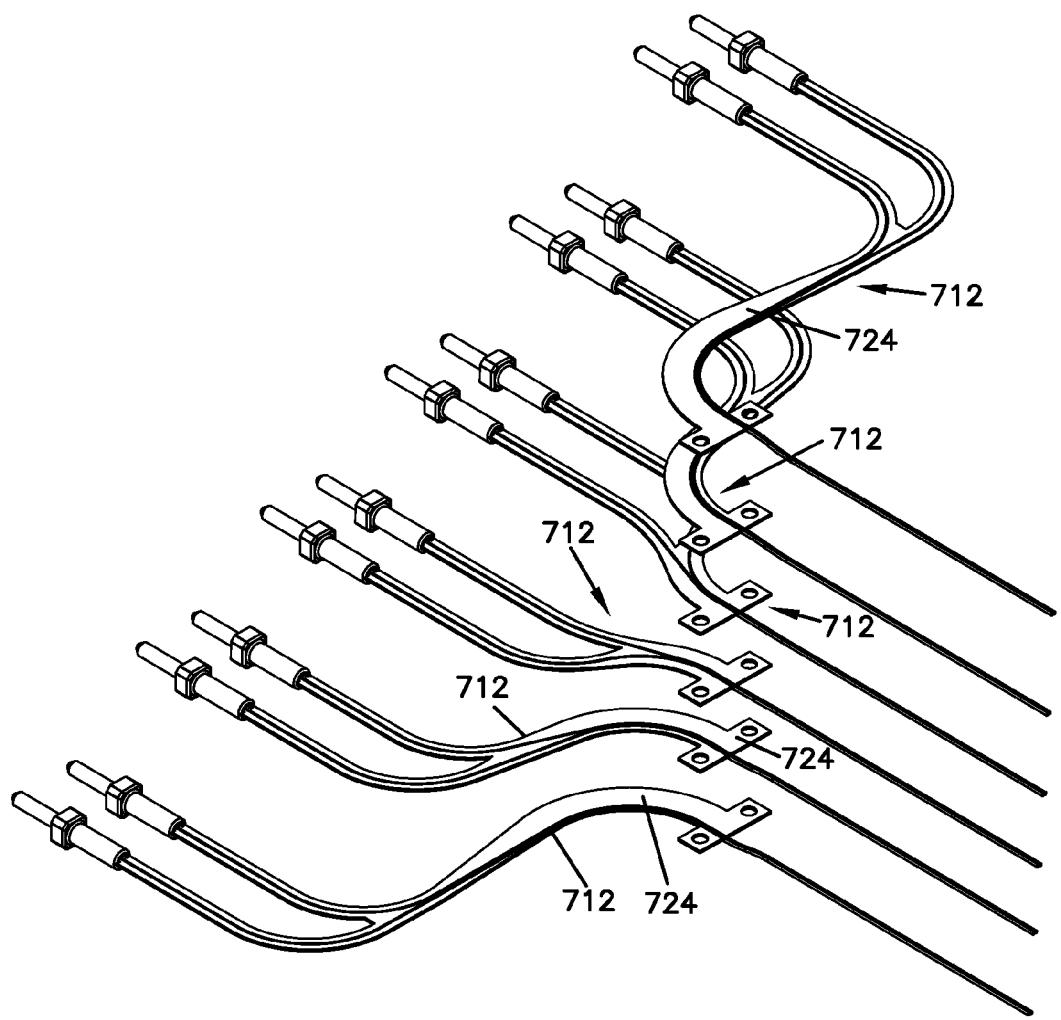
FIG. 53 illustrates a perspective view of a plurality of duplex flexible optical circuits in an exploded configuration, the duplex flexible optical circuits configured to be placed within the fiber optic cassettes of the present disclosure in a stacked arrangement.
Figure 54A:
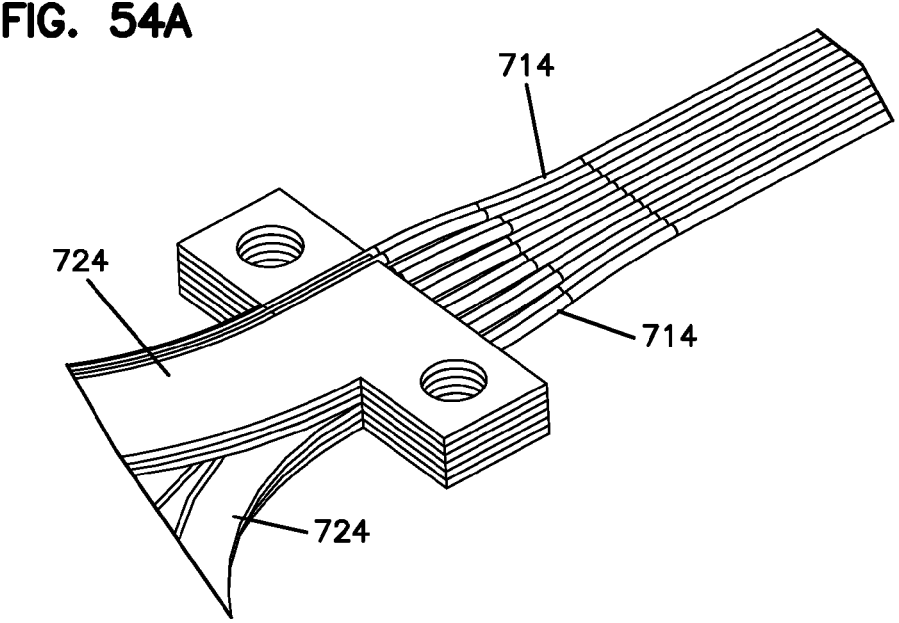
FIG. 54A is a close-up view illustrating the transition region of the stacked duplex flexible optical circuits of FIG. 54, wherein the fibers transition from a stepped configuration of the stacked circuits to a ribbonized flat section for termination to a multi-ferrule connector.
Figure 55A:
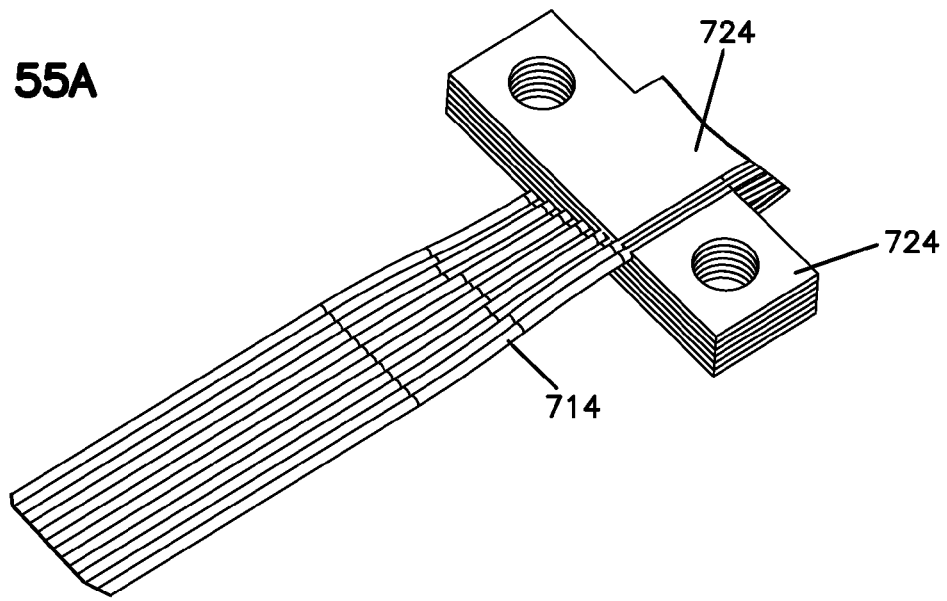
FIG. 55A is a close-up view illustrating the transition region of the stacked duplex flexible optical circuits of FIG. 55, wherein the fibers transition from a stepped configuration of the stacked circuits to a ribbonized flat section for termination to a multi-ferrule connector.
Figure 56:
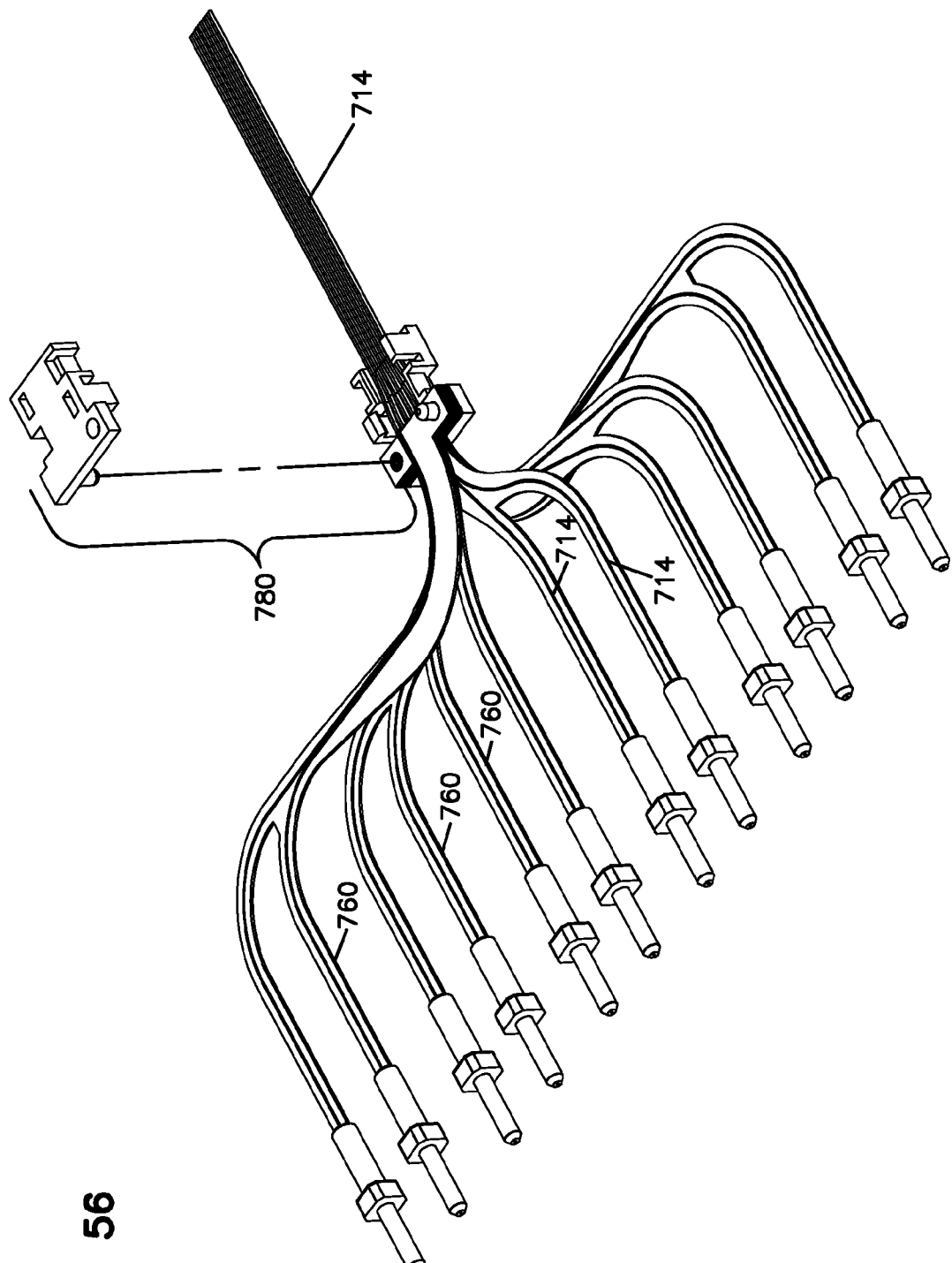
FIG. 56 is a top, front, right side exploded perspective view of a clamp structure used for clamping the plurality of duplex flexible optical circuits of FIG. 53 in a stacked arrangement, the clamp structure shown with the stack of the duplex flexible optical circuits placed therein.
Figure 57A:
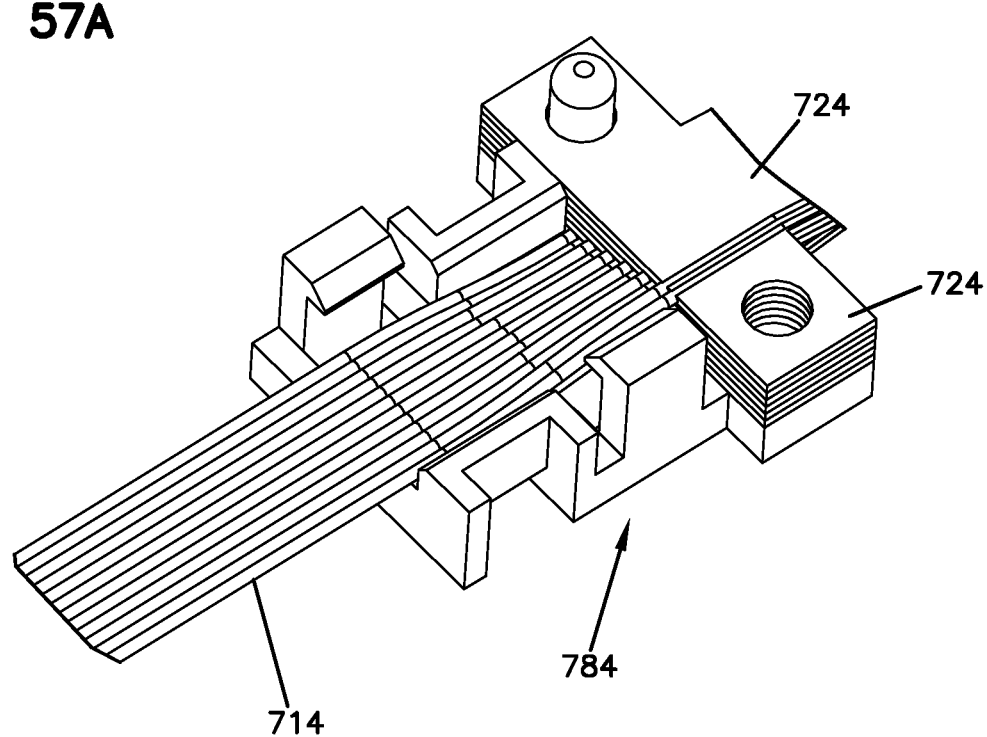
FIG. 57A is a close-up view illustrating the clamp structure of FIG. 57.
Figure 60A:
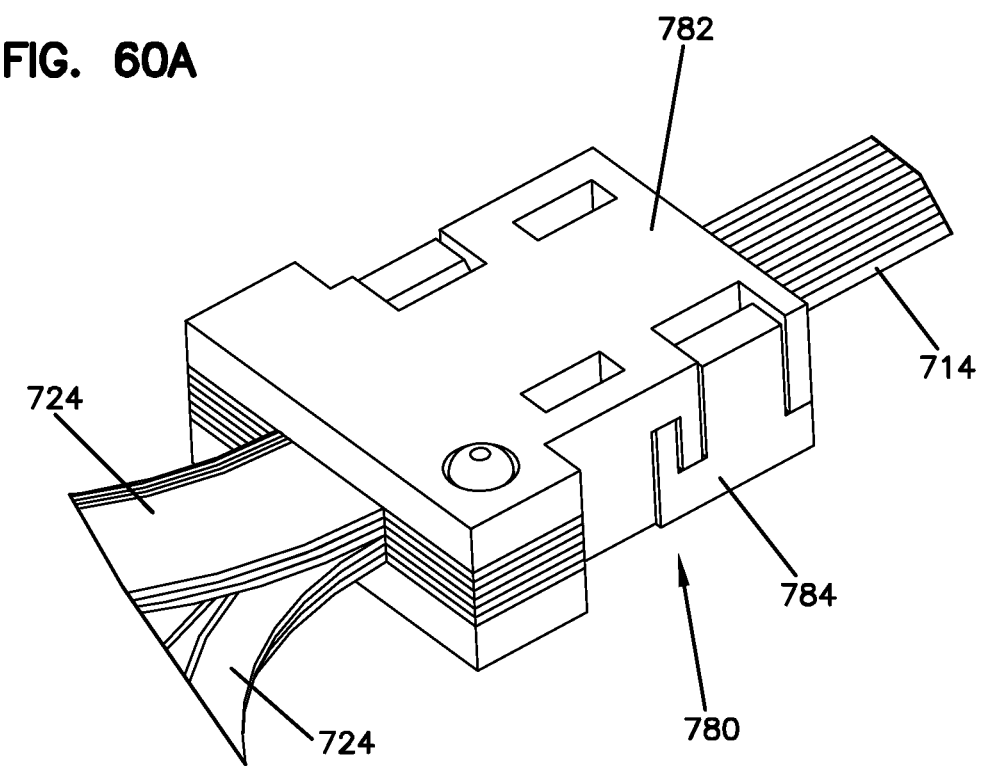
FIG. 60A is a close-up view illustrating the clamp structure of FIG. 60.
Figure 58:
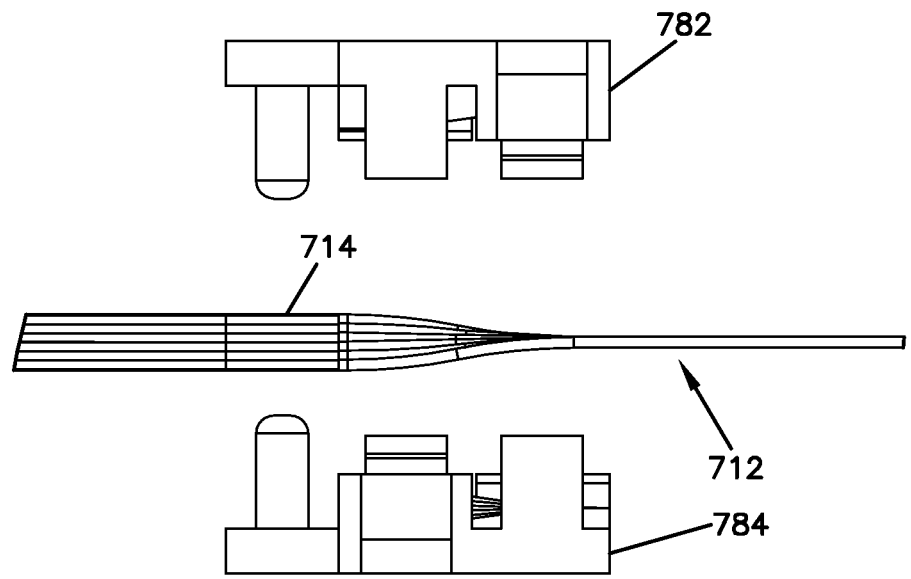
FIG. 58 is a right side exploded perspective view of the clamp structure of FIG. 56 and the plurality of duplex flexible optical circuits of FIG. 53.
Figure 59:
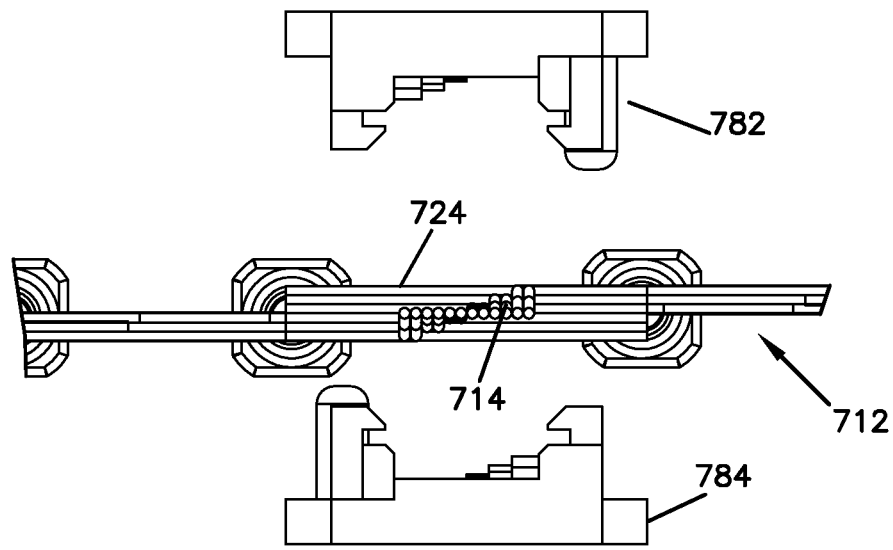
FIG. 59 is a rear exploded perspective view of the clamp structure of FIG. 56 and the plurality of duplex flexible optical circuits of FIG. 53.
Figure 60:
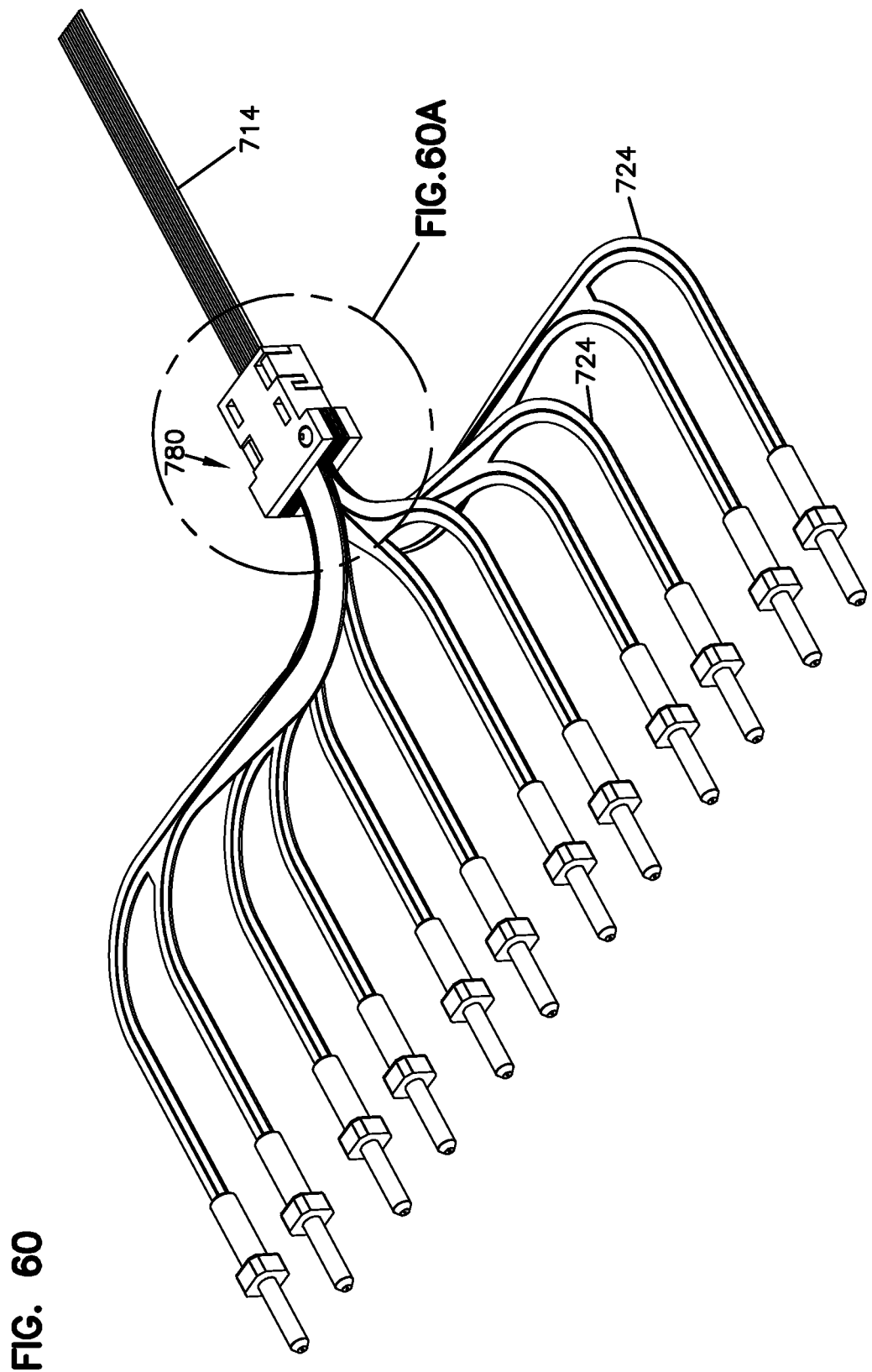
FIG. 60 illustrates the clamp structure of FIG. 56 and the plurality of duplex flexible optical circuits of FIG. 53 in a clamped arrangement.
Figure 61:
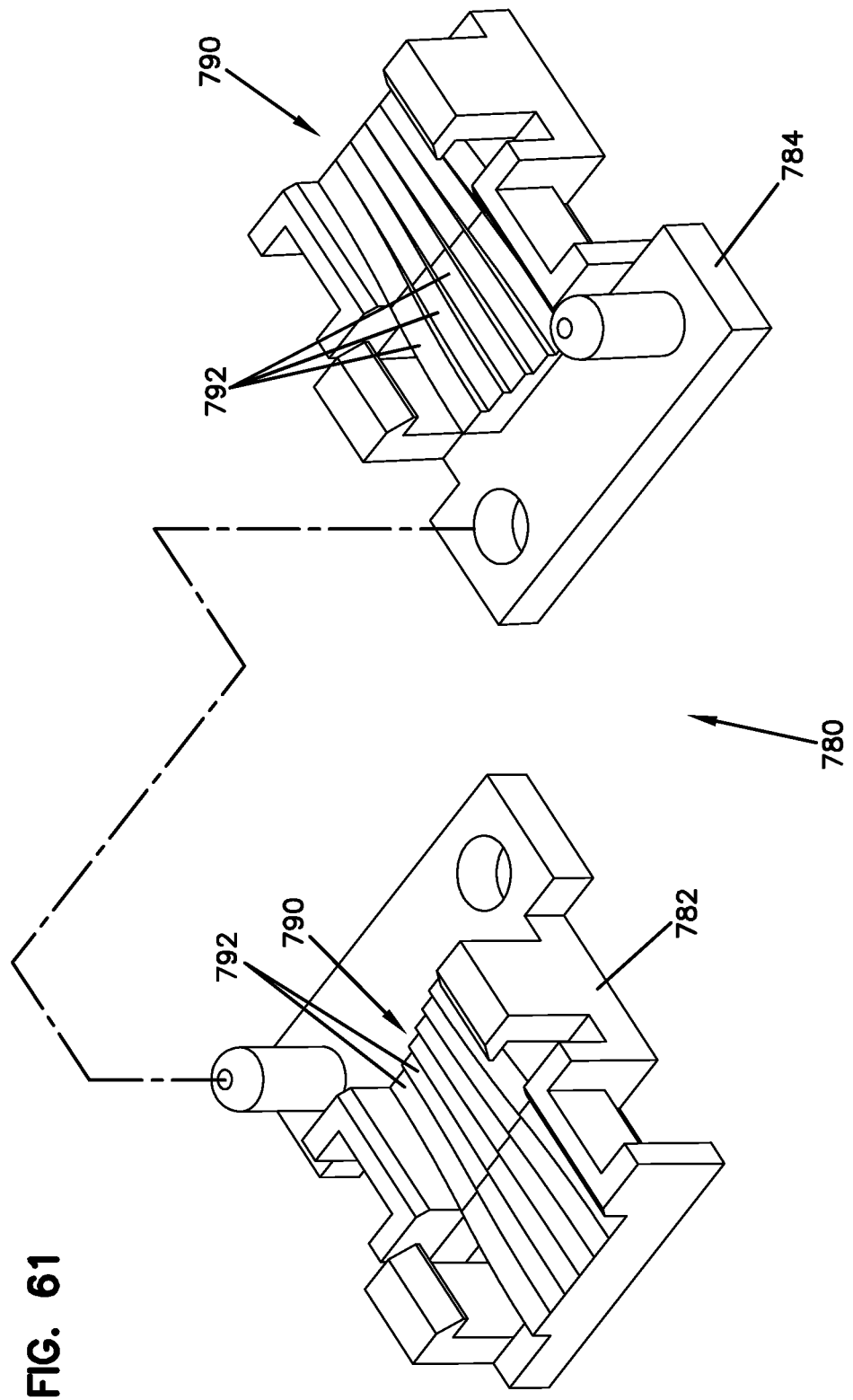
FIG. 61 illustrates the upper and lower members of the clamp structure of FIG. 56.

As shown in FIGS. 53-61, according to one embodiment, there may be six duplex flex circuits 712 including six substrates 724, totaling the twelve fibers 714 coming from an MPO connector. In such an embodiment, all six of the substrates 724 may be provided by, for example, manufacturing three different shapes and then flipping the three differently shaped substrates 180 degrees to provide the six needed duplex substrates 724 for the whole stack. As shown in FIGS. 53-55, the three different shapes would be configured such that, when stacked, front extensions 760 of the substrates 724 would be spaced apart to resemble the front extensions (e.g., 60, 160) of a single integral substrate (e.g., 24, 124, 224) and to fit within the internal configuration of a given cassette.

Referring now to FIGS. 54, 54A, 55, 55A, 56, 57, 57A, 58-60, 60A, and 61, since the portion of the fibers 714 that are to be terminated to the MT ferrule of an MPO connector have to be provided in a flat, ribbonized configuration for the termination and since the stacked flex circuits 712 have the fibers 714 in a stepped configuration, a clamp structure 780 that acts as a fiber transition device may be used within the cassette 712.

As shown in FIGS. 54, 54, 54A, 55, 55A, 56, 57, 57A, 58-60, 60A, and 61, the clamp structure 780 may include an upper member 782 that is snap fit to a lower member 784 with cantilever arms 786 that have tapered tabs 788. Both the upper and the lower members 782, 784 of the clamp structure 780 provide a fiber channel/guide 790 that includes steps 792 for transitioning the fibers 714 from a stepped configuration to a flat configuration for terminating to the MT ferrule 756 of an MPO connector 716. The clamp 780 is designed such that stacked flex fibers 714 are converted to a linear plane so they can be ribbonized while maintaining the minimum bend radius requirements of the fibers 714. The upper and lower members 782, 784 of the clamp structure 780 removably snap together for both holding the stacked substrates 724 in position and for controlling the transition of the fibers 714 while supporting bend radius limitations. If any of the flex substrates, the ferrules, or the fibers is damaged, the clamp structure 780 can be taken apart, removing the flex substrate 724 to be repaired or replaced.

According to certain embodiments, any of the cassettes described above and illustrated herein may have a length of 3 to 4 inches (parallel to the longitudinal direction A), a width of 2 to 3 inches (front to back), and a height of approximately ½ inch. More preferably, the length may be 3 to 3½ inches, the width may be 2 to 2½ inches, and the height may be ½ inch. The height can vary as needed, such as to accommodate different formats of adapters 5 or multiple rows of adapters 5.

Figure 62:
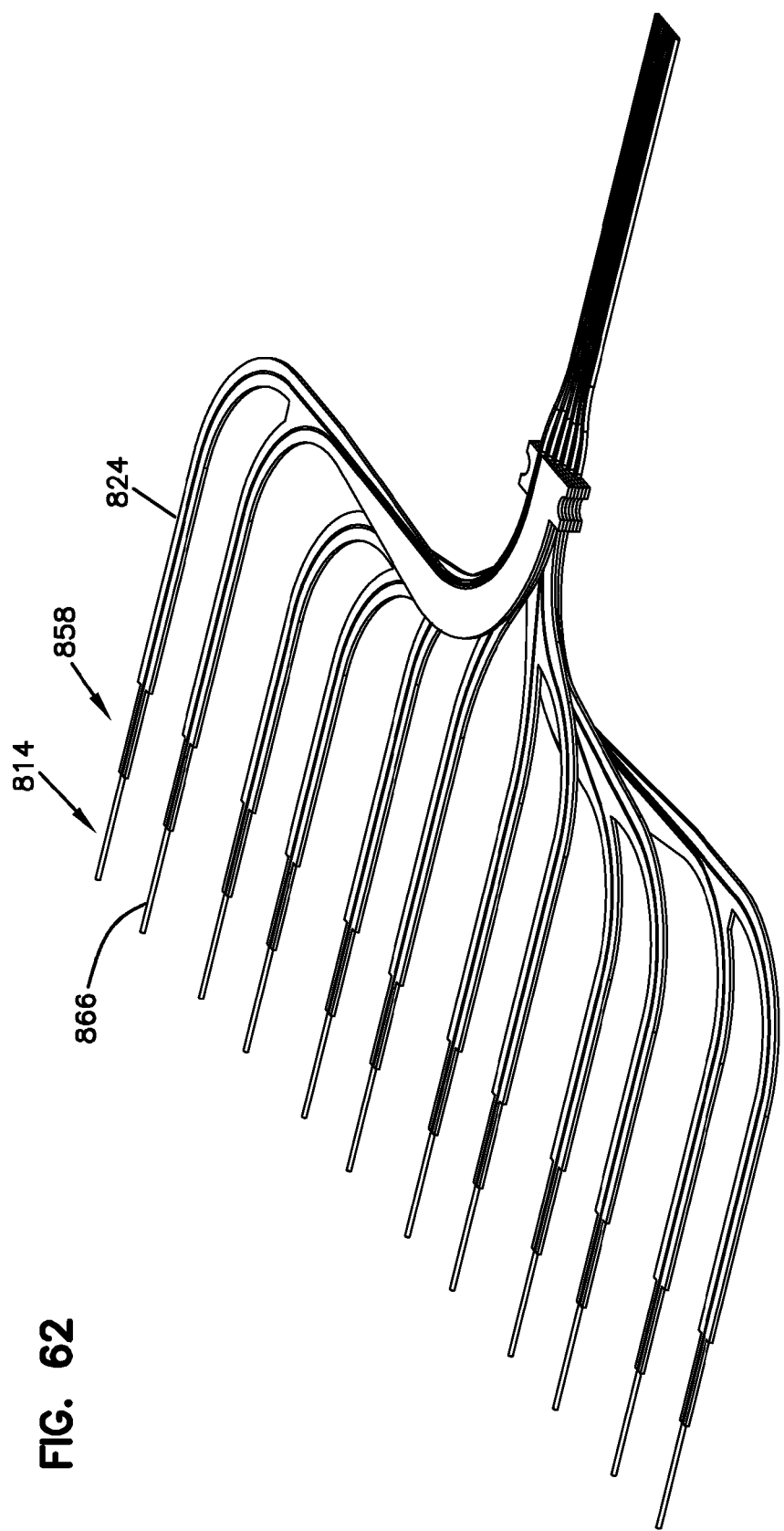
FIG. 62 is a top, rear, right side perspective view of a plurality of duplex flexible optical circuits similar to those of FIGS. 53-55 in a stacked arrangement, the duplex flexible optical circuits shown in an unterminated configuration.
Figure 63:
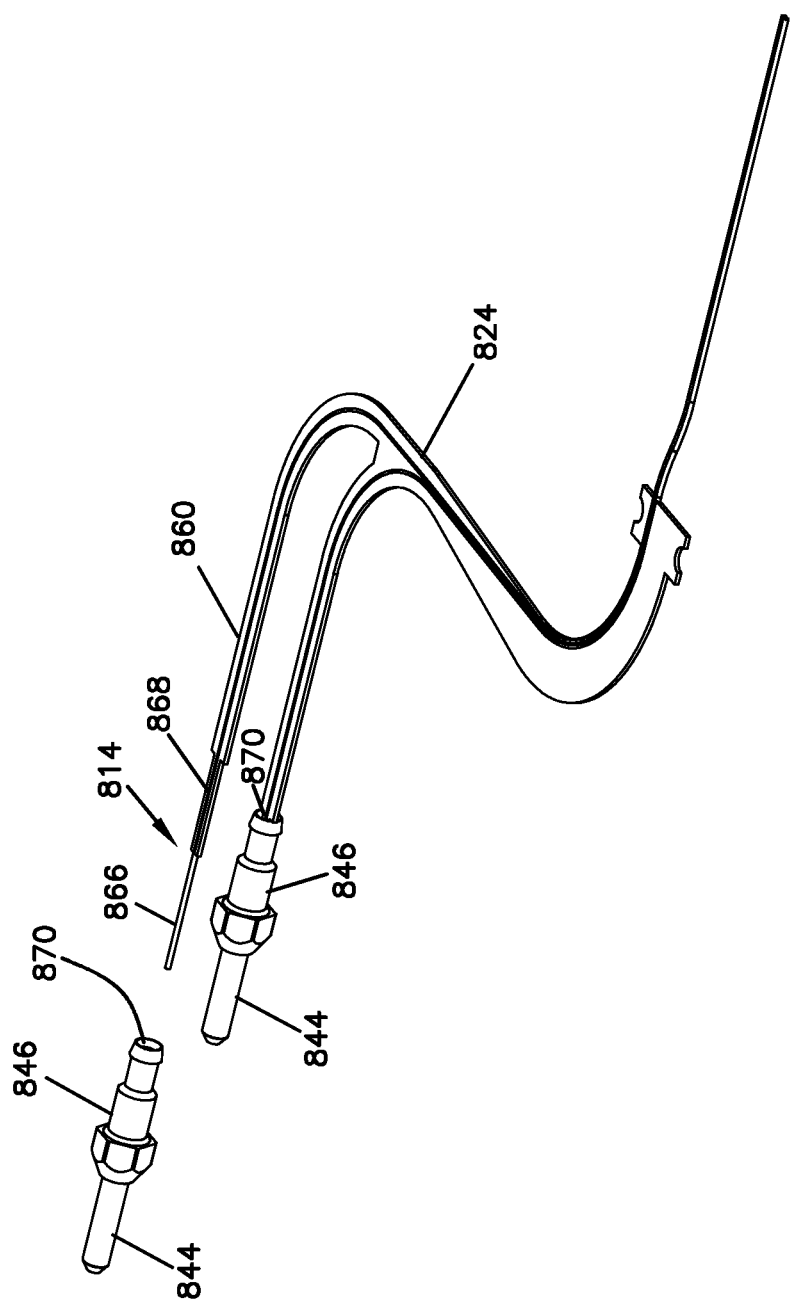
FIG. 63 illustrates one of the duplex flexible optical circuits of FIG. 62, wherein one of the pigtails is shown as terminated to a ferrule assembly and the other of the pigtails shown exploded off a ferrule assembly.
Figure 64:
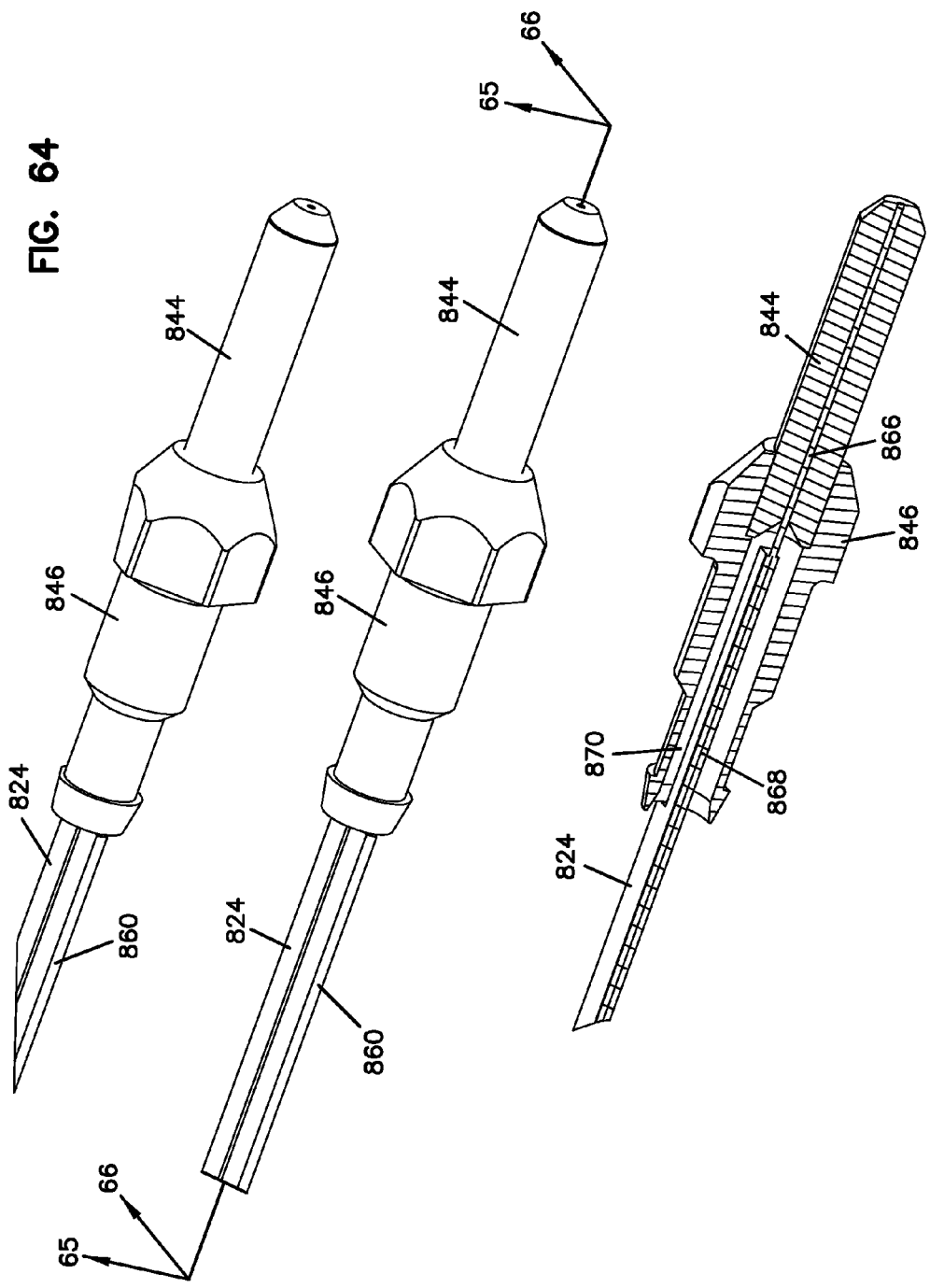
FIG. 64 illustrates a plurality of ferrule assemblies that have been terminated to the pigtails of the flexible optical circuits of FIGS. 62-63, wherein one of the terminated ferrule assemblies is shown in a cross-sectional view bisecting the ferrule assembly along its longitudinal axis.
Figure 65:
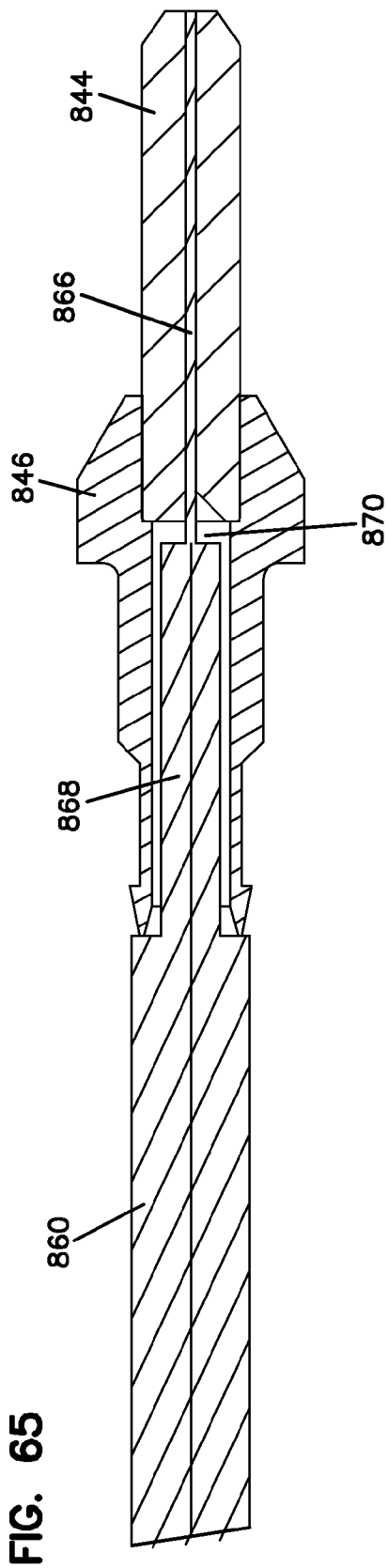
FIG. 65 is a cross-sectional view taken along line 65-65 of FIG. 64.
Figure 66:
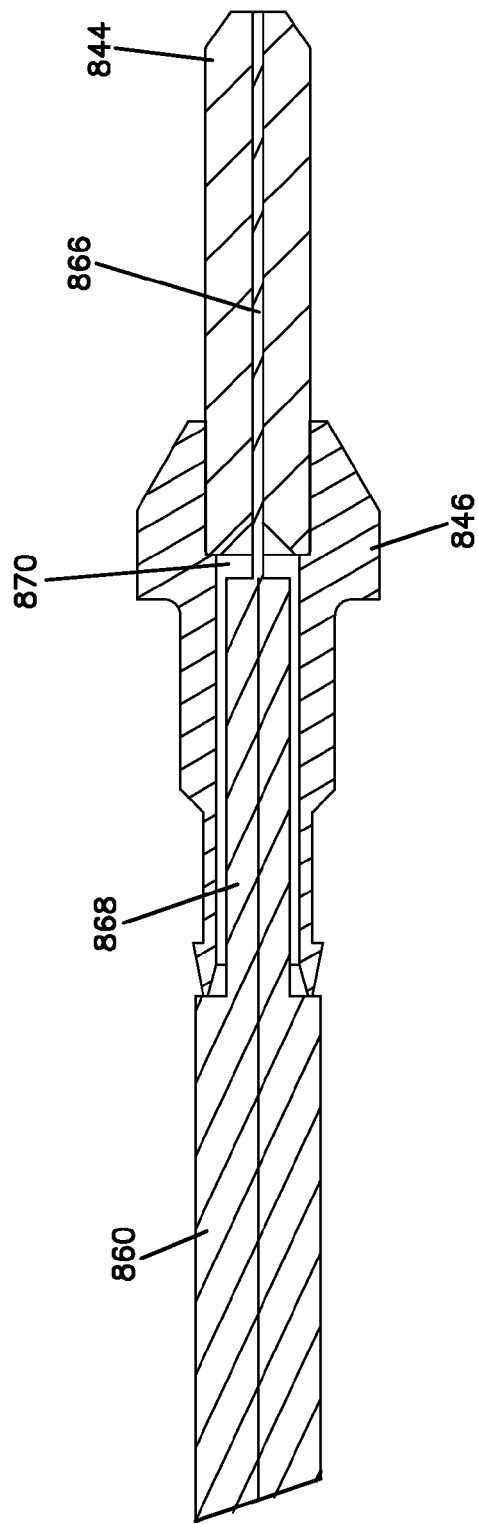
FIG. 66 is a cross-sectional view taken along line 66-66 of FIG. 64.
Figure 67:
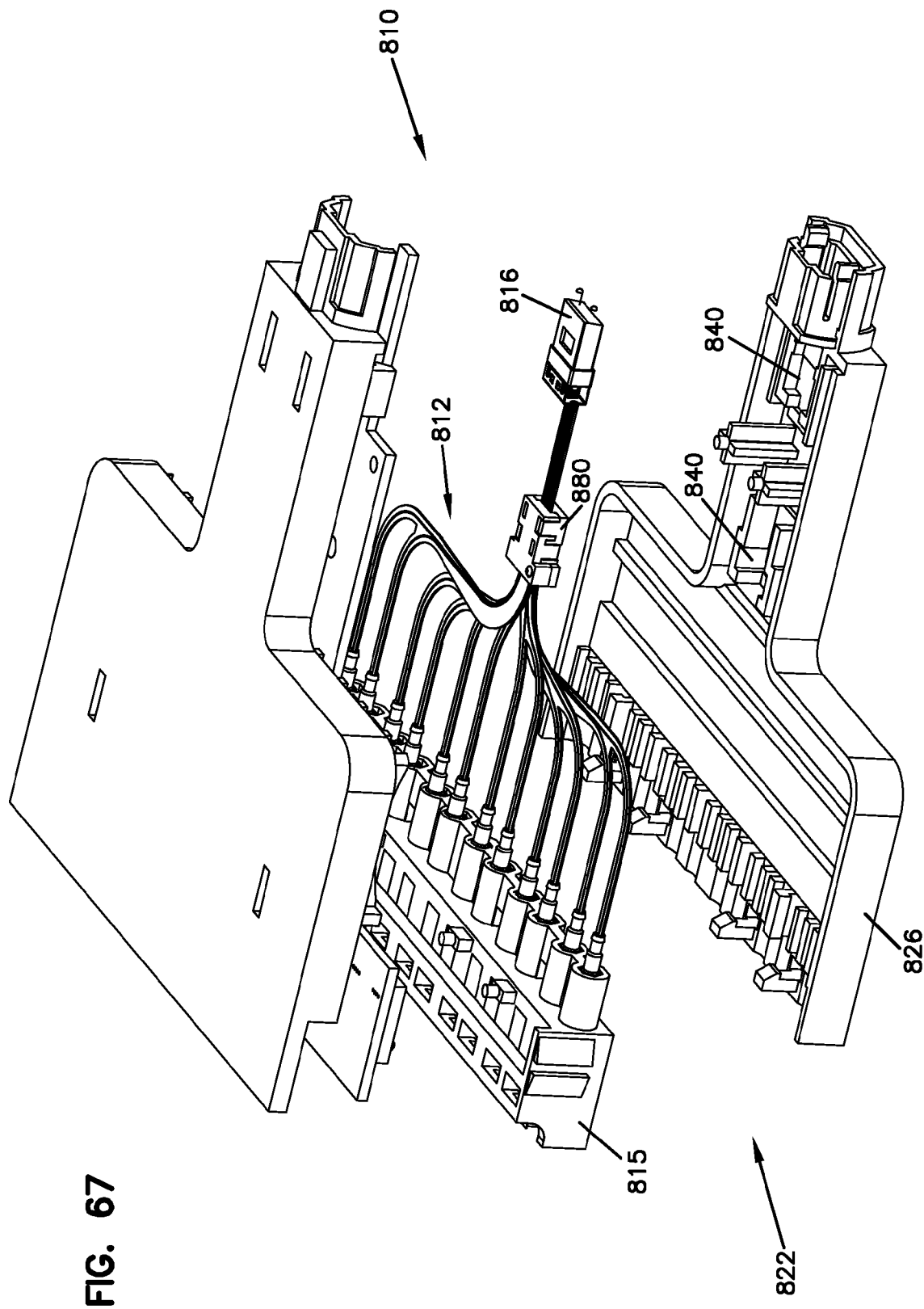
FIG. 67 is a top, rear, right side perspective view of another embodiment of a fiber optic cassette having features that are examples of inventive aspects in accordance with the present disclosure, the fiber optic cassette configured to house the duplex flexible optical circuits shown in FIGS. 62-64, the fiber optic cassette shown in a partially exploded configuration.
Figure 68:
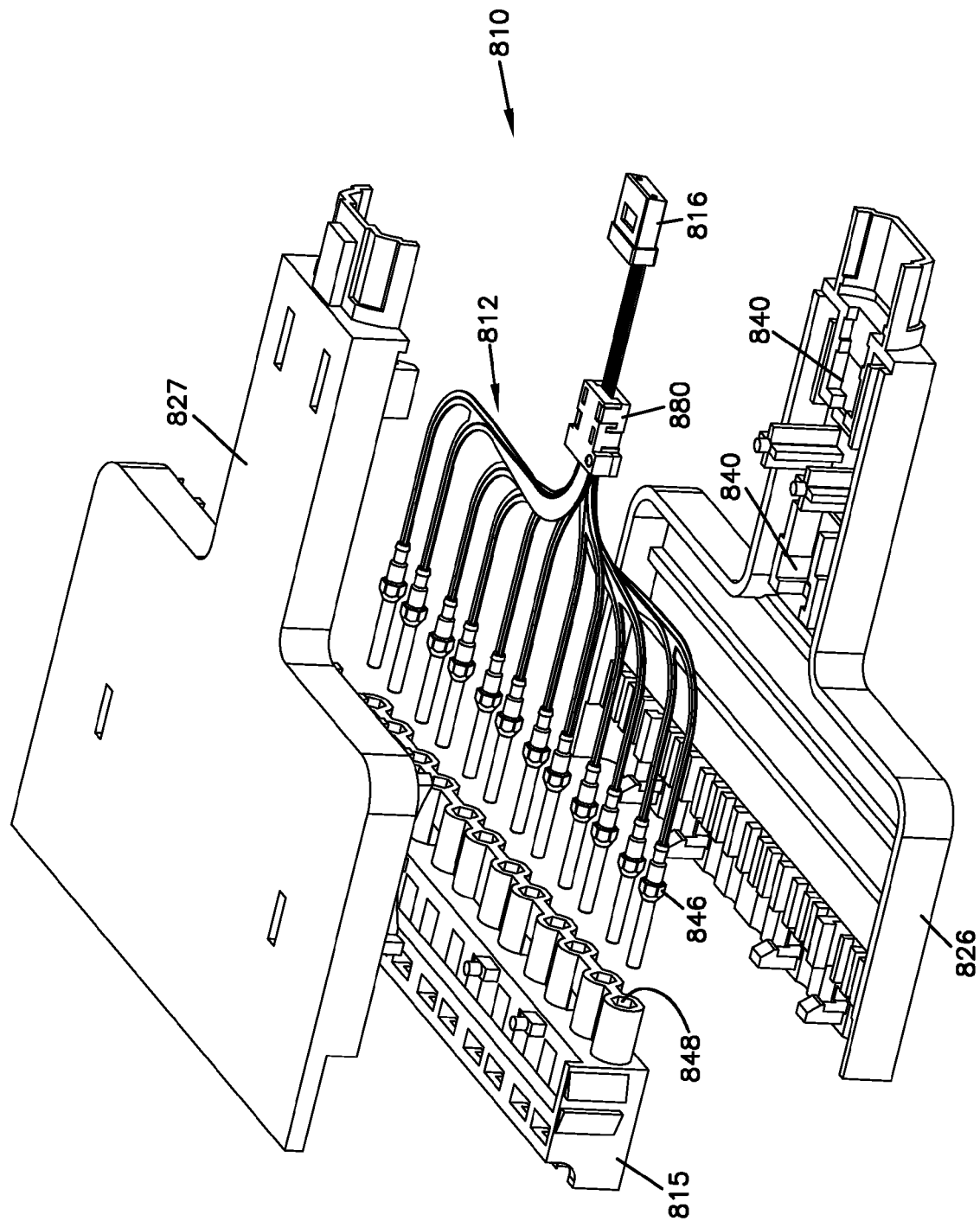
FIG. 68 illustrates the fiber optic cassette of FIG. 67 with the ferrule assemblies of the flexible optical circuits removed from the pockets of the adapter block of the cassette.
Figure 69:
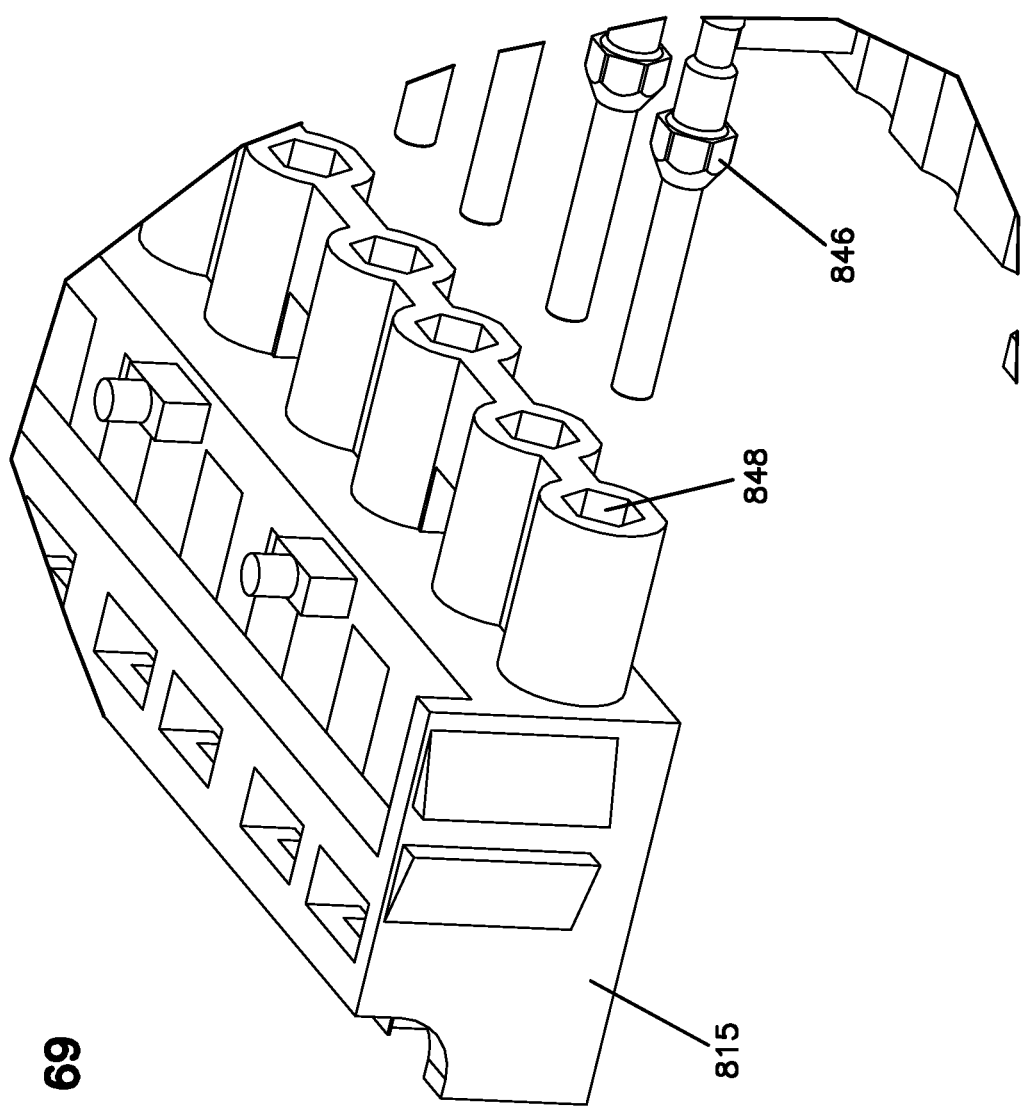
FIG. 69 is a close-up view of a portion of the fiber optic cassette of FIG. 68.
Figure 70:
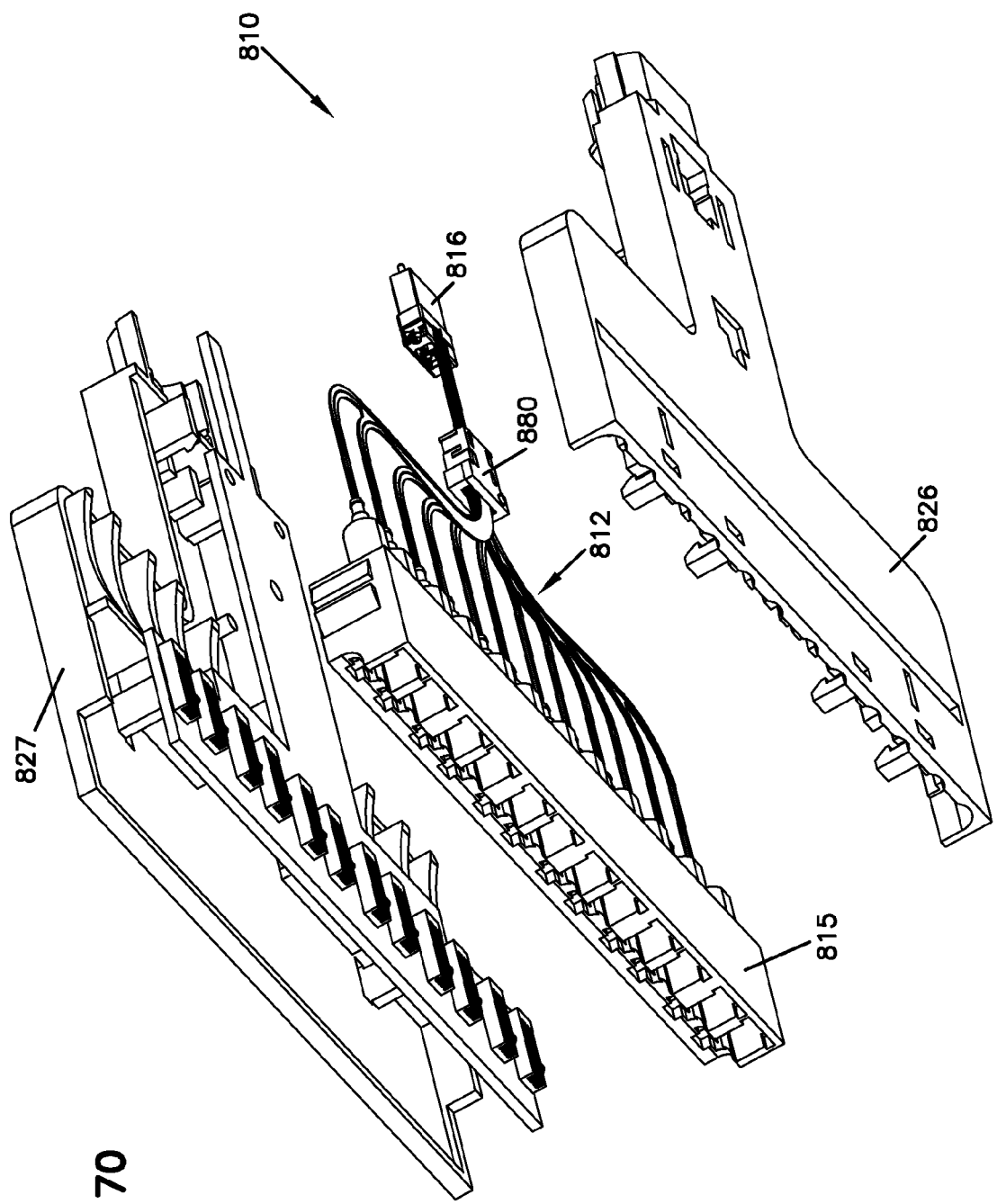
FIG. 70 illustrates the fiber optic cassette of FIG. 67 from a front, bottom, right side perspective view, the cassette shown in a partially exploded configuration.
Figure 71:
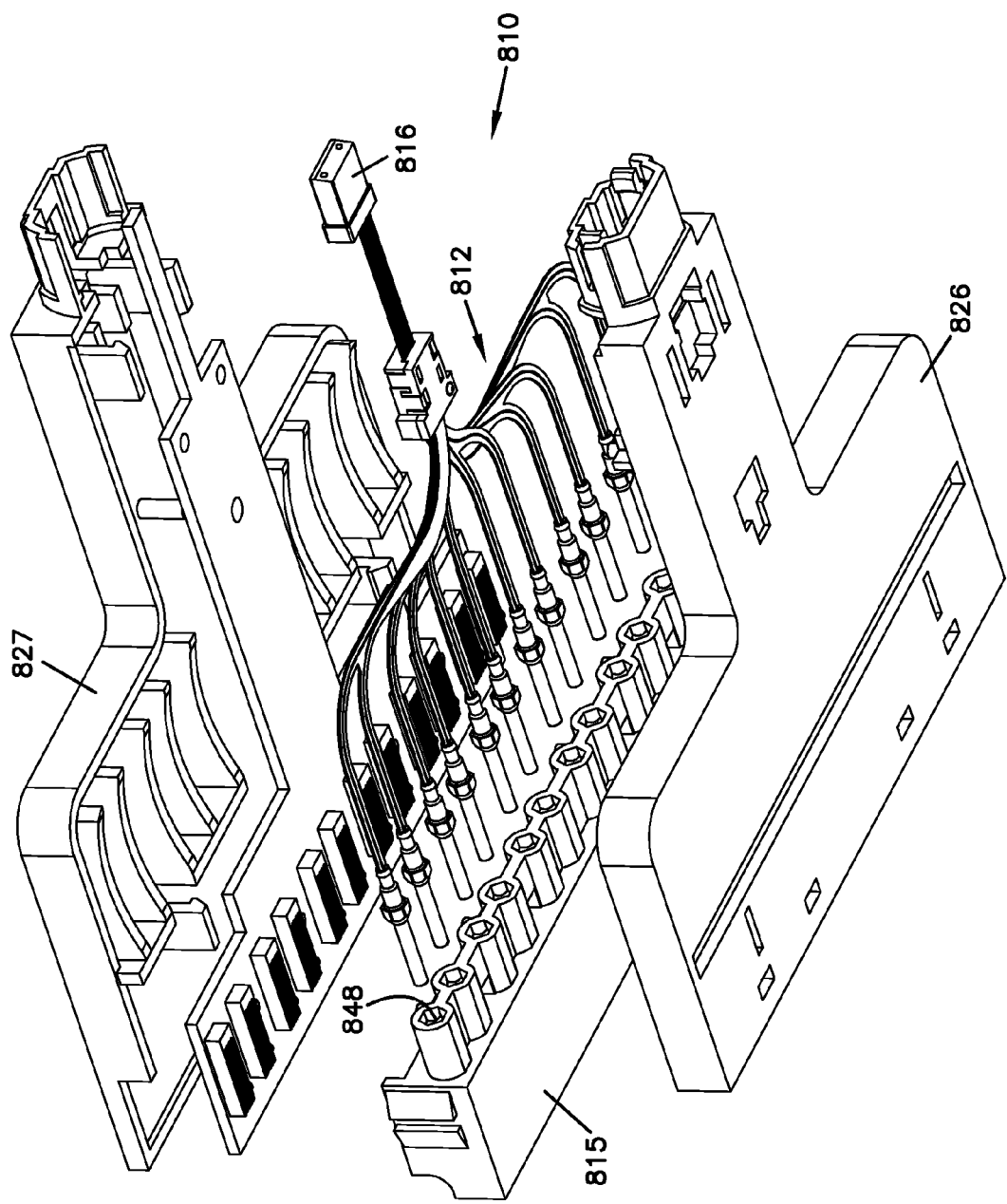
FIG. 71 illustrates the fiber optic cassette of FIG. 68 from a rear, bottom, right side perspective view.
Figure 72:
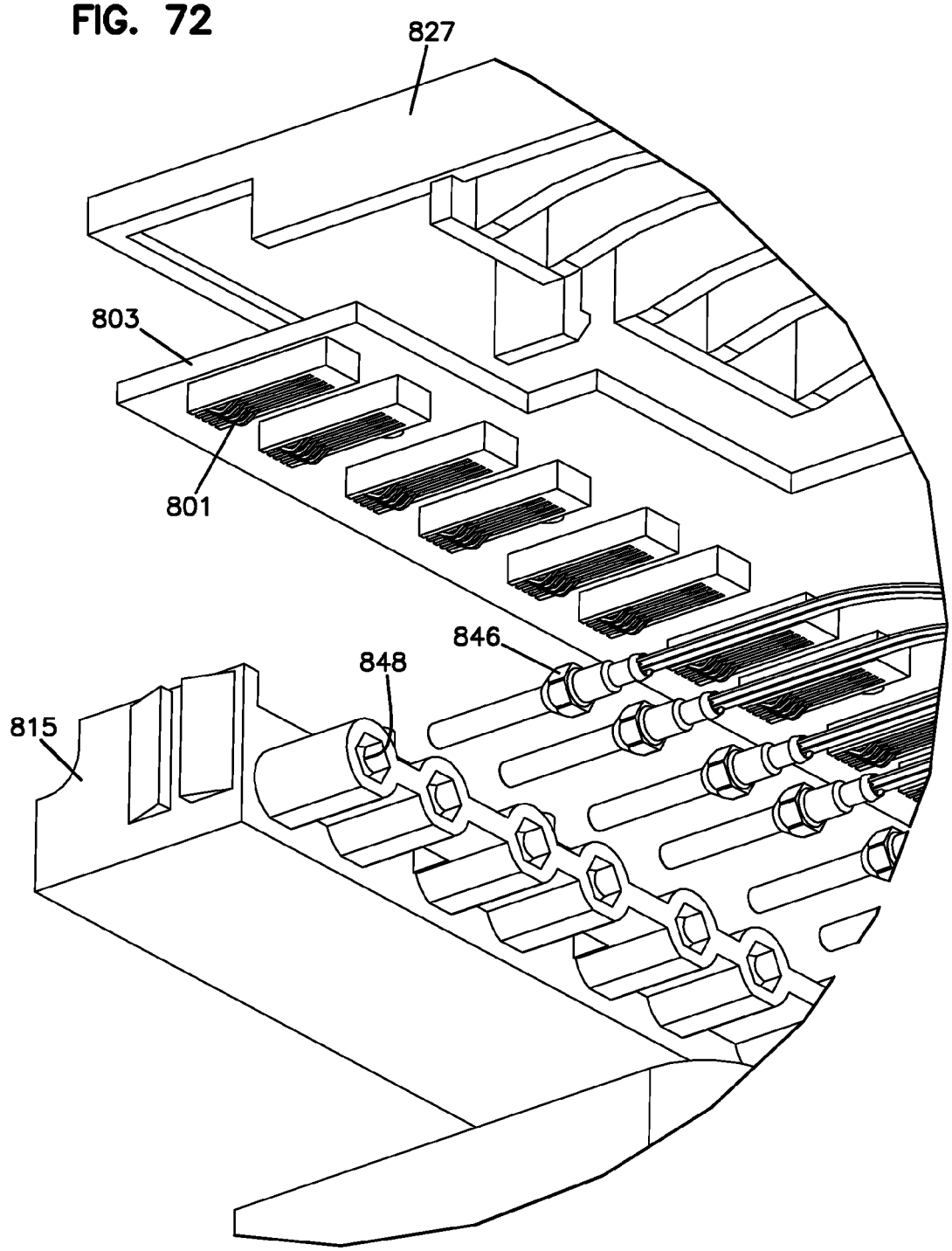
FIG. 72 is a close-up view of a portion of the fiber optic cassette of FIG. 71.

Referring now to FIGS. 62-66, another example method for terminating a fiber pigtail 814 extending out from a front end 858 of a flex substrate 824 to a ferrule of a non-conventional connector is illustrated. In the depicted embodiment, duplex flex circuits 812 similar to flex circuits 712 discussed above are used to illustrate the example termination method. As shown in FIG. 62, such duplex circuits 812 are provided in a stacked arrangement when being placed into a cassette body. According to the embodiment shown in FIGS. 62-66, the pigtails 814 that are to be individually terminated to ferrules 844 are formed by stripping a portion of the flex substrate 824 (including a primary coating layer of the fiber) such that an optical fiber 866 formed from a combination of a fiber core and a cladding layer is left. In certain embodiments, the optical fiber 866 formed from the fiber core and the cladding layer may be 125 micron in cross-dimension. The primary coating layer that is stripped is generally around 250 micron in cross-dimension according to one embodiment. The optical fiber 866 extends from a portion 868 of a front extension 860 of the flex substrate 824 that is to be inserted into the ferrule hub 846. According to certain embodiments, portion 868 defines a generally square cross-sectional shape having side dimensions of 0.5 mm each. Thus, the square cross-sectional portion 868 is able to be inserted into a cylindrical bore 870 extending through the center of a ferrule hub 846, which may be about 0.9 mm in diameter (see FIGS. 63-66). The exposed optical fiber 866 that is made up of the fiber core and the surrounding cladding (after the primary coating has been stripped) is inserted into the ferrule 844, as seen in FIGS. 64-66.

Now referring to FIGS. 67-73, an example of a cassette 810 that is configured for receiving stacked flex circuits such as the flex circuits 812 shown in FIGS. 62-66 is illustrated. The cassette 810 is similar in certain aspects to the cassettes 10, 110, and 210 shown in previous embodiments. However, the cassette 810 defines pockets 848 at the front end 822 of the cassette body that match the exterior shape of the ferrule hubs 846 (e.g., having hexagonal footprints), wherein the pockets 848 are configured to fully surround the ferrule hubs 846. The pockets 848 are formed from portions of the cassette body that are integrally formed with the adapter block 815 of the cassette 810. As shown, the adapter block 815 is removably inserted into the cassette body 826. The pockets 848, also having a hexagonal configuration, match the exterior shape of the ferrule hubs 846 and prevent rotation of the hubs therewithin. In this manner, the hubs are retained in a stable manner during termination, assembly, polishing, etc.

Even though the ferrule hubs 846 and the matching pockets 848 have been illustrated with a hexagonal cross-section in the depicted embodiment, in other embodiments, the keying mechanism can be provided using different cross-sectional shapes having flat portions (such as square, rectangular, etc.). For example, an embodiment of a ferrule usable with the cassettes of the present disclosure having squared ferrule hubs has been shown in FIGS. 53-57 and 60.

As shown, the cassette body 826 defines pockets 840 for receiving a clamp structure 880 (similar to the clamp structure 780 of FIGS. 56-61) and an MPO connector 816 that is terminated to the rear ends of the individual duplex flex substrates 824.

Still referring to FIGS. 67-73, the embodiment of the cassette 810 used with the stacked duplex flex circuits 812 has been illustrated with further additional aspect that may be used on the cassettes (e.g., 10, 110, 210) of the earlier embodiments. For example, in accordance with some aspects, certain types of adapters that form the adapter blocks at the fronts of the cassettes may be configured to collect physical layer information from one or more fiber optic connectors (e.g., LC connectors) received thereat. Certain types of adapters may include a body configured to hold one or more media reading interfaces that are configured to engage memory contacts on the fiber optic connectors. The one or more media reading interfaces may be positioned in each adapter body in different ways. In certain implementations, the adapter body may define slots extending between an exterior of the adapter body and an internal passage in which the ferrules of the connectors are received. Certain types of media reading interfaces may include one or more contact members that are positioned in such slots. A portion of each contact member may extend into a respective one of the passages to engage memory contacts on a fiber optic connector.

Figure 73:
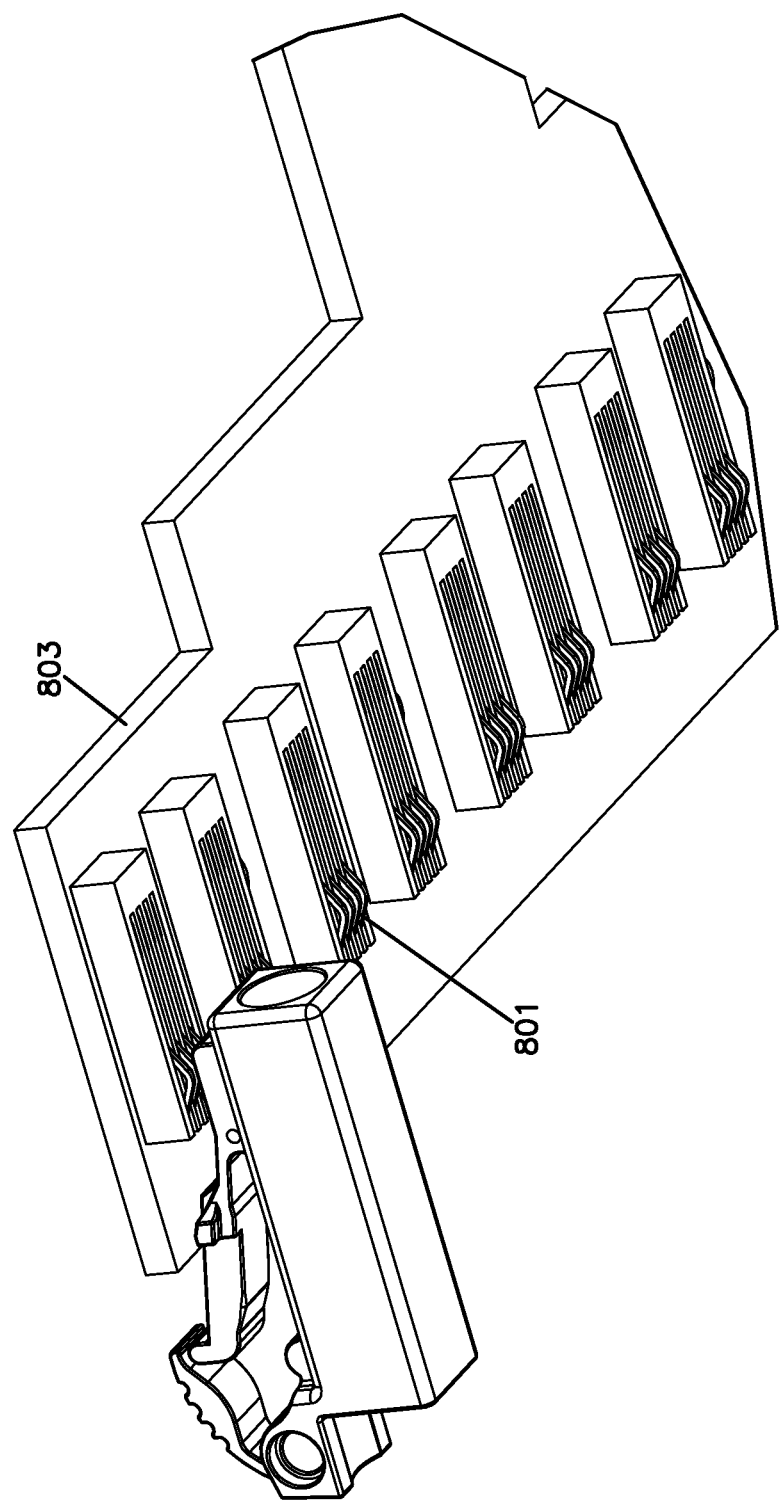
FIG. 73 illustrates a fiber optic connector making electrical contact with media reading interfaces of the printed circuit board of the cassette of FIGS. 67-72.

In the depicted example of the cassette 810 of FIGS. 67-73, the contacts 801 that extend into each of the adapter passages of the block 815 are on a removable structure. The contacts 801 are defined on a printed circuit board 803 that is placed between the flexible circuits 812 and the cover 827 of the cassette 810. The contacts 801 align with the top sides of the adapter passages and extend into the adapter passages so as to engage memory contacts of fiber optic connectors inserted into the adapter passages. The printed circuit board 803 is designed to relay the electrical signals from the contacts 801 at the front of the cassette 810 to the rear of the cassette 810 as shown in FIGS. 67-73. A conductive path may be defined by the printed circuit board 803 between the contacts 801 of the adapters at the front end with a master circuit board. The master circuit board may include or connect (e.g., over a network) to a processing unit that is configured to manage physical layer information obtained by the media reading interfaces. FIG. 73 illustrates a fiber optic connector making electrical contact with the media reading interfaces 801 of the printed circuit board 803 of the cassette 810.

Example adapters having media reading interfaces and example fiber optic connectors having suitable memory storage and memory contacts are shown in U.S. application Ser. No. 13/025,841, filed Feb. 11, 2011, titled "Managed Fiber Connectivity Systems," the disclosure of which is hereby incorporated herein by reference.

In addition to the various uses and applications of the described cassettes, the cassettes can be used to terminate the fibers of a multi-fiber FOT cable, such as a 144-fiber cable, to make installation of the terminated cables easier and faster.

One advantage of the disclosed cassettes is that handling in the field of individual connectors, MPO connectors, or fanouts with upjackets are eliminated. The dimensions of the cassettes 10, 110, 210, 810 may be reduced by using flexible substrates (e.g., 24, 124, 224, 824) that allow optimization of the bend radius limits of the fibers by fixing the fibers in a given footprint or pattern. Also, manual handling and termination of individual fibers within the cassettes is reduced or eliminated, wherein automated, repeatable terminations may be provided within the cassettes.

The cassettes described and illustrated herein may be used by being mounted to different types of telecommunications fixtures. The cassettes of the present disclosure may be fixedly mounted or mounted, for example, as part of slidably movable modules or packs.

Although in the foregoing description, terms such as "top", "bottom", "front", "back", "right", "left", "upper", and "lower were used for ease of description and illustration, no restriction is intended by such use of the terms. The telecommunications devices described herein can be used in any orientation, depending upon the desired application.

Having described the preferred aspects and embodiments of the present disclosure, modifications and equivalents of the disclosed concepts may readily occur to one skilled in the art.

However, it is intended that such modifications and equivalents be included within the scope of the claims which are appended hereto.

The above examples include flexible optical circuits connecting a multi-fiber (MPO) connector to individual fiber connectors. FIGS. 74-85 show various examples of multi-fiber connector (MPO) to multi-fiber connector (MPO) connections with a flexible optical circuit.

Twelve fiber connectors are known (including a single row or multiple rows of twelve fibers (for example, 2-6 rows)). Some examples use the twelve fiber connectors, but not all fibers are signal/light carrying. These fibers are dark or unused but still part of the flexible foil. Such a construction enables ease of assembly by connecting all twelve (or multiples of twelve) fibers at the same time. If the unused fibers were not present, there is a chance the multi-fiber ferrule could become damaged during polishing if open bores were present through the ferrule.

Multiple layers of flexible foil can be used as desired with one or more multi-fiber connectors to improve ease of assembly and fiber management.

FIGS. 74-85 show various examples of flexible foils and multi-fiber connectors. The foils can be housed in cassettes where the connectors are connected to adapters as part of the cassettes. The foils can be used in other equipment without being housed in a cassette.

The foils are easier to handle during assembly since the fibers are handled as a group (or subgroup). To terminate to a connector 16, the substrate is removed as is the fiber coating, then the glass fibers are connected to the ferrule of the multi-fiber connector 16 in a traditional manner, such as with epoxy.

Figure 74:
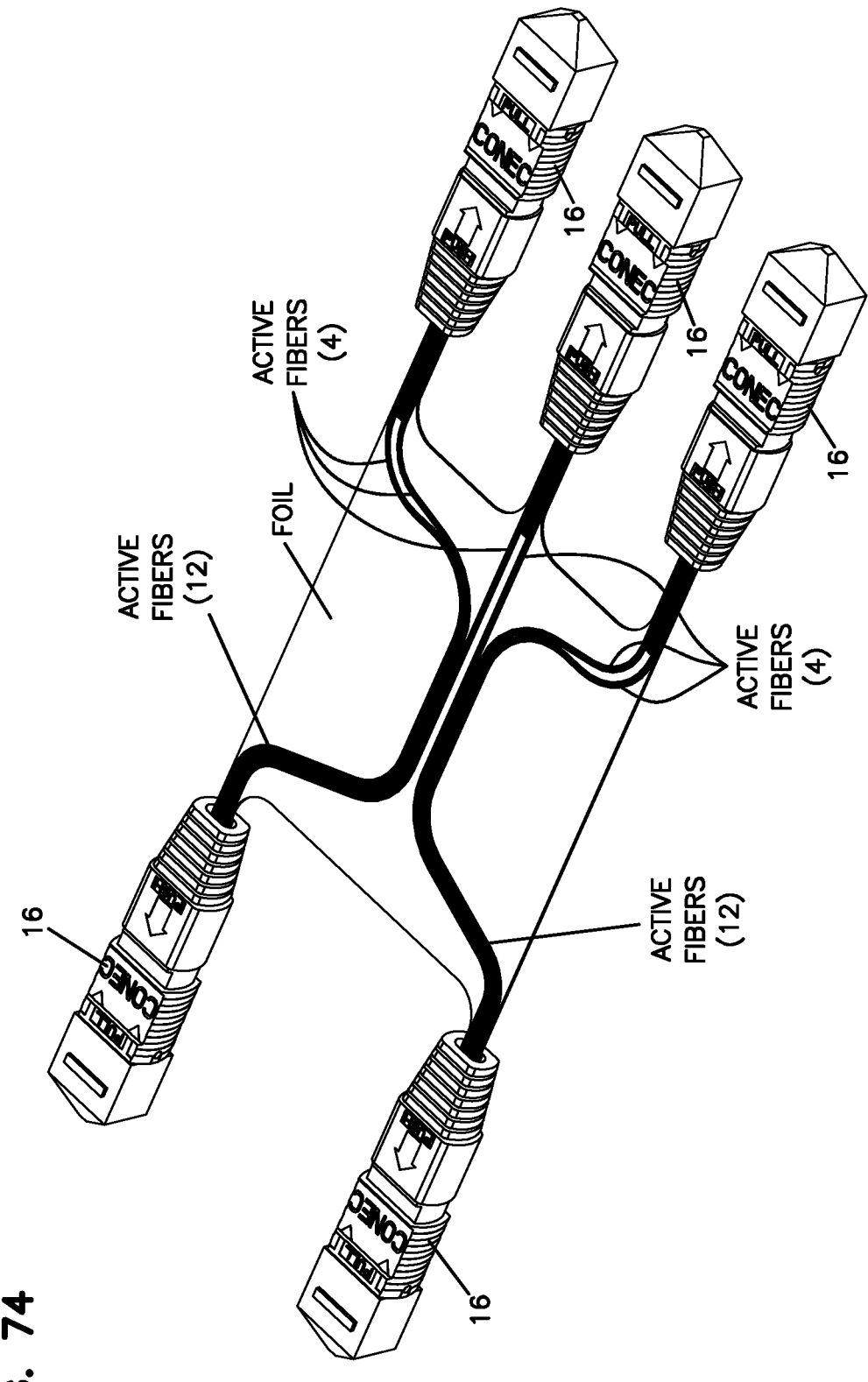
FIG. 74 is a perspective view of a first embodiment of a flexible foil including dark fibers.
Figure 75:
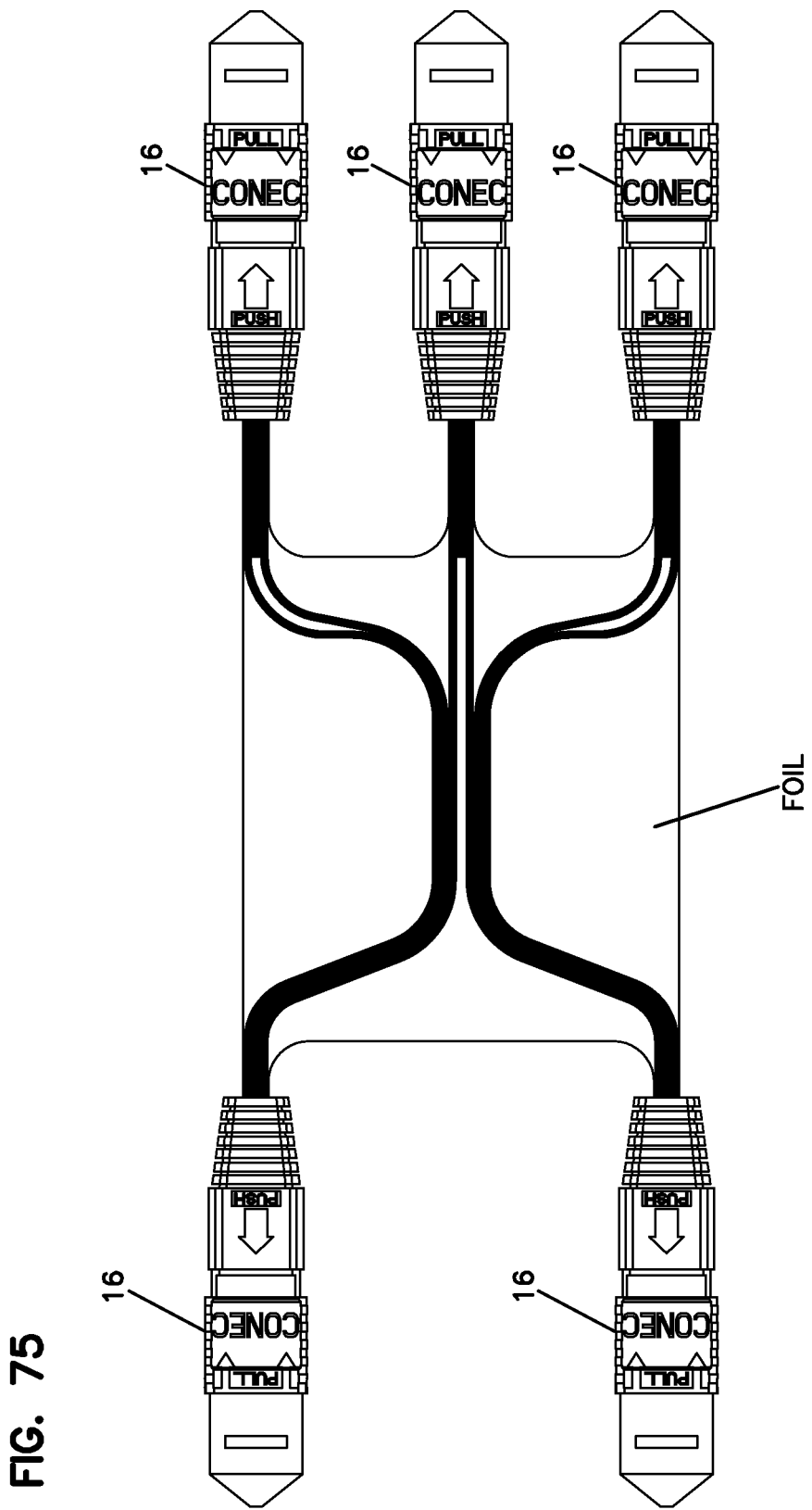
FIG. 75 is a top view of the flexible foil of FIG. 74.
Figure 76:
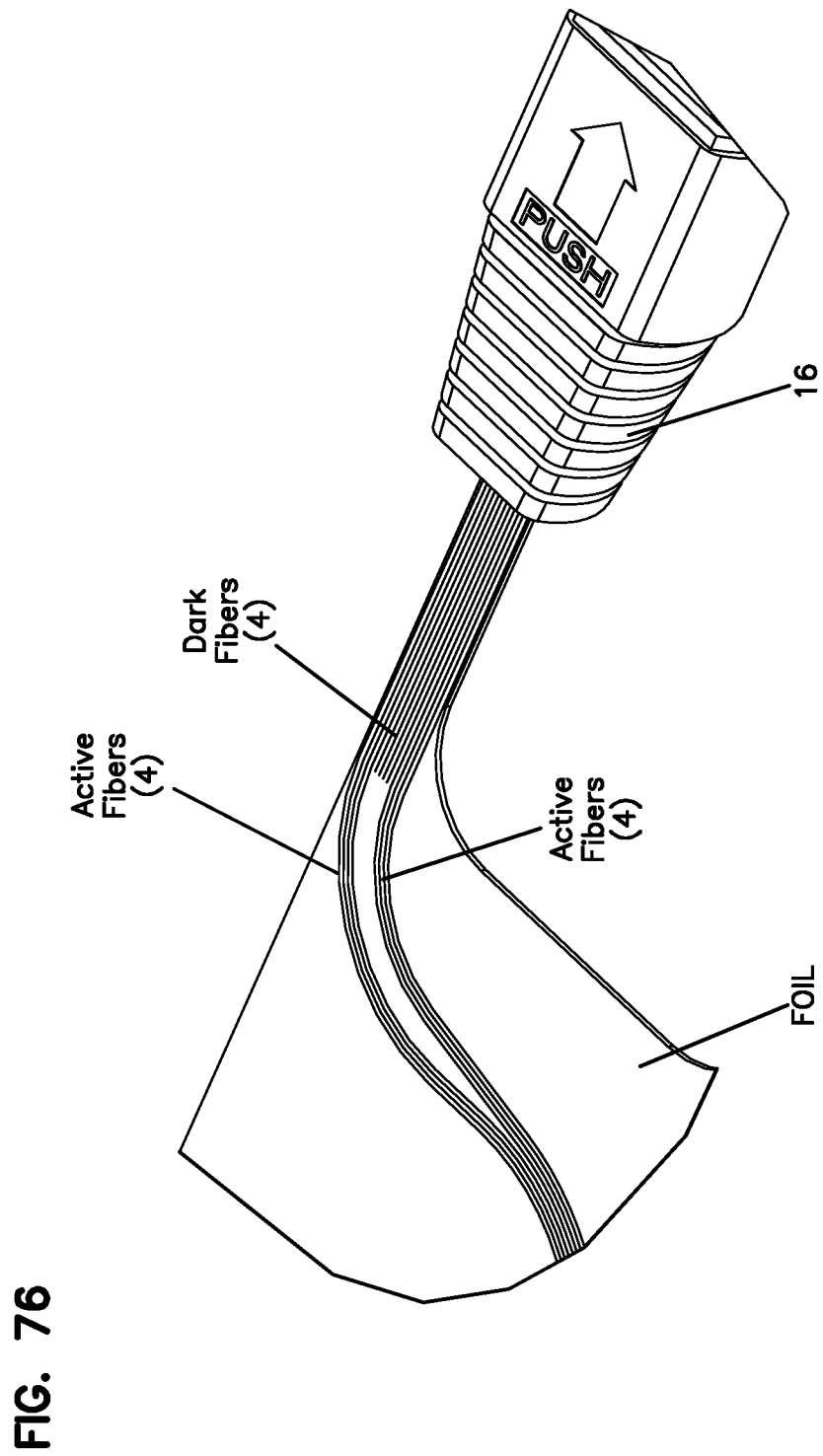
FIG. 76 is an enlarged view of a portion of the flexible foil of FIG. 74, showing the placement of the dark fibers.

Referring to FIGS. 74-76, the flex foil is shown with multiple connectors 16 connected to various fibers organized and supported by the foil. In the example shown, not all of the fibers provided carry signals. Specifically, on the side of the foil with three connectors 16, only eight of the twelve fibers carry signals, and the middle four, are dark fibers.

Referring now to FIGS. 77-83, various examples of foils and connectors are shown with different routings. In some cases, the fibers are inactive, or dark. In some applications, these fibers can be used for carrying other signals.

Figure 77:
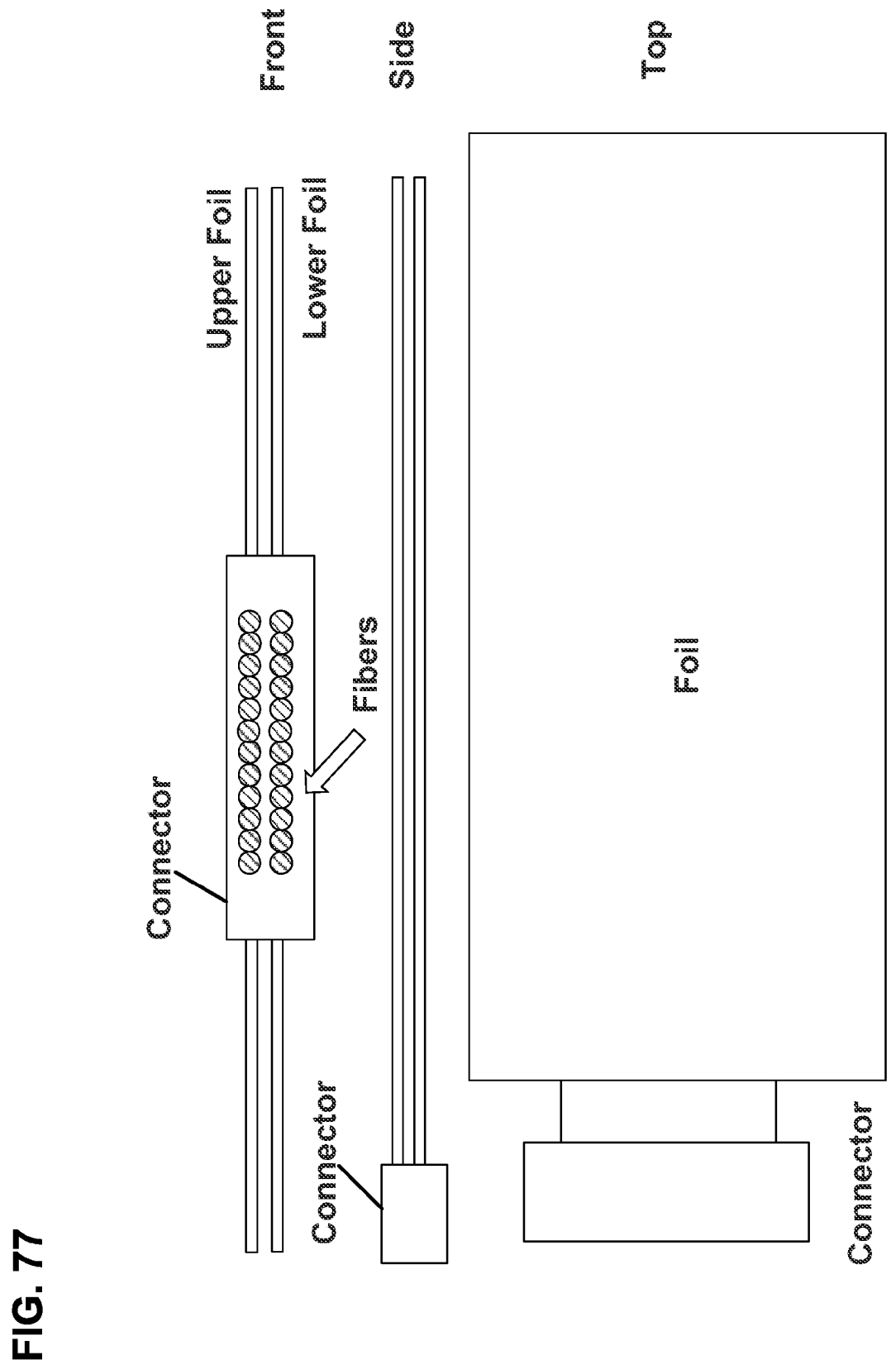
FIG. 77 shows multiple foil layers connected to a multi-fiber connector having multiple rows of fibers (all fibers live)

In FIG. 77, foil variants are shown where the connector rows terminate to different foils. A top row terminates to a top foil, and a bottom row terminates to a bottom foil. The foils could have different origins.

Figure 78:
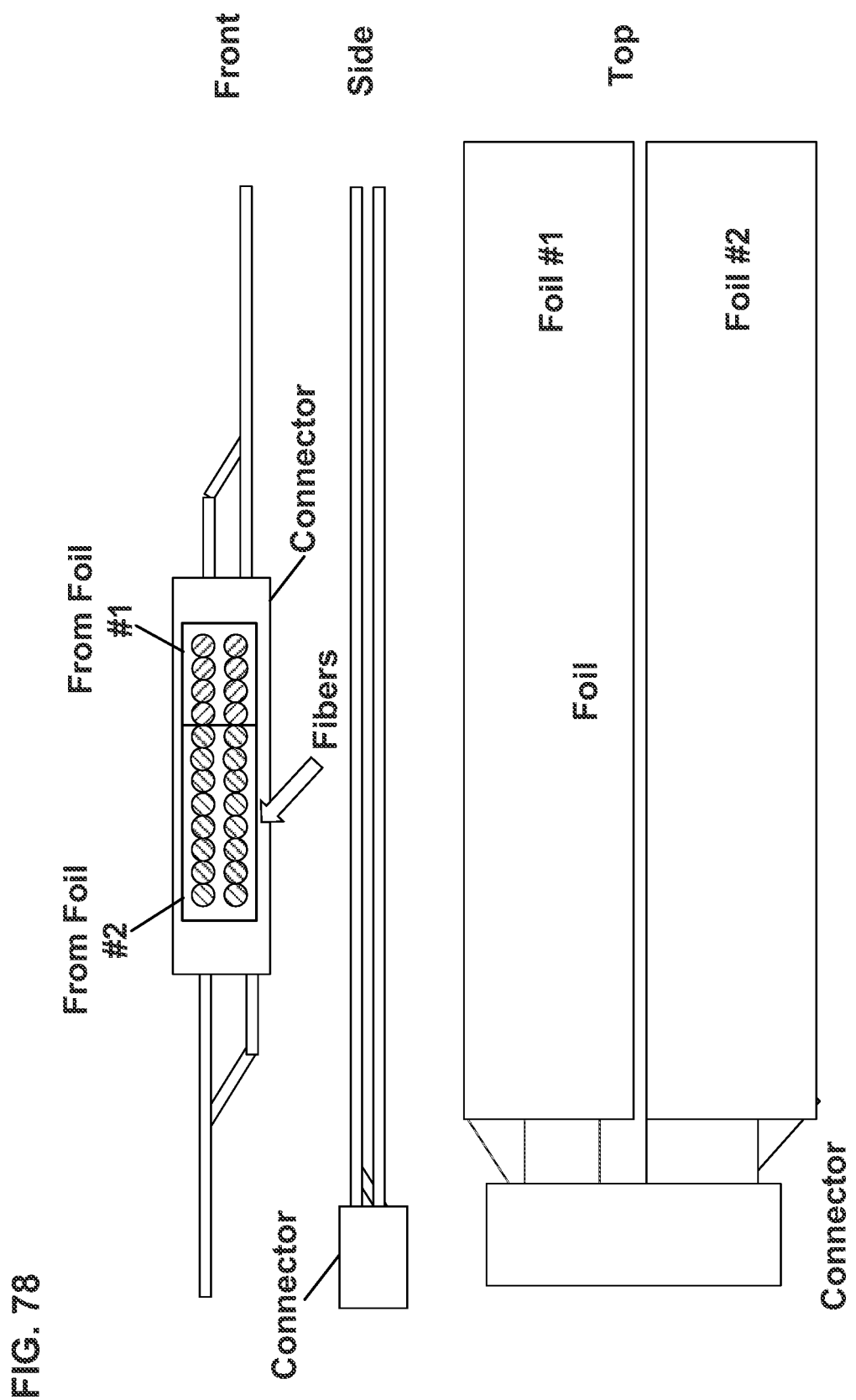
FIG. 78 shows multiple foil layers connected to a multi-fiber connector wherein different rows of the fibers of the connector are connected to different foils.

In FIG. 78, foil variants are shown where the connector rows terminate to different foils. A row is shared between foils. There could be more than two foils.

Figure 79:
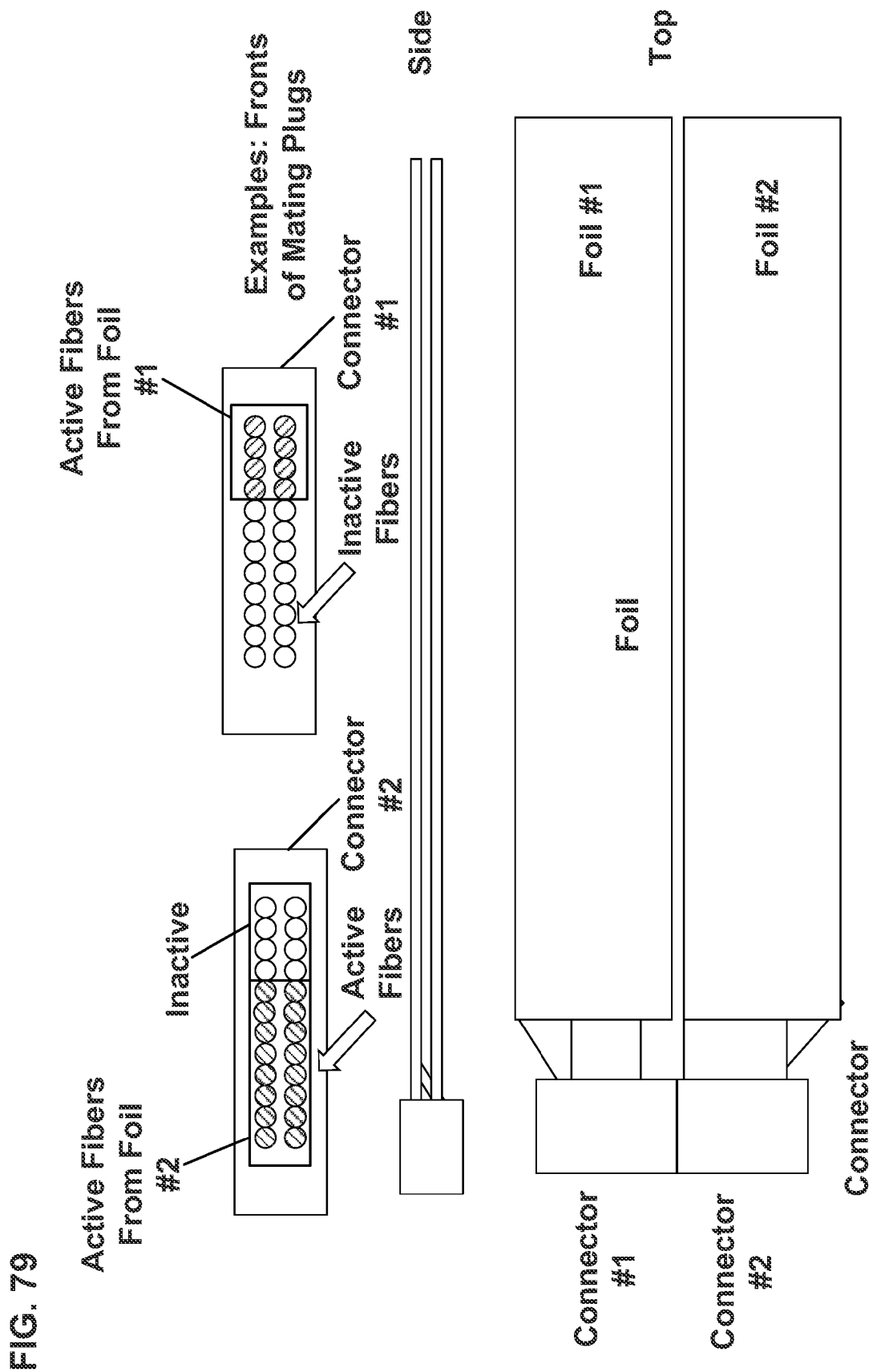
FIG. 79 shows multiple foils connecting a single connector to two multi-fiber connectors wherein each of the multi-fiber connectors include inactive fibers which can be filled with dark fibers, or connected to an alternate source.

In FIG. 79, foil variants are shown where the connector rows terminate to different foils. The mating plug can be selectively loaded.

Figure 80:
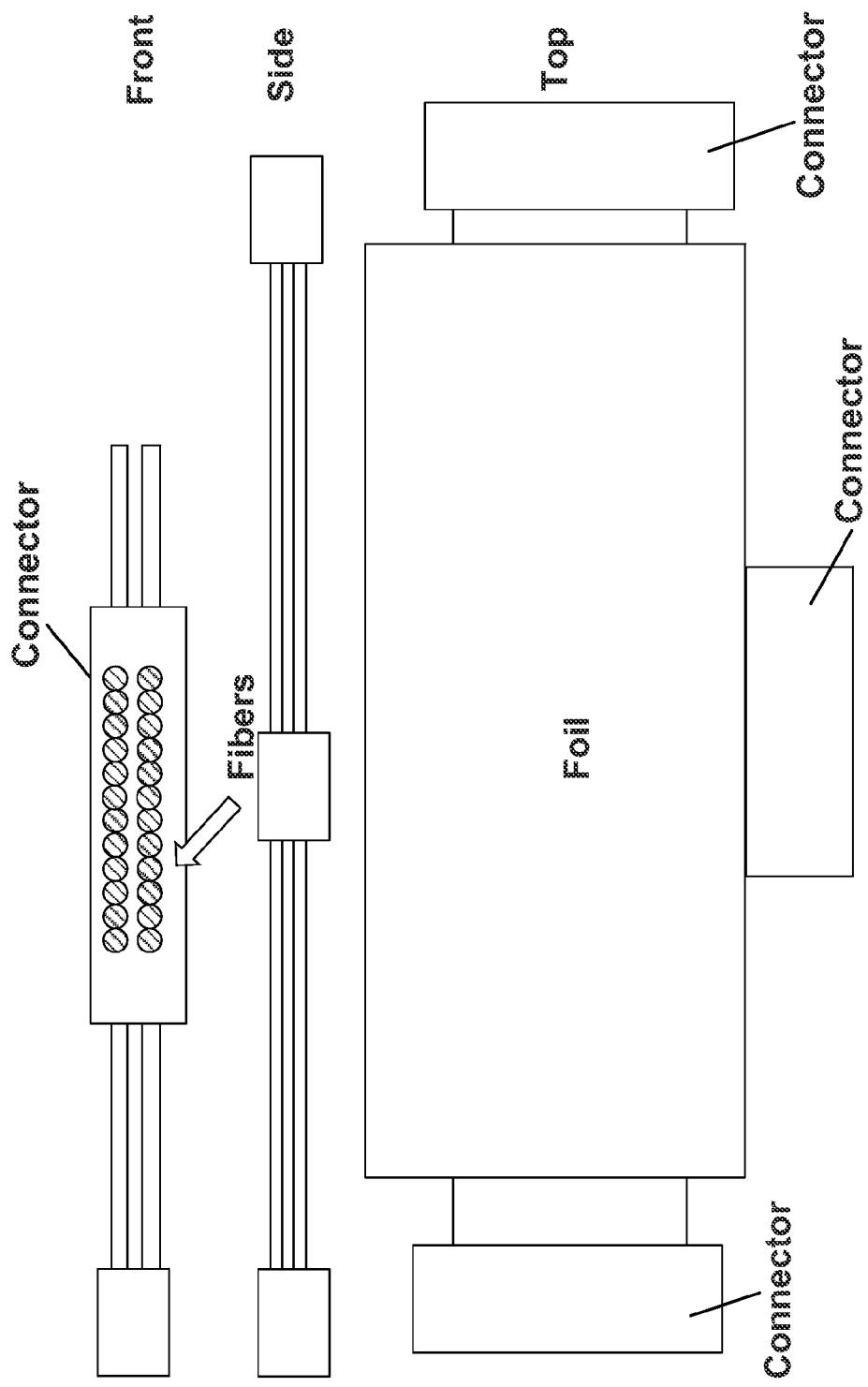
FIG. 80 shows multiple foil layers connected to multi-fiber connectors wherein a side access is provided.

In FIG. 80, foil variants are shown where the fibers are distributed between connectors not parallel to each other, such as when external access is restricted.

Figure 81:
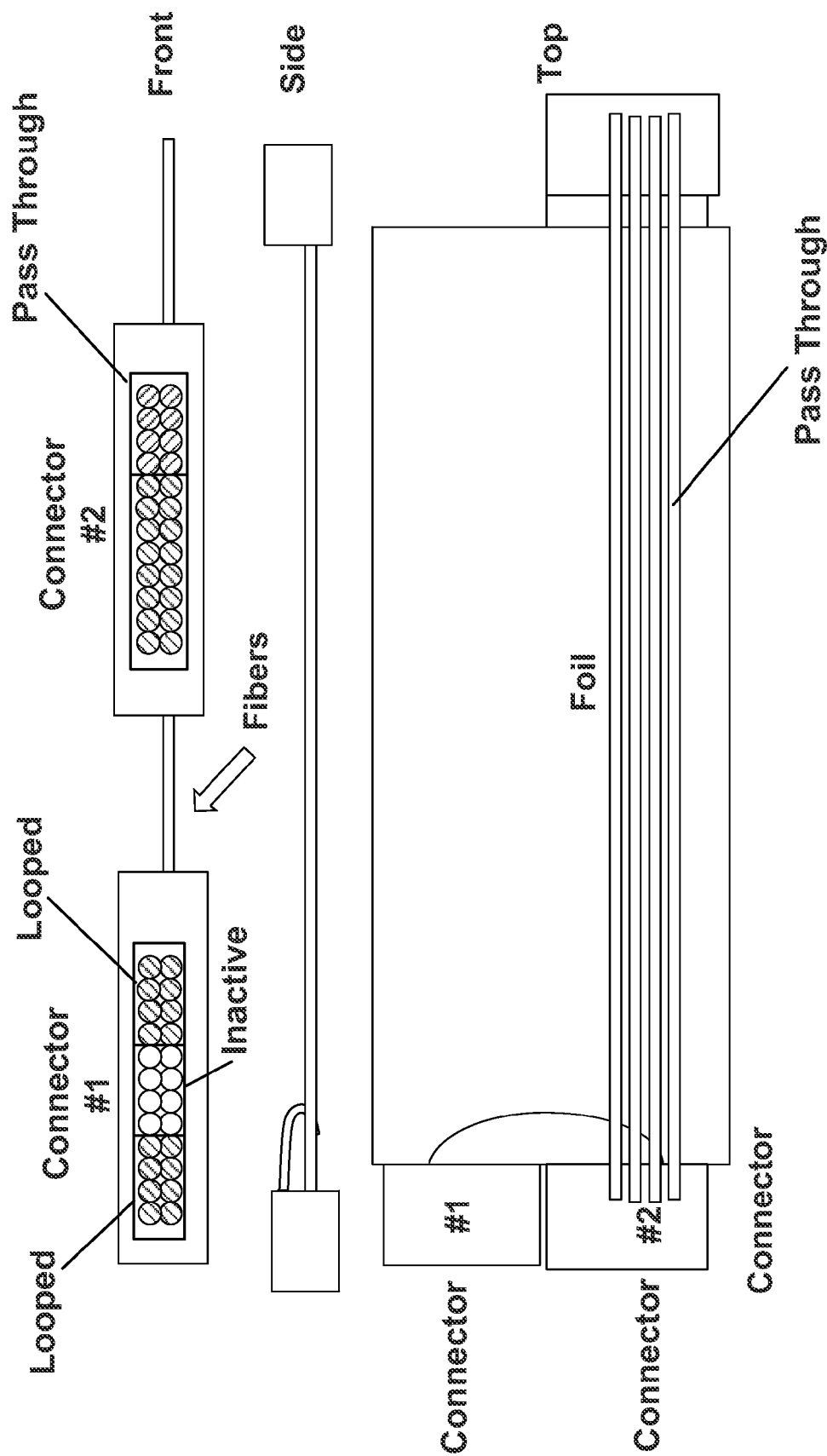
FIG. 81 shows a single foil including some fibers passing through from a front to a back, and some fibers looping back to the same connector, or another connector.

In FIG. 81, foil variants are shown where some fibers are passed through, and other fibers are looped back to the top row and out of the plug. Fibers come in on the bottom row. For example, eight fibers are looped out, and four fibers are passed to far end, used for instance to drop a subset of fibers of a larger fiber count trunk to an individual cabinet or device, maybe in a daisy-chain fashion down a cabinet row.

Figure 82:
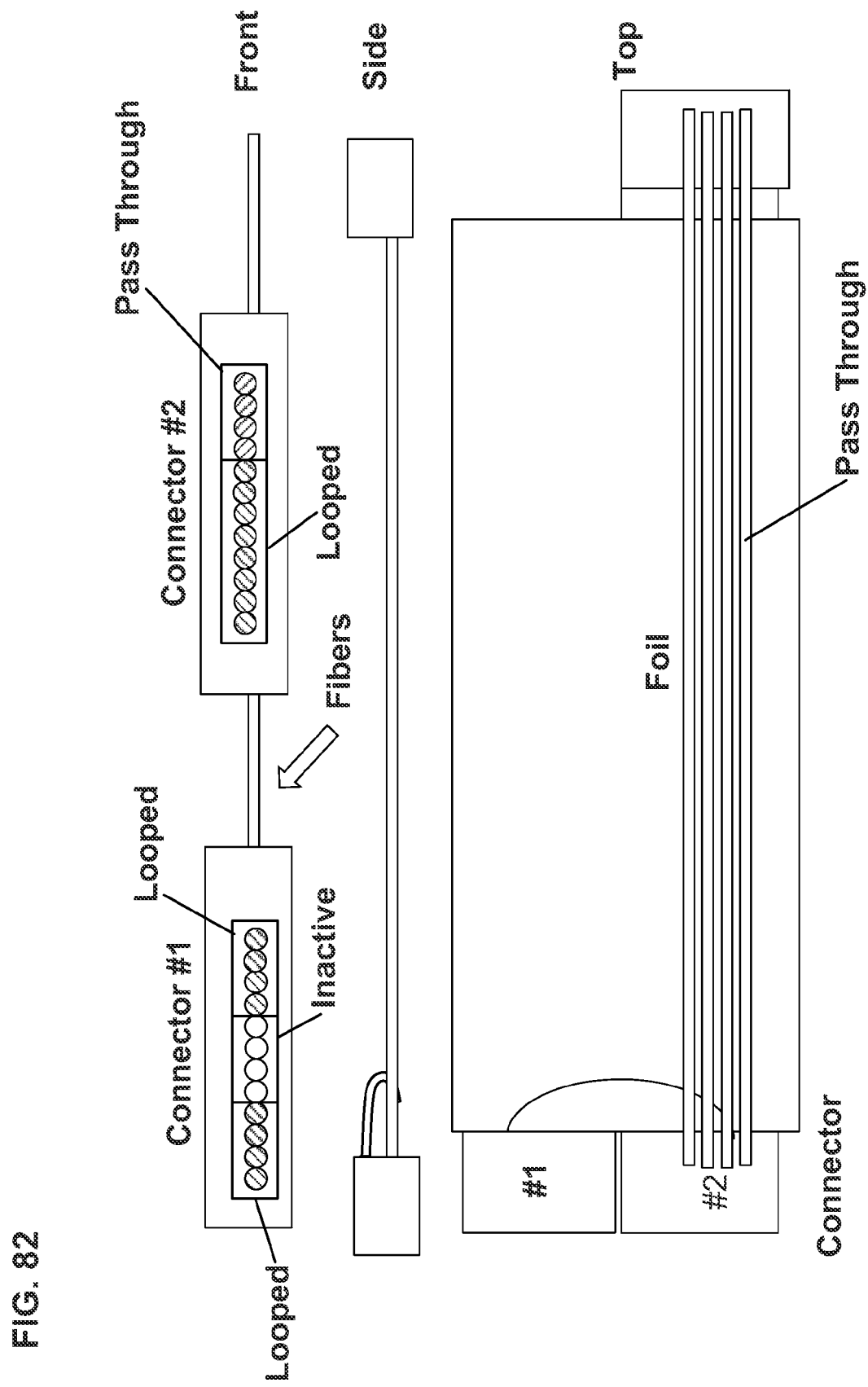
FIG. 82 shows another single foil including some fibers passing through from a front to back, and some fibers looping back to the same connector or another connector.

In FIG. 82, foil variants are shown where some fibers are passed through, and other fibers are looped back to the top row and out of the plug. Fibers come in on the bottom row. For example, eight fibers are looped out, and four fibers are passed to an individual cabinet or device.

Figure 83:
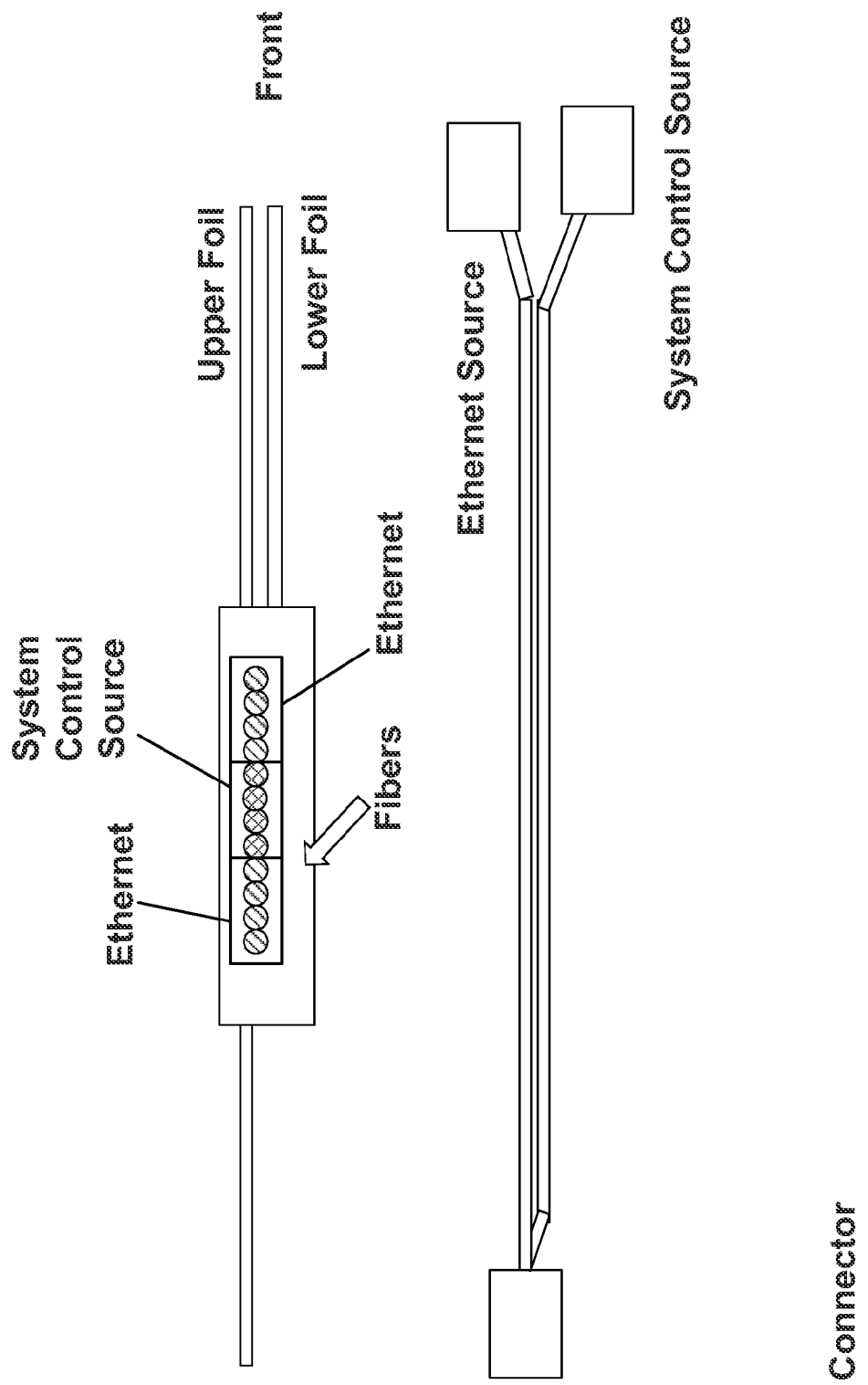
FIG. 83 shows a multi-fiber connector connected to multiple foil layers connected to different sources, an Ethernet source, and a system control source.

In FIG. 83, foil variants are shown where the connector rows terminate to different foils. In this case, there can be mixing a 40 Gig Ethernet channel and four control fibers from different sources, or fibers that can be used to test continuity of a channel, discover where the far end goes, give visual illumination of a desired connector end using colored light to speed location of a connector in a panel or warn a user if the wrong connector is unplugged.

Figure 84:
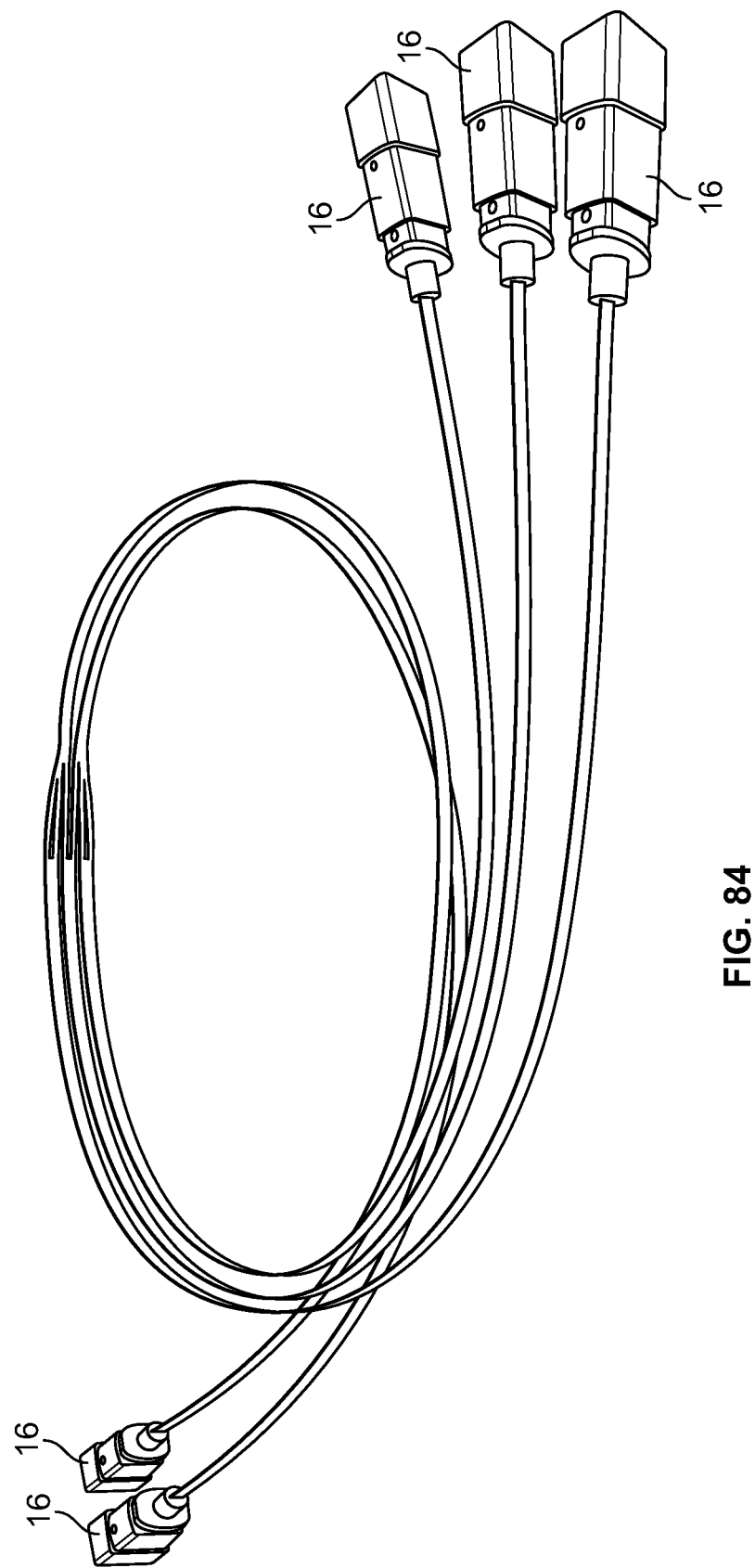
FIG. 84 shows an example flex foil using 12 fiber connectors in a 3 to 2 arrangement, and including the use of dark fibers.
Figure 85:
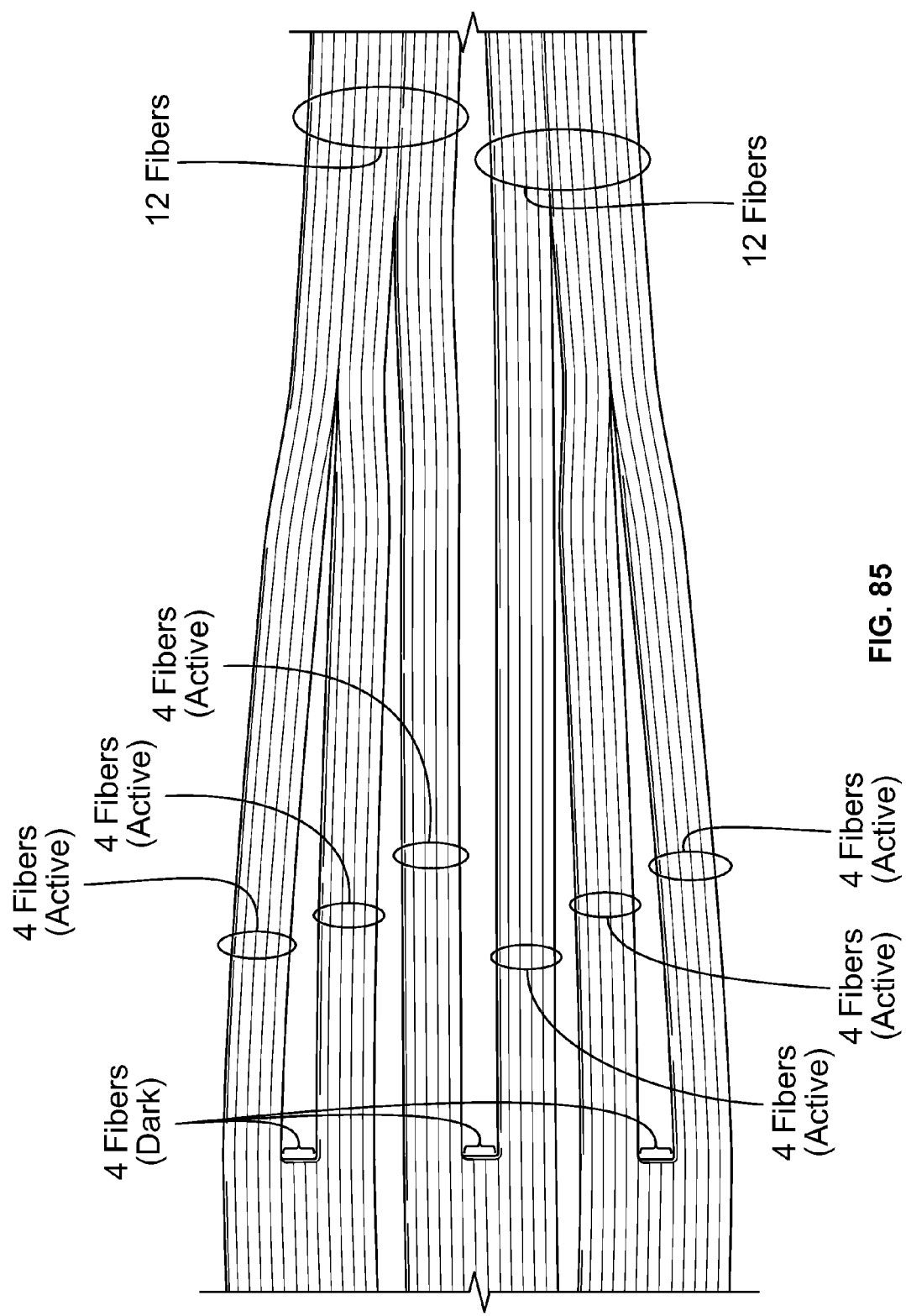
FIG. 85 shows a close up view of the transition from 2 twelve fibers substrates to 3 twelve fiber substrates.

Referring now to FIGS. 84 and 85, a further embodiment of the cable arrangement of FIGS. 74-76 is shown wherein twelve fiber connectors 16 are used at each end of the cable assembly, and each connector is terminated with twelve fibers. However, for the cable assembly end with three connectors, each connector has four dark fibers. As shown, the end of the cable assembly with two connectors shares fibers from two different connectors from the end with the three connectors. See also FIGS. 74-76.

It is to be appreciated that there could be branching devices such as optical couplers or WDMs (Wavelength Division Multiplexers) within the flex circuit. This enables signal distribution and/or monitoring of circuits for presence of signal, and signal quality, for example.

The invention claimed is:

1. A cassette that houses a fiber optic circuit, the cassette comprising:
a flexible optical circuit including a flexible substrate that is housed within a body of the cassette and a plurality of coated optical fibers supported by the flexible substrate;
wherein the optical fibers include a first plurality that connect between a plurality of multi-fiber connectors at one portion of the substrate and a lesser number of multi-fiber connectors at another portion of the substrate, and a second plurality that only connect to at least one of the multi-fiber connectors at the one portion and are dark fibers, wherein the multi-fiber connectors provided at the one portion of the substrate do not use all of the fiber signal paths for transmitting signals and include some dark fibers, and the lesser number of the multi-fiber connectors provided at the another portion of the substrate use all of the fiber signal paths for transmitting signals, wherein the fiber optic circuit provided by the flexible substrate is a passive circuit such that the flexible substrate provides an uninterrupted fiber pathway between the multi-fiber connectors at the one portion of the substrate and the lesser number of multi-fiber connectors at the another portion of the substrate for all of the first plurality of optical fibers without any power or wavelength splitting or switching for the fiber signal paths, and wherein the first and second plurality of optical fibers connected to the at least one of the multi-fiber connectors at the one portion of the substrate are provided in a common pattern of signal-transmitting fibers, dark fibers, and signal-transmitting fibers, wherein the multi-fiber connectors provided at the one portion of the substrate each include at least one row of twelve fibers, and the lesser number of the multi-fiber connectors provided at the another portion of the substrate each include at least one row of twelve fibers, and wherein the multi-fiber connectors provided at the one portion of the substrate and the lesser number of the multi-fiber connectors provided at the another portion of the substrate are connected to fiber optic adapters that are provided as part of the body of the cassette.

2. A cassette according to claim 1, wherein multiple substrates are provided and the optical fibers of each substrate are connected to a single row of a single multi-fiber connector having multiple rows of fibers.

3. A cassette according to claim 1, wherein multiple substrates are provided and the optical fibers of each substrate are connected to more than one row of a single multi-fiber connector having multiple rows of fibers.

4. A cassette according to claim 1, wherein the optical fibers include the first plurality that connect between two multi-fiber connectors, and the second plurality that only connect to one multi-fiber connector and are dark fibers.

5. A cassette according to claim 1, wherein the optical fibers connect between two multi-fiber connectors, wherein one connector is on a front or a back, and another connector is on a side.

6. A cassette according to claim 1, wherein the optical fibers connect between three multi-fiber connectors, wherein at least some of the optical fibers loop back to one of the multi-fiber connectors, and at least some of the other optical fibers pass through to another of the multi-fiber connector, wherein the one multi-fiber connector can be connected to another multi-fiber connector in a daisy chain.

7. A cassette according to claim 1, wherein the optical fibers are connected to different types of sources.

8. A cassette according to claim 1, wherein some of the optical fibers carry signals, and wherein some of the optical fibers are connected to a control circuit and/or an indication light source.

9. A cassette according to claim 1, wherein three multi-fiber connectors are provided at the one portion of the substrate, and two multi-fiber connectors are provided at the another portion of the substrate.

10. A cassette according to claim 1, wherein the multi-fiber connectors provided at the one portion of the substrate each include at least one row of twelve fibers, and the lesser number of the multi-fiber connectors provided at the another portion of the substrate each include at least two rows of twelve fibers.

11. A cassette according to claim 1, wherein the multi-fiber connectors provided at the one portion of the substrate each include at least two rows of twelve fibers, and the lesser number of the multi-fiber connectors provided at the another portion of the substrate each include at least two rows of twelve fibers.

* * * * *